United States Patent
Partovi et al.

(10) Patent No.: US 8,629,654 B2
(45) Date of Patent: *Jan. 14, 2014

(54) SYSTEM AND METHOD FOR INDUCTIVE CHARGING OF PORTABLE DEVICES

(75) Inventors: Afshin Partovi, Sunnyvale, CA (US); Michael Sears, Redwood City, CA (US)

(73) Assignee: Mojo Mobility, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/442,698

(22) Filed: Apr. 9, 2012

(65) Prior Publication Data

US 2012/0256585 A1  Oct. 11, 2012

Related U.S. Application Data

(63) Continuation of application No. 12/116,876, filed on May 7, 2008, now Pat. No. 8,169,185, which is a continuation-in-part of application No. 11/669,113, filed on Jan. 30, 2007, now Pat. No. 7,952,322.

(60) Provisional application No. 60/763,816, filed on Jan. 31, 2006, provisional application No. 60/810,262, filed on Jun. 1, 2006, provisional application No. 60/810,298, filed on Jun. 1, 2006, provisional application No. 60/868,674, filed on Dec. 5, 2006, provisional application No. 60/916,748, filed on May 8, 2007, provisional application No. 60/952,835, filed on Jul. 30, 2007, provisional application No. 61/012,922, filed on Dec. 12, 2007, provisional application No. 61/012,924, filed on Dec. 12, 2007, provisional application No. 61/015,606, filed on Dec. 20, 2007, provisional application No. 61/043,027, filed on Apr. 7, 2008.

(51) Int. Cl.
*H01M 10/46* (2006.01)

(52) U.S. Cl.
USPC .......................................................... 320/108

(58) Field of Classification Search
USPC .......... 320/107, 108, 112, 114, 115, 150, 180
See application file for complete search history.

(56) References Cited

U.S. PATENT DOCUMENTS 3,938,018 A   2/1976   Dahl
(Continued)

FOREIGN PATENT DOCUMENTS

JP   2000-341885 A   8/2000
(Continued)

OTHER PUBLICATIONS

Hui, "A New Generation of Universal Contactless Battery Charging Platform for Portable Consumer Electronic Equipment", IEEE Transactions on Power Electronics, vol. 20, No. 3, May 2005, pp. 620-627, 8 pages.

(Continued)

*Primary Examiner* — Edward Tso
(74) *Attorney, Agent, or Firm* — Fliesler Meyer LLP

(57) ABSTRACT

A system and method for variable power transfer in an inductive charging or power system. In accordance with an embodiment the system comprises a pad or similar base unit that contains a primary, which creates an alternating magnetic field. A receiver comprises a means for receiving energy from the alternating magnetic field and transferring it to a mobile device, battery, or other device. In accordance with various embodiments, additional features can be incorporated to provide greater power transfer efficiency, and to allow the system to be easily modified for applications that have different power requirements; such as variations in the material used to manufacture the primary and/or the receiver coils; modified circuit designs to be used on the primary and/or receiver side; and additional circuits and components that perform specialized tasks, such as mobile device or battery identification, and automatic voltage or power-setting for different devices or batteries.

33 Claims, 50 Drawing Sheets

(56) References Cited

U.S. PATENT DOCUMENTS

| | | |
|---|---|---|
| 4,311,853 A | 1/1982 | Cree |
| 4,311,953 A | 1/1982 | Fukuda |
| 4,415,959 A | 11/1983 | Vinciarelli |
| 4,731,585 A | 3/1988 | Fox |
| 4,800,328 A | 1/1989 | Bolger et al. |
| 4,873,677 A | 10/1989 | Sakamoto |
| 5,237,257 A | 8/1993 | Johnson et al. |
| 5,367,242 A | 11/1994 | Hulman |
| 5,434,493 A | 7/1995 | Woody et al. |
| 5,543,702 A | 8/1996 | Pfeiffer |
| 5,550,452 A | 8/1996 | Shirai |
| 5,600,225 A | 2/1997 | Goto |
| 5,642,087 A | 6/1997 | Crow |
| 5,656,917 A | 8/1997 | Theobald |
| 5,696,433 A | 12/1997 | Patino |
| 5,734,254 A | 3/1998 | Stephens |
| 5,744,933 A | 4/1998 | Inoue et al. |
| 5,889,384 A | 3/1999 | Hayes et al. |
| 5,925,814 A | 7/1999 | Tsuzuki et al. |
| 5,952,814 A | 9/1999 | Van Lerberghe |
| 5,959,433 A | 9/1999 | Rohde |
| 5,963,012 A | 10/1999 | Garcia |
| 5,991,170 A | 11/1999 | Nagai |
| 5,991,665 A | 11/1999 | Wang et al. |
| 6,008,622 A | 12/1999 | Nakawatase |
| 6,016,046 A | 1/2000 | Kaite |
| 6,040,680 A | 3/2000 | Toya |
| 6,094,119 A | 7/2000 | Reznik et al. |
| 6,184,651 B1 | 2/2001 | Fernandez |
| 6,184,654 B1 | 2/2001 | Bachner |
| 6,208,115 B1 | 3/2001 | Binder |
| 6,301,128 B1 | 10/2001 | Jang |
| 6,310,465 B2 | 10/2001 | Najima |
| 6,331,744 B1 | 12/2001 | Chen |
| 6,436,299 B1 | 8/2002 | Baarman |
| 6,462,509 B1 | 10/2002 | Abe |
| 6,489,745 B1 | 12/2002 | Koreis |
| 6,498,455 B2 | 12/2002 | Zink et al. |
| 6,501,364 B1 | 12/2002 | Hui |
| 6,573,817 B2 | 6/2003 | Gottschalk |
| 6,586,909 B1 | 7/2003 | Trepka |
| 6,625,477 B1 | 9/2003 | Wakefield |
| 6,636,017 B2 | 10/2003 | Zink et al. |
| 6,650,088 B1 | 11/2003 | Webb |
| 6,673,250 B2 | 1/2004 | Kuennen |
| 6,697,272 B2 | 2/2004 | Nanbu |
| 6,731,071 B2 | 5/2004 | Baarman |
| 6,741,064 B2 | 5/2004 | Liu |
| 6,756,765 B2 | 6/2004 | Bruning |
| 6,798,716 B1 | 9/2004 | Charych |
| 6,803,744 B1 | 10/2004 | Sabo |
| 6,803,774 B2 | 10/2004 | Park |
| 6,806,649 B2 | 10/2004 | Mollema |
| 6,812,645 B2 | 11/2004 | Baarman |
| 6,825,620 B2 | 11/2004 | Kuennen |
| 6,831,417 B2 | 12/2004 | Baarman |
| 6,844,702 B2 | 1/2005 | Giannopoulos et al. |
| 6,870,089 B1 | 3/2005 | Gray |
| 6,888,438 B2 | 5/2005 | Hui |
| 6,906,495 B2 | 6/2005 | Cheng |
| 6,913,477 B2 | 7/2005 | Dayan |
| 6,917,163 B2 | 7/2005 | Baarman |
| 6,917,182 B2 | 7/2005 | Burton |
| 6,943,733 B2 | 9/2005 | Vance |
| 6,972,543 B1 | 12/2005 | Wells |
| 6,975,198 B2 | 12/2005 | Baarman |
| 7,026,789 B2 | 4/2006 | Bozzone |
| 7,031,662 B2 | 4/2006 | Suzuki |
| 7,042,196 B2 | 5/2006 | Ka-Lai et al. |
| 7,116,200 B2 | 10/2006 | Baarman |
| 7,118,240 B2 | 10/2006 | Baarman |
| 7,126,450 B2 | 10/2006 | Baarman |
| 7,132,918 B2 | 11/2006 | Baarman |
| 7,151,357 B2 | 12/2006 | Xian et al. |
| 7,162,264 B2 | 1/2007 | Vance |
| 7,164,245 B1 | 1/2007 | Chen |
| 7,164,255 B2 | 1/2007 | Hui |
| 7,183,870 B2 | 2/2007 | Takagi |
| 7,184,706 B2 | 2/2007 | Someya |
| 7,209,084 B2 | 4/2007 | Lindell |
| 7,211,986 B1 | 5/2007 | Flowerdew et al. |
| 7,221,919 B2 | 5/2007 | Takagi |
| 7,239,110 B2 | 7/2007 | Cheng et al. |
| 7,248,017 B2 | 7/2007 | Cheng et al. |
| 7,305,258 B2 | 12/2007 | Rydgren |
| 7,311,526 B2 | 12/2007 | Rohrbach |
| 7,324,051 B2 | 1/2008 | Hayes |
| 7,342,539 B2 | 3/2008 | Rosenberg |
| 7,352,567 B2 | 4/2008 | Hotelling |
| 7,355,150 B2 | 4/2008 | Baarman |
| 7,376,408 B2 | 5/2008 | Hayes |
| 7,378,817 B2 | 5/2008 | Calhoon et al. |
| 7,382,636 B2 | 6/2008 | Baarman |
| 7,385,357 B2 | 6/2008 | Kuennen |
| 7,388,543 B2 | 6/2008 | Vance |
| 7,399,202 B2 | 7/2008 | Dayan |
| 7,415,248 B2 | 8/2008 | Andersson |
| 7,443,135 B2 | 10/2008 | Cho |
| 7,462,951 B1 | 12/2008 | Baarman |
| 7,477,195 B2 | 1/2009 | Vance |
| 7,487,921 B2 | 2/2009 | Takahashi |
| 7,495,414 B2 | 2/2009 | Hui |
| 7,498,871 B2 | 3/2009 | Ruuswik |
| 7,525,283 B2 | 4/2009 | Cheng et al. |
| 7,554,316 B2 | 6/2009 | Stevens et al. |
| 7,576,514 B2 | 8/2009 | Hui |
| 7,605,496 B2 | 10/2009 | Stevens et al. |
| D603,603 S | 11/2009 | Laine et al. |
| D607,879 S | 1/2010 | Ferber et al. |
| 7,645,143 B2 | 1/2010 | Rohrbach |
| D611,407 S | 3/2010 | Webb |
| D611,408 S | 3/2010 | Ferber et al. |
| 7,741,734 B2 | 6/2010 | Joannopoulos et al. |
| 7,781,916 B2 | 8/2010 | Boys |
| D624,316 S | 9/2010 | Ferber et al. |
| 7,804,054 B2 | 9/2010 | Shalom |
| D625,721 S | 10/2010 | Ferber et al. |
| 7,825,543 B2 | 11/2010 | Karalis et al. |
| 7,855,529 B2 | 12/2010 | Liu |
| 7,872,445 B2 | 1/2011 | Hui |
| 7,906,936 B2 | 3/2011 | Azancot et al. |
| 7,915,858 B2 | 3/2011 | Liu et al. |
| D636,333 S | 4/2011 | Kulikowski |
| 7,948,208 B2 | 5/2011 | Partovi et al. |
| 7,952,322 B2 | 5/2011 | Partovi et al. |
| D639,734 S | 6/2011 | Ferber et al. |
| 8,035,255 B2 | 10/2011 | Kurs et al. |
| 8,040,103 B2 | 10/2011 | Hui et al. |
| 8,049,370 B2 | 11/2011 | Azancot et al. |
| 8,050,068 B2 | 11/2011 | Hussmann et al. |
| 8,169,185 B2 | 5/2012 | Partovi et al. |
| 2002/0004167 A1 | 1/2002 | Jenson et al. |
| 2002/0067238 A1 | 6/2002 | Leu |
| 2002/0089305 A1 | 7/2002 | Park et al. |
| 2002/0093309 A1 | 7/2002 | Peele et al. |
| 2003/0094921 A1 | 5/2003 | Lau et al. |
| 2003/0103039 A1 | 6/2003 | Burr et al. |
| 2003/0210106 A1 | 11/2003 | Cheng |
| 2003/0214255 A1 | 11/2003 | Baarman |
| 2004/0113589 A1 | 6/2004 | Crisp |
| 2004/0130915 A1 | 7/2004 | Baarman |
| 2004/0130916 A1 | 7/2004 | Baarman |
| 2004/0145342 A1* | 7/2004 | Lyon .................. 320/108 |
| 2004/0150934 A1 | 8/2004 | Baarman |
| 2004/0222751 A1 | 11/2004 | Mollema |
| 2004/0232845 A1 | 11/2004 | Baarman |
| 2005/0007067 A1 | 1/2005 | Baarman |
| 2005/0017677 A1 | 1/2005 | Burton |
| 2005/0063488 A1 | 3/2005 | Troyk et al. |
| 2005/0075696 A1 | 4/2005 | Forsberg et al. |
| 2005/0093475 A1 | 5/2005 | Kuennen |
| 2005/0116650 A1 | 6/2005 | Baarman |
| 2005/0116683 A1 | 6/2005 | Cheng |
| 2005/0122058 A1 | 6/2005 | Baarman |

(56) References Cited

U.S. PATENT DOCUMENTS

| | | |
|---|---|---|
| 2005/0122059 A1 | 6/2005 | Baarman |
| 2005/0127849 A1 | 6/2005 | Baarman |
| 2005/0127850 A1 | 6/2005 | Baarman |
| 2005/0127867 A1 | 6/2005 | Calhoon et al. |
| 2005/0127869 A1 | 6/2005 | Calhoon et al. |
| 2005/0135122 A1 | 6/2005 | Cheng |
| 2005/0140482 A1 | 6/2005 | Cheng |
| 2005/0162125 A1 | 7/2005 | Yu |
| 2005/0189910 A1* | 9/2005 | Hui .............................. 320/108 |
| 2006/0021926 A1 | 2/2006 | Woodard |
| 2006/0038794 A1 | 2/2006 | Shneidman |
| 2006/0108977 A1 | 5/2006 | Kagermeier |
| 2006/0132045 A1 | 6/2006 | Baarman |
| 2006/0146517 A1 | 7/2006 | Park |
| 2006/0202665 A1 | 9/2006 | Hsu |
| 2006/0205381 A1 | 9/2006 | Beart et al. |
| 2006/0238930 A1 | 10/2006 | Baarman et al. |
| 2006/0284593 A1 | 12/2006 | Nagy |
| 2007/0029965 A1 | 2/2007 | Hui |
| 2007/0069687 A1 | 3/2007 | Suzuki |
| 2007/0109708 A1 | 5/2007 | Hussman et al. |
| 2007/0139000 A1 | 6/2007 | Kozuma et al. |
| 2007/0178945 A1 | 8/2007 | Cook et al. |
| 2007/0182367 A1 | 8/2007 | Partovi |
| 2007/0279002 A1 | 12/2007 | Partovi et al. |
| 2007/0296393 A1 | 12/2007 | Malpas et al. |
| 2008/0014897 A1 | 1/2008 | Cook et al. |
| 2008/0067874 A1 | 3/2008 | Tseng |
| 2008/0164839 A1 | 7/2008 | Kato |
| 2008/0247210 A1 | 10/2008 | Hu |
| 2008/0258679 A1 | 10/2008 | Manico |
| 2008/0272889 A1 | 11/2008 | Symons et al. |
| 2008/0278264 A1 | 11/2008 | Karalis et al. |
| 2009/0015075 A1 | 1/2009 | Cook |
| 2009/0033564 A1 | 2/2009 | Cook |
| 2009/0043727 A1 | 2/2009 | Cohen, Jr. et al. |
| 2009/0058189 A1 | 3/2009 | Cook et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0079268 A1 | 3/2009 | Cook et al. |
| 2009/0096413 A1 | 4/2009 | Partovi et al. |
| 2009/0102292 A1 | 4/2009 | Cook et al. |
| 2009/0127937 A1 | 5/2009 | Widmer et al. |
| 2009/0134712 A1 | 5/2009 | Cook et al. |
| 2009/0167449 A1 | 7/2009 | Cook et al. |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0243397 A1 | 10/2009 | Cook et al. |
| 2009/0257259 A1 | 10/2009 | Leibovitz |
| 2009/0267709 A1 | 10/2009 | Joannopoulos et al. |
| 2009/0267710 A1 | 10/2009 | Joannopoulos et al. |
| 2009/0284083 A1 | 11/2009 | Karalis et al. |
| 2009/0284227 A1 | 11/2009 | Mohammadian et al. |
| 2010/0007307 A1 | 1/2010 | Baarman et al. |
| 2010/0038970 A1 | 2/2010 | Cook et al. |
| 2010/0066176 A1 | 3/2010 | Azancot |
| 2010/0070219 A1 | 3/2010 | Azancot |
| 2010/0072825 A1 | 3/2010 | Azancot |
| 2010/0073177 A1 | 3/2010 | Azancot |
| 2010/0081473 A1 | 4/2010 | Chatterjee et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0109443 A1 | 5/2010 | Cook et al. |
| 2010/0109445 A1 | 5/2010 | Kurs et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0164296 A1 | 7/2010 | Kurs et al. |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0181841 A1 | 7/2010 | Azancot |
| 2010/0181843 A1 | 7/2010 | Schatz et al. |
| 2010/0181845 A1 | 7/2010 | Fiorello et al. |
| 2010/0184371 A1 | 7/2010 | Cook et al. |
| 2010/0187911 A1 | 7/2010 | Joannopoulos et al. |
| 2010/0190435 A1 | 7/2010 | Cook et al. |
| 2010/0190436 A1 | 7/2010 | Cook et al. |
| 2010/0194336 A1 | 8/2010 | Azancot |
| 2010/0201313 A1 | 8/2010 | Vorenkamp et al. |
| 2010/0207572 A1 | 8/2010 | Kirby et al. |
| 2010/0207771 A1 | 8/2010 | Trigiani |
| 2010/0213895 A1 | 8/2010 | Keating et al. |
| 2010/0219183 A1 | 9/2010 | Azancot |
| 2010/0219693 A1 | 9/2010 | Azancot |
| 2010/0219697 A1 | 9/2010 | Azancot |
| 2010/0219698 A1 | 9/2010 | Azancot |
| 2010/0244584 A1 | 9/2010 | Azancot |
| 2010/0253281 A1 | 10/2010 | Li |
| 2010/0253282 A1 | 10/2010 | Azancot |
| 2010/0257382 A1 | 10/2010 | Azancot |
| 2010/0259401 A1 | 10/2010 | Azancot |
| 2010/0277120 A1 | 11/2010 | Cook et al. |
| 2010/0277121 A1 | 11/2010 | Hall et al. |
| 2010/0327804 A1 | 12/2010 | Takahashi et al. |
| 2011/0012556 A1 | 1/2011 | Lai |
| 2011/0057606 A1 | 3/2011 | Saunam ki |
| 2011/0062793 A1 | 3/2011 | Azancot et al. |
| 2011/0090723 A1 | 4/2011 | Hu et al. |
| 2011/0095617 A1 | 4/2011 | Cook et al. |
| 2011/0121660 A1 | 5/2011 | Azancot et al. |
| 2011/0157137 A1 | 6/2011 | Ben-Shalom |
| 2011/0187318 A1 | 8/2011 | Hui et al. |
| 2011/0217927 A1 | 9/2011 | Ben-Shalom et al. |
| 2011/0221387 A1 | 9/2011 | Steigerwald et al. |
| 2011/0221391 A1 | 9/2011 | Won et al. |
| 2011/0266878 A9 | 11/2011 | Cook et al. |

FOREIGN PATENT DOCUMENTS

| | | |
|---|---|---|
| JP | 2003045731 | 2/2003 |
| JP | JP/2006-500894 A | 2/2006 |
| JP | JP2006-246633 A | 9/2006 |
| JP | 2009200174 A | 9/2009 |
| JP | 408000838 | 11/2011 |
| KR | 10-0836634 | 6/2008 |
| WO | WO/03/096361 | 11/2003 |
| WO | WO03096512 A2 | 11/2003 |
| WO | WO/03/105311 | 12/2003 |
| WO | WO03105308 A1 | 12/2003 |
| WO | WO2004/030176 A2 | 4/2004 |
| WO | WO2004030176 | 4/2004 |
| WO | WO2004038887 | 5/2004 |
| WO | WO2004038888 | 5/2004 |
| WO | WO2004055654 | 7/2004 |
| WO | WO2005024865 | 3/2005 |
| WO | WO2005109597 | 11/2005 |
| WO | WO2005109598 A1 | 11/2005 |
| WO | 2008-137996 | 11/2008 |

OTHER PUBLICATIONS

Tang, et al., "Evaluation of the Shielding Effects on Printed-Circuit-Board Transformers Using Ferrite Plates and Copper Sheets", IEEE

(56) References Cited

OTHER PUBLICATIONS

Transactions on Power Electronics, vol. 17, No. 6, Nov. 2002, pp. 1080-1088, 9 pages.
Liu, et al., "An Analysis of a Double-Layer Electromagnetic Shield for a Universal Contactless Battery Charging Platform", Department of Electronic Engineering City University of Hong Kong, IEEE, 2005, pp. 1767-1772, 6 pages.
Liu, et al., Equivalent Circuit Modeling of a Multilayer Planar Winding Array Structure for Use in a Universal Contactless Battery Charging Platform, IEEE Transactions on Power Electronics, vol. 22, No. 1, Jan. 2007, pp. 21-29, 9 pages.
Liu, et al., "Simulation Study and Experimental Verification of a Universal Contactless Battery Charging Platform with Localized Charging Features", IEEE Transactions on Power Electronics, vol. 22, No. 6, Nov. 2007, pp. 2202-2210, 9 pages.
Liu, et al., "Optimal Design of a Hybrid Winding Structure for Planar Contactless Battery Charging Platform", IEEE Transactions on Power Electronics, vol. 23, No. 1, Jan. 2008, pp. 455-463, 9 pages.
Karalis, et al., "Efficient Wirelss Non-Radiative Mid-Range Energy Transfer", ScienceDirect, Annals of Physics 323, 2008, pp. 34-48, 15 pages.
Su, et al., "Mutual Inductance Calculation of Movable Planar Coils on Parallel Surfaces", IEEE Transactions on Power Electronics, vol. 24, No. 4, Apr. 2009, pp. 1115-1124, 10 pages.
Hui, et al., "Coreless Printed Circuit Board (PCB) Transformers—Fundamental Characteristics and Application Potential", IEEE Circuits and Systems, Vo. 11, No. 3, Third Quarter 2000, pp. 1-48, 48 pages.
Sekitani, et al., "A Large-Area Flexible Wireless Power Transmission Sheet Using Printed Plastic MEMS Switches and Organic Field-Effect Transistors", IEEE, Quantum-Phase Electronics Center, School of Engineering, The University of Tokyo, 2006, 4 pages.
Choi, et al., "A New Contactless Battery Charger for Portable Telecommunication/Compuing Electronics", IEEE, School of Electronic and Electrical Engineering, Kyungpook National University, Taegu, Korea, 2011, pp. 58-59 2 pages.
Hui, et al., "Coreless Printed Circuit Board (PCB) Transformers for Power MOSFET/IGBT Gate Drive Circuits", IEEE Transactions on Power Electronics, vol. 14, No. 3, May 1999, pp. 422-430, 9 pages.
Tang, et al., "Coreless Planar Printed-Circuit-Board (PCB) Transformers—A Fundamental Concept for Signal and Energy Transfer", IEEE Transactions on Power Electronics, vol. 15, No. 5, Sep. 2000, pp. 931-941, 11 pages.
Hatanaka, et al., "Power Transmission of a Desk with Cord-Free Power Supply", IEEE Transactions on Magnetics, vol. 38, No. 5, Sep. 2002, pp. 3329-3331, 3 pages.
Fernandez, et al., "Design Issues of a Core-less Transformer for a Contact-less Application", IEEE, Universidad Politecnica de Madrid, 2002, pp. 339-345, 7 pages.
Hui, et al., "A New Generation of Universal Contactless Battery Charging Platform for Portable Consumer Electronic Equipment", IEEE Transactions on Power Electronics, vol. 20, No. 3, May 2005, pp. 620-627, 8 pages.
Liu, et al., "Optimal Design of a Hybrid Winding Structure for Planar Contactless Battery Charging Platform", IEEE, Department of Electronic Engineering, City University of Hong Kong, 2006, pp. 2568-2575, 8 pages.
Topfer, et al., "Multi-Pole Magnetization of NdFeB Sintered Magnets and Thick Films for Magnetic Micro-Actuators", ScienceDirect, Sensor and Actuators, 2004, pp. 257-263, 7 pages.
Topfer, et al., "Multi-Pole Magnetization of NdFeB Magnets for Magnetic Micro-Actuators and Its Characterization with a Magnetic Field Mapping Device", ScienceDirect, Journal of Magnetism and Magnetic Materials, 2004, 124-129, 6 pages.
Sakamoto, et al., "A Novel High Power Converter for Non-Contact Charging with Magnetic Coupling", IEEE Transactions on Magnetics, vol. 30, No. 6, Nov. 1994, pp. 4755-4757, 3 pages.

Hui, et al., "Some Electromagnetic Aspects of Coreless PCB Transformers", IEEE Transactions on Power Electronics, vol. 15, No. 4, Jul. 2000, pp. 805-810, 6 pages.
Waffenschmidt, et al., "Limitation of Inductive Power Transfer for Consumer Applications", 13th European Conference on Power Electronics and Applications, Barcelona, 2009. EPE '09. pp. 1-10, 10 pages.
Stokes, "Palm Strikes Back with new OS, Pre Handset at CES, http://arstechnica.com/news.ars/post/20090101-palm-laundhes-new-handset-pre-operating", Jan. 8, 2009, 6 pages.
Sullivan, Visteon to Sell Wireless Gadget Charger, "Wire-Free Technology will Lets Consumers Dump Cords and Chargers", Red Herring, Dec. 29, 2006, 2 pages.
Kim, "Wireless Charger for New Palm Phone", San Francisco Chronicle and SFGate.com, May 11, 2009, 2 pages.
Compeau, Red Zen Marketing, "Could This be the Mojo Behind the Palm Pre's Touchstone Charger?", http://redzenmarketing.posterous.com/could-this-be-the-mojo-behind-the-palm-pres-t, Jun. 5, 2009, 3 pages.
Fulton Innovation LLC, "The Big Story for CES 2007: The Public Debut of eCoupled Intelligent Wireless Power", ecoupled, Dec. 27, 2006, 2 pages.
Miller, "Palm May Make Pre Scarce", The San Jose Mercury News, Apr. 29, 2009, 1 page.
Murakami et al., "Consideration on Cordless Power Station Contactless Power Transmission System", IEEE Transactions on Magnets, vol. 32, No. 5, Sep. 1996, 3 pages.
Epson Air Trans "Wireless Power Transfer", http://www.2kl.co.uk/components/epson_airtrans.asp, Dec. 8, 2008, 2 pages.
Choi, et al., "A New Contactless Battery Charger for Portable Telecommunication/Compuing Electronics", IEEE, School of Electronic and Electrical Engineering, Kyungpook National University, Taegu, Korea, 2001, pp. 58-59 2 pages.
PCT International Preliminary Report on Patentability dated Nov. 10, 2011 in re International Application No. PCT/US2010/032845, 7 pages.
WiPower, Wikipedia, the free encyclopedia, http://en.wikipedia.org/wiki/WiPower, Nov. 18, 2011, 2 pages.
PowerbyProxi, Wireless Power Solutions, http://www.powerbyproxi.com/, Nov. 18, 2011, 2 pages.
Now charge your iPhone 4 and 4S with Powermat!, Wireless charging mats and receivers for your iPhone, iPod, Blackberry . . . http://www.powermat.com/, Nov. 18, 2011, 1 page.
Witricity, Wireless Electricity Delivered Over Distance, http://www.witricity.com, Nov. 18, 2011, 1 page.
ConvenientPower, ConvenientPower HK Limited, http://www.convenientpower.com/1/about.php, Nov. 18, 2011, 1 page.
Nigel Power LLC: Private Company Information—Business Week, http://investing.businessweek.com/research/stocks/private/snapshot.asp?p..., Nov. 18, 2011, 2 pages.
HaloIPT—Wireless Charging is the future for powering electric cars and it . . . , http://www.haloipt.com/, Nov. 18, 2011, 1 page.
Qualcomm Buys HaloIPT for Wireless Charging Technology, Wireless Power Planet, http://www.wirelesspowerplanet.com/news/qualcomm-buys-haloipt-for-..., Nov. 18, 2011, 5 pages.
Sakamoto, et al., "A Novel Circuit for Non-Contact Charging Through Electro-Magnetic Coupling", 1992, IEEE, pp. 165-174.
Abe, et al., "A Non-Contact Charger Using a Resonant Converter with Parallel Capacitor of the Secondary Coil", Apr. 2000, IEEE, Vo.l. 36, No. 2, pp. 444-451.
Sakamoto, et al. "Large Air-Gap Coupler for Inductive Charger", Sep. 1999, IEEE, vol. 35, No. 5, pp. 3526-3528.
Sakamoto, et al. "A Novel Converter for Non-Contact Charging with Electromagnetic Coupling", Nov. 1993, IEEE, vol. 29, No. 6, pp. 3228-3230.
Kim, et al. "Design of a Contactless Battery Charger for Cellular Phone", Dec. 2001, IEEE, vol. 48, No. 6, pp. 1238-1247.
Hui, et al. "Coreless Printed-Circuit Board Transformers for Signal and Energy Transfer", Electronics Letters, May 1998, vol. 34, No. 11, pp. 1052-1054.

(56) References Cited

OTHER PUBLICATIONS

Hui, et al. "Optimal Operation of Coreless PCB Transformer-Isolated Gate Drive Circuits with Wide Switching Frequency Range", May 1999, IEEE Transactions of Power Electronics, vol. 14, No. 3, pp. 506-514.

Tang, et al. "Characterization of Coreless Printed Circuit Board (PCB) Transformers", Nov. 2000, IEEE Transactions of Power Electronics, vol. 15, No. 6, pp. 1275-1282.

Tang, et al. "Coreless Printed Circuit Board (PCB) Transformers with Multiple Secondary Windings for Complementary Gate Drive Circuits", May 1999, IEEE Transactions of Power Electronics, vol. 14, No. 3, pp. 431-437.

Tang, et al. "Coreless Printed Circuit Board (PCB) Transformers with High Power Density and High Efficiency", May 2000, Electronics Letters, vol. 36, No. 11, pp. 943-944.

Borenstein, "Man Tries Wirelessly Boosting Batteries", Nov. 2006, USA Today, http://www.usatoday.com/tech/wireless/data/2006-11-16-wireless-recharging_x.htm, 5 pages.

Murph, "WildCharger Charges Your Gadgetry Sans Wires", Dec. 2006, Misc. Gadgets, 2 pages.

Gizmo Watch, "Pitstop: A Table Top Recharging Solution by Belkin", http://www.gizmowatch.com/entry/pitstop-a-table-top-recharging-solution-by-belkin, Dec. 2006, 5 pages.

Unknown Author, "Cutting the Cord", Apr. 2007, The Economist, 1 page.

Bishop, "Microsoft Surface Brings Computing to the Table", May 2007, http://seattlepi.nwsource.com/business/317737_msftdevic30.html, 7 pages.

Wildcharge, "The Wire-Free Power Revolution is Only Days Away, and WildCharge, Inc. Is Leading the Charge", Sep. 2007, 3 pages.

PCT International Search Report dated Feb. 14, 2008 in re International Application No. PCT/US07/61406, 8 pages.

PCT International Search Report dated Aug. 8, 2008 re: PCT Application No. PCT/US08/63084, 8 pages.

WildCharge Life Unplugged!, http://www.wildcharge.com/, Apr. 17, 2009, 2 pages.

Powermat "The Future of Wireless Power Has Arrived", http://www.pwrmat.com, Apr. 15, 2009, 2 pages.

eCoupled Wireless Power Technology Fulton Innovation, http://www.ecoupled.com, Apr. 15, 2009, 5 pages.

eCoupled Wireless Power Technology Patents Fulton Innovation, http://www.ecoupled.com, Apr. 15, 2009, 4 pages.

Qualcomm Products and Services—Wireless Airlink Technologies, http://www.qualcomm.com/products_services/airlinks, Apr. 15, 2009, 3 pages.

Economist.com Science Technology Quarterly, "Wireless Charging", http://www.economist.com/science/tq/PrinterFriendly.cfm?story_id=13174387, Apr. 15, 2009, 4 pages.

Office Action in connection with U.S. Appl. No. 11/669,113 dated Oct. 29, 2008, 29 pages.

Final Office Action in connection wtih U.S. Appl. No. 11/669,113 dated Aug. 25, 2009, 25 pages.

Office Action in connection with U.S. Appl. No. 11/669,113 dated May 13, 2010, 22 pages.

International Search Report and Written Opinion of the International Searching Authority, Korean Intellectual Property Office, in re International Application No. PCT/US2010/032845 dated Dec. 13, 2010, 10 pages.

Office Action in connection with U.S. Appl. No. 11/757,067 dated Jan. 26, 2009, 26 pages.

Office Action in connection with U.S. Appl. No. 11/757,067 dated Oct. 19, 2009, 23 pages.

Office Action in connection with U.S. Appl. No. 11/757,067 dated May 10, 2010, 21 pages.

Office Action in connection with U.S. Appl. No. 12/116,876 dated May 2, 2011, 8 pages.

PCT International Search Report dated Feb. 17, 2012 in connection with PCT Application No. PCT/US2011/040062, 9 pages.

PCT International Search Report dated Jun. 14, 2013 in connection with PCT Application No. PCT/US2013/033352, 5 pages.

Office Action in connection with U.S. Appl. No. 13/708,548 dated Jun. 7, 2013, 6 pages.

Office Action in connection with U.S. Appl. No. 13/115, 811 dated Mar. 28, 2013, 14 pages.

Office Action in connection with U.S. Appl. No. 13/708,520 dated May 24, 2013, 6 pages.

Office Action in connection with U.S. Appl. No. 13/158,134 dated Jun. 12, 2013, 15 pages.

Office Action in connection with U.S. Appl. No. 13/709,983 dated Jun. 17, 2013, 7 pages.

Office Action in connection with U.S. Appl. No. 13/710,017 dated Jun. 11, 2013, 7 pages.

Office Action in connection with U.S. Appl. No. 13/710,062 dated Jun. 7, 2013, 7 pages.

Office Action in connection with Japanese Application JP/2010-507666 (Japanese National Stage application of PCT/US2008/063084) dated Dec. 3, 2012, 4 pages.

Office Action in connection with U.S. Appl. No. 12/769,586 dated Dec. 13, 2012, 19 pages.

Office Action dated Jun. 26, 2013, U.S. Appl. No. 13/708,827, filed Dec. 7, 2012.

Office Action dated Jun. 24, 2013, U.S. Appl. No. 13/708,838, filed Dec. 7, 2012.

European Search Report and Search Opinion in connection with European Patent Application No. 08747863.2 (European National Stage application of PCT/US2008/063084) dated Apr. 2, 2013, 7 pages.

Office Action in connection with Chinese Application No. 200880023854.4 (Chinese National Stage application of PCT/US2008/063084) dated Aug. 28, 2012, 18 pages.

Office Action in connection with U.S. Appl. No. 12/769,586 dated Aug. 27, 2013, 15 pages.

Office Action in connection with U.S. Appl. No. 13/352,096 dated Sep. 11, 2013, 12 pages.

Office Action in connection with U.S. Appl. No. 13/709,937 dated Sep. 12, 2013, 7 pages.

Office Action in connection with U.S. Appl. No. 13/708,827 dated Jun. 26, 2013, 22 pages.

Office Action in connection with U.S. Appl. No. 13/708,838 dated Jun. 24, 2013, 27 pages.

Office Action in connection with U.S. Appl. No. 13/113,977 dated Nov. 9, 2012, 9 pages.

* cited by examiner

Charger Coil Center to Receiver Coil Center Offset (r)

SYSTEM AND METHOD FOR INDUCTIVE CHARGING OF PORTABLE DEVICES

CLAIM OF PRIORITY

This application is a continuation of U.S. patent application Ser. No. 12/116,876, filed May 7, 2008, titled "SYSTEM AND METHOD FOR INDUCTIVE CHARGING OF PORTABLE DEVICES"; which application is a continuation-in-part of U.S. patent application Ser. No. 11/669,113, filed Jan. 30, 2007, titled "INDUCTIVE POWER SOURCE AND CHARGING SYSTEM", and issued as U.S. Pat. No. 7,952,322 on May 31, 2011, which claims the benefit of priority to U.S. provisional patent application 60/763,816, filed Jan. 31, 2006, titled "PORTABLE INDUCTIVE POWER SOURCE"; U.S. provisional patent application 60/810,262, filed Jun. 1, 2006, titled "MOBILE DEVICE, CHARGER, AND POWER SUPPLY"; U.S. provisional patent application 60/810,298, filed Jun. 1, 2006, titled "MOBILE DEVICE, BATTERY, CHARGING SYSTEM, AND POWER SUPPLY"; and U.S. provisional patent application 60/868,674, filed Dec. 5, 2006, titled "SYSTEM FOR PROVIDING A PORTABLE INDUCTIVE POWER SOURCE"; which application also claims the benefit of priority to U.S. provisional patent application 60/916,748, filed May 8, 2007, titled "CHARGING AND POWERING MOBILE DEVICES, BATTERIES"; U.S. provisional patent application 60/952,835, filed Jul. 30, 2007, titled "INDUCTIVE CHARGING OF PORTABLE DEVICES"; U.S. provisional patent application 61/012,922, filed Dec. 12, 2007, titled "WIRELESS CHARGER WITH POSITION INSENSITIVITY"; U.S. provisional patent application 61/012,924, filed Dec. 12, 2007, titled "CONTROL, REGULATION, AND COMMUNICATION IN CHARGERS"; U.S. provisional patent application 61/015,606, filed Dec. 20, 2007, titled "PORTABLE INDUCTIVE POWER SOURCE"; and U.S. provisional patent application 61/043,027, filed Apr. 7, 2008, titled "INDUCTIVE POWER SOURCE AND CHARGING SYSTEM"; which application is also related to U.S. patent application Ser. No. 11/757,067 filed Jun. 1, 2007, titled "POWER SOURCE, CHARGING SYSTEM, AND INDUCTIVE RECEIVER FOR MOBILE DEVICES", and issued as U.S. Pat. No. 7,948,208 on May 24, 2011, each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is related generally to power supplies, power sources, and particularly to a system and method for inductive charging of portable devices.

BACKGROUND

There is currently a need for powering portable or mobile devices for use in commercial, business, personal, consumer, and other applications. Examples of such devices include cellular telephones, personal digital assistants (PDAs), notebook computers, mobile email devices, Blackberry devices, Bluetooth headsets, hearing aids, music players (for example, MP3 players), radios, compact disk players, video game consoles, digital cameras, walkie-talkie or other communication devices, GPS devices, laptop computers, electric shavers, and electric toothbrushes. Most of these devices include a rechargeable internal battery that must be first charged by an external power supply or charger, before the device itself can be used. The power supply typically provides direct current (DC) voltage through a special connector to the device. The power supply can then be disconnected, and the device will continue to run for a short period of time until the battery is depleted. The voltage and power requirements of the different devices vary, and to date there is currently no standardized connector for the devices. As a result of this, each mobile device is invariably sold or distributed bundled with its own charger. The costs associated with these multiple different types and numbers of charger are paid by the consumer indirectly by being incorporated into the prices being charged for the mobile device.

The rapid increase in the total number and variety of mobile products has meant that most people have several of the above-mentioned devices. In a typical day, that user would have to separately connect their multiple devices to each of their appropriate chargers for charging of each device. In addition, many people find it necessary to charge their devices in different locations such as their offices and cars. Thus, many users have purchased additional chargers for their offices and cars, for use in charging their mobile phones, notebook computers, and music players in those locations.

It will be evident that the above situation has caused typical users to have a multitude of incompatible devices (i.e. power supplies and chargers) that essentially provide the same function of charging a mobile device, but because of the number and variety that must be kept by the user are inconvenient to use. In many situations, users simply forget to charge their devices, or else find they need to recharge their device in situations where no appropriate charger is available. This leads to loss of ability to use the device when desired or needed.

In addition, when traveling way from home, mobile users have a particular problem in that they need to pack and carry the multiple chargers for their devices. In many situations, these chargers are bulkier and heavier than the devices themselves, and use of these devices in foreign countries requires clumsy adaptors, and sometimes voltage converters. This leads to a high degree of inconvenience for the ever-more-mobile consumer.

In addition, the power connector for the mobile devices is often cheaply manufactured, and a source of mechanical and electrical failure. In many applications, such as toothbrushes or applications where the device is exposed to water and needs to be hermetically sealed, such a physical connection can not be used. Thus an alternative means of powering those types of devices must be used.

Several products have tried to address this situation. Some companies propose the use of a universal charger that consists of a power supply base unit, and interchangeable tips that both fit into the base unit and in turn fit different devices. The tip includes a customized regulator that sets the voltage required by the particular device. However, a user must carry the multiple tips he or she needs for each of the various devices they have, and then charge each device serially by connecting the device to the power supply. While this product reduces the overall weight of the charging tools the user must carry, the user still needs to carry and exchange the tips to connect to different devices. In addition, the charging of multiple devices simultaneously is often not possible.

Realizing that a power supply typically contains a transformer for voltage conversion, another approach is to split the transformer into two parts: a first part can contain the first winding and the electronics to drive this winding at the appropriate operating frequency, while the second part consists of a winding where power is received and then rectified to obtain DC voltage. If the two parts are brought into physical proximity to each other, power is transformed from the first part to the second inductively, i.e. by induction, without any physical electrical connection. This is the approach that is used in many electrical toothbrushes, shavers, and other products that are expected to be used in wet environments. However, a common problem with such inductive units is that the windings are bulky, which restricts their use in lightweight portable devices. Furthermore, to achieve adequate power transfer, the parts must be designed to fit together suitably so that their windings are closely aligned. This is typically done by molding the device casing (for example, an electric toothbrush) and its charger/holder so that they fit together in only one suitable way. However, the molded base and shape of the portable device means they cannot be used in a universal fashion to power other devices.

Some companies have proposed pad-like charging devices based on inductive concepts, but that also ostensibly allow for different types of devices to be charged. These pads typically include grids of wires in an x and y direction, that carry an electrical current, and that generate a uniform magnetic field parallel to the surface of the pad. A receiver coil wound around a magnetic core lies on the surface of the pad and picks up the magnetic field parallel to the surface, and in this manner energy can be transferred. However, each of these methods suffer from poor power transfer, in that most of the power in the primary is not picked up in the receiver, and thus the overall power efficiency of the charger is very low. In addition, the magnetic cores used for the primary and receiver are often bulky and add to the total cost and size of the system, and limit incorporation into many devices.

Another point to note is that, while all of the above devices allow a user to charge a device, they also require the charging device or base unit to be electrically connected to a power source, such as a power outlet or a DC source. In many cases, the user may not have access to such a power source such as when traveling, camping, or working in an area without access to power. However, to date, no device has been provided that is portable, and that allows for inductive charging of multiple devices with differing power requirements, and which itself can be intermittently or occasionally charged either by an external power source, or by other means, or that is self-powered or includes its own power source.

SUMMARY

A portable inductive power source, power device, or unit, for use in powering or charging electrical, electronic, battery-operated, mobile, and other devices or rechargeable batteries is disclosed herein. In accordance with an embodiment the system comprises 2 parts: The first part is a pad or similar base unit that contains a primary, which creates an alternating magnetic field by means of applying an alternating current to a winding, coil, or any type of current carrying wire. The second part of the system is a receiver that comprises a means for receiving the energy from the alternating magnetic field from the pad and transferring it to a mobile or other device or rechargeable battery. The receiver may comprise coils, windings, or any wire that can sense a changing magnetic field, and rectify it to produce a direct current (DC) voltage, which is then used to charge or power the device.

In some embodiments the receiver can also comprise electronic components or logic to set the voltage and current to the appropriate levels required by the mobile device or the charging circuit in the device, or to communicate information to the pad. In additional embodiments, the charging or power system can provide for additional functionality such as communication of data stored in the electronic device or to be transferred to the device. Some embodiments may also incorporate efficiency measures that improve the efficiency of power transfer between the charger and receiver, and ultimately to the mobile device or battery. In accordance with an embodiment the charger or power supply includes an internal battery for self-powered operation. In accordance with other embodiments the charger or power supply can include a solar cell power source, hand crank, or other means of power supply for occasional self powered operation. Other embodiments can be incorporated into charging kiosks, automobiles, trains, airplanes, or other transport and other applications.

In accordance with various embodiments, additional features can be incorporated into the system to provide greater power transfer efficiency, and to allow the system to be easily modified for applications that have different power requirements. These include variations in the material used to manufacture the primary and/or the receiver coils; modified circuit designs to be used on the primary and/or secondary side; and additional circuits and components that perform specialized tasks, such as mobile device identification, and automatic voltage or power-setting for different devices.

DETAILED DESCRIPTION

Figure 1:
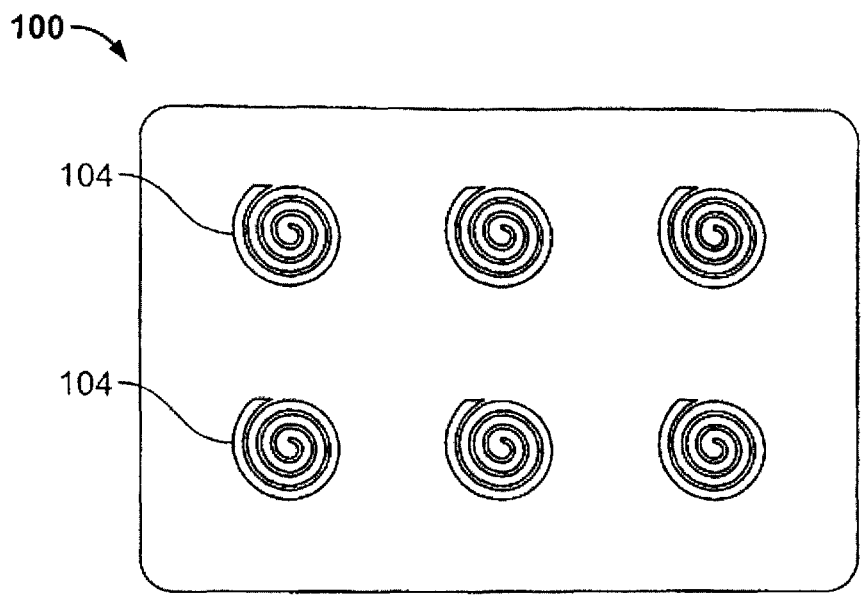
FIG. 1 shows a pad using multiple transmitter or charger coils in accordance with an embodiment.

A portable inductive power source, power device, or unit, for use in powering or charging electrical, electronic, battery-operated, mobile, rechargeable batteries, and other devices is disclosed herein. In accordance with an embodiment the system comprises two parts: The first part is a pad or similar base unit that contains a primary, which creates an alternating magnetic field by means of applying an alternating current to a winding, coil, or any type of current carrying wire. In some embodiments the pad can also contain various signaling, and switching or communication circuitry, or means of identifying the presence of devices or batteries to be charged or powered. In some embodiments the pad can also contain multiple coils or sections to charge or power various devices or to allow charging or powering of devices or batteries placed anywhere on the pad. The second part of the system is a receiver that comprises a means for receiving the energy from the alternating magnetic field from the pad and transferring it to a mobile battery, or other device. The receiver can comprise coils, windings, or any wire that can sense a changing magnetic field, and rectify it to produce a direct current (DC) voltage, which is then used to charge or power the device or battery.

In some embodiments the receiver can also comprise electronic components or logic to set the voltage and current to the appropriate levels required by the mobile device or battery. In some embodiments, the receiver can also contain circuitry to sense and determine the status of the electronic device or battery to be charged, the battery inside a device, or a variety of other parameters and to communicate this information to the pad. In additional embodiments, the system can provide for additional functionality such as communication of data stored in the electronic device (for example, digital images stored in cameras, telephone numbers in cell phones, songs in MP3 players) or data into the device.

Embodiments can also incorporate efficiency measures that improve the efficiency of power transfer between the charger or power supply and the receiver, and ultimately to the mobile device or battery. In accordance with an embodiment, the charger or power supply comprises a switch, (for example, a MOSFET device or another switching mechanism), that is switched at an appropriate frequency to generate an alternative current (AC) voltage across a primary coil, and generates an AC magnetic field. This field in turn generates a voltage in the coil in the receiver that is rectified and then smoothed by a capacitor to provide power to a load, with the result being greater efficiency.

In accordance with other embodiments the coils are mounted such that they can move laterally within the pad and within an area of their segments, while continuing to be connected to their driver electronics placed on the edges of the area. The floating coils and the drive circuit are sandwiched in between thin upper and lower cover layers that act to allow the coils lateral movement while limiting vertical movement. When a receiver is placed on the pad, the pad senses the position of the receiver coil and moves the coils to the right position to optimize power transfer. Magnets can be used to better orient the coils and improve greater power transfer efficiency.

Additional embodiments are also described herein. For example, in accordance with an embodiment the charging/power supply device includes an internal battery for self-powered operation. In accordance with other embodiments the charging/power supply device can include a solar cell power source, hand crank, or other means of power supply for occasional self powered operation. Other embodiments can be incorporated into charging kiosks, automobiles, computer cases, and other electronic devices and applications.

Inductive Charging System

While the above mentioned technologies describe various aspects of inductive charging, they do not address the basic requirements that a consumer and manufacturer desire in such a product. These include the following desired features:

The pad should be able to charge or power a number of devices or batteries with various power requirements efficiently. A typical number may be one to six or even 12 or more devices or batteries, including four or more low power (up to 5 W) devices or batteries simultaneously. When multiple devices or batteries are being charged, a method for energizing only those coils near a device or battery is preferable.

The same pad should be able to power low-power devices (mobile phones, PDAs, cameras, game consoles, etc.) or batteries with power requirements of 5 W or less, and higher-power devices such as notebook computers (which often have a power requirement of 60 W or higher) or high power batteries.

The power transfer efficiency between the primary coil and the receiver should be maximized. Lack of efficiency in the power transfer would necessitate larger and heavier AC to DC power supplies. This would add cost and decrease product attractiveness to customers. Thus methods where the entire pad is energized are not as attractive.

A simple method for verification of the manufacturer of the receiver, and possibly information for power requirements, should be supported as necessary to ensure product compatibility and to provide means of product registration and licensing.

The EMI radiation from the system should be minimized, and ideally, the system should radiate little or no EMI with no device present. A charger should preferably not emit any power until an appropriate device or battery is brought close to the charger or power supply itself. In this way, electric power is not wasted, and electromagnetic power is not emitted needlessly. In addition, accidental effects on magnetically sensitive devices such as credit cards, disk drives and such are minimized.

The pad and the receiver should be reasonably simple to construct, and cost effective. Since both parts can be integrated into mobile devices or batteries, the overall size, weight, and form factor should be minimized.

As used herein, the term "charger" can refer to a device for supplying power to a mobile or stationary device for the purpose of either charging its battery, operating the device at that moment in time, or both. For example, as is common in portable computers, the power supply can operate the portable computer, or charge its battery, or accomplish both tasks simultaneously. The charger may include circuitry for driving a coil appropriately to generate an AC magnetic field, power or current sense or regulation circuitry, microcontrollers, and means of communication with a receiver, battery, or device. It may also be able to communicate data with a device or battery or perform other functions. As used herein, the term 'receiver' means an inductive coil or coils and the circuitry for rectification and smoothing of received current, any possible control or communication circuitry for communication with the charger and regulation of power and any possible circuit for managing charging or measurement of status of a battery or a device to be charged or powered such as a charge management circuit, fuel gauge, current, voltage, or temperature sensor, etc. The receiver can also incorporate appropriate circuitry for data transfer between a device or battery and the charger. In accordance with an embodiment, the mobile device charger and/or power supply can have any suitable configuration, such as the configuration of a flat pad. The power received by the mobile device from the mobile device charger/power supply (such as the primary in the mobile device charger) can be rectified in the receiver and smoothed by a capacitor before being connected to the rechargeable battery which is represented by the load in the figures. To ensure proper charging of the battery, a regulator or charge management circuit can be placed between the output of the output of the rectifier/capacitor stage and the battery. This regulator or charge management circuit can sense the appropriate parameters of the battery (voltage, current, capacity), and regulate the current drawn from the receiver appropriately. The battery can contain a chip with information regarding its characteristics that can be read out by the regulator or charge management circuit. Alternatively, such information can be stored in the regulator or charge management circuit for the mobile device to be charged, and an appropriate charging profile can also be programmed into the regulator or charge management circuit.

FIG. 1 shows a pad using multiple receiver/energizer coils in accordance with an embodiment. In its simplest format, the mobile device or battery charger or power supply preferably has a substantially flat configuration, such as the configuration of a pad 100, and comprises multiple coils or sets of wires 104. These coils or wires can be the same size as or larger than the coils or wires in the mobile devices, or battery and can have similar or different shapes, including for example a spiral shape. For example, for a mobile device charger or power supply designed to charge or provide power to up to four mobile devices of similar power (up to 10 W each) such as mobile phones, MP3 players, batteries, etc., four or more of the coils or wires will ideally be present in the mobile device or battery charger. The charger or power supply pad can be powered by plugging into a power source such as a wall socket or itself be powered or charged inductively. The pad can also be powered by another electronic device, such as the pad being powered through the USB outlet of a laptop or by the connector that laptops have at the bottom for interfacing with docking stations, or powering other devices. The pad can also be incorporated into a docking station, such as may be used by notebook computers or built into a table or other surface.

In accordance with an embodiment, a mobile device can include a receiver that includes one or more coils or wires to receive the power from the mobile device charger or power supply. As described in further detail below, the receiver can be made part of the battery in the mobile device or of the shell of the mobile device. When it is part of the mobile device shell, the receiver can be part of the inside surface of the mobile device shell or of the outside surface of the mobile device shell. The receiver can be connected to the power input jack of the mobile device or can bypass the input jack and be directly connected to the battery or charge management circuit inside the mobile device. In any of these configurations, the receiver includes one or more appropriate coil or wire geometries that can receive power from the mobile device charger or power supply when it is placed adjacent to the mobile device charger or power supply. In accordance with an embodiment, the coils in the mobile device charger or power supply and/or the coils in the mobile devices or battery can be printed circuit board (PCB) coils, and the PCB coils can be placed in one or more layers of PCB.

In some embodiments, the charger or power supply can also itself be built into a mobile device or battery. For example, a laptop computer or other portable or mobile device can incorporate a charger or power supply section so that other mobile devices can be charged or powered as described above. Alternatively, using the same set of coils or wires, or a separate set of coils or wires, any mobile device or battery can itself be used as an inductive charger or power supply to power or charge other mobile devices or batteries.

In accordance with an embodiment, the mobile device charger/power supply or pad, and the various mobile devices or batteries, can communicate with each other to transfer data. In one embodiment, the coils in the mobile device charger/power supply that are used for powering or charging the mobile device, or another set of coils in the same PCB layer or in a separate layer, can be used for data transfer between the mobile device charger/power supply and the mobile device to be charged or powered or the battery directly. Techniques employed in radio and network communication, such as radio frequency identification (RFID), Bluetooth, WiFi, Wireless USB, or others can be used. In one embodiment a chip connected to an antenna (for example, the receiver coil or separate data antenna) or another means of transfer of information can be used to provide information about, for example, the presence of the mobile device or battery, its authenticity (for example its manufacturer code) and the devices' charging/power requirements (such as its required voltage, battery capacity, and charge algorithm profile).

In accordance with an embodiment, a typical sequence for charger/power supply operation is as follows:

- The mobile device charger or power supply can be in a low power status normally, thus minimizing power usage.
- Periodically, each of the coils (or a separate data coil in another PCB layer) is powered up in rotation with a short signal such as a short radiofrequency (RF) signal that can activate a signal receiver in the receiver such as an RF ID tag or a circuitry connected to the receiver coil.
- The mobile device charger/power supply then tries to identify a return signal from any mobile device, battery (or any receiver) that may be nearby.
- Once a mobile device, or battery (or a receiver) is detected, the mobile device charger or power supply and the mobile device or battery to proceed to exchange information.
- This information can include a unique ID code that can verify the authenticity and manufacturer of the charger or power supply and mobile device or battery, the voltage requirements of the battery or the mobile device, and the capacity of the battery. For security purposes or to avoid counterfeit device or pad manufacture, such information can be encrypted, as is common in some RFID tags or other verification systems.

In accordance with various embodiments, other protocols such as Near Field Communications (NFC) or Felica can be used, wherein the circuitry containing the ID and the necessary information is powered either by the mobile device or battery or remotely by the mobile device charger or power supply. Depending on the particular implementation needs, Bluetooth, WiFi, Wireless USB, and other information transfer processes can be used. Additional information regarding the charging profile for the battery can also be exchanged and can include parameters that are used in a pre-programmed charge profile stored in the mobile device or battery charger. However, the information exchanged can be as simple as an acknowledge signal that shows the mobile device charger that a mobile device or rechargeable battery is present. The charger or power supply can also contain means for detection and comparison of the strength of the signal over different locations on the charger or power supply. In this way, it can determine the location of the mobile device or battery on the charger or power supply, and then proceed to activate the appropriate region for charging or powering.

In some embodiments that require greater simplicity, no communication need take place between the mobile device charger or power supply and the mobile device or battery. In some embodiments the mobile device charger or power supply can sense the mobile device or battery by detecting a change in the conditions of a resonant circuit in the mobile device charger or power supply when the mobile device or battery is brought nearby. In other embodiments the mobile device or battery can be sensed by means of a number of proximity sensors such as capacitance, weight, magnetic, optical, or other sensors that determine the presence of a mobile device or battery near a coil in the mobile device or battery charger or power supply. Once a mobile device or battery is sensed near a primary coil or section of the mobile device or battery charger or power supply, the mobile device charger or power supply can then activate that primary coil or section to provide power to the receiver coil in the mobile device's battery, shell, receiver module, battery, or the device itself.

Inductive Charging Circuit

Each mobile device and its battery has particular characteristics (voltage, capacity, etc.). In order to facilitate these different devices or batteries with a single universal mobile device charger or power supply, several circuit architectures are possible, some of which are described in further detail below.

Figure 2:
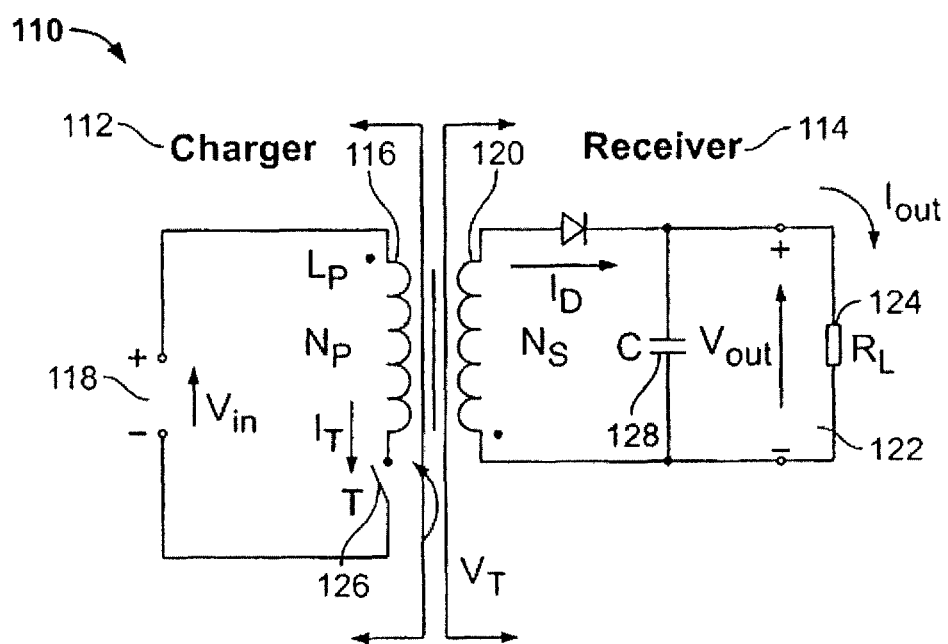
FIG. 2 shows a figure of a circuit diagram in accordance with an embodiment.

FIG. 2 shows the main components of a typical inductive power transfer system 110. The circuit illustrated is used to illustrate the principle of inductive power transfer and is not meant to be limiting to an embodiment. In accordance with an embodiment, the charger 112 comprises a power source 118, and a switch T 126 (which can be a MOSFET or other switching mechanism) that is switched at an appropriate frequency to generate an AC voltage across the primary coil Lp 116 and generate an AC magnetic field. This field in turn generates a voltage in the coil 120 in the receiver 114 that is rectified and then smoothed by a capacitor to provide power 122 to a load RI 124. For ease of use, a receiver can be integrated with a mobile device, such as integrated inside the mobile device or attached to the surface of the mobile device during manufacture, to enable the device to receive power inductively from a mobile device charger or integrated into, or on its battery.

In accordance with an embodiment, the circuit shown in FIG. 2 can receive energy fed to it from a power source, store the energy alternately in the inductor and the timing capacitor (much like a tank stores liquid), and subsequently produce an output as a continuous alternating current (AC) wave. As the voltage is applied to the primary side, the tank circuit supplies the energy to the receiver. One of the benefits of such a design is that the timing capacitor in the circuit can be easily replaced. For example, if a relatively higher value for capacitance (referred to in some instances as a timing capacitance) is used, then the frequency of operation is lowered. This increases the on-time for the circuit, and provides longer power transfer and current through the transformer, and thus more power. As such a higher value of capacitance can be used for high power applications. Conversely, if a relatively lower value for capacitance is used, then the frequency of operation is increased. This reduces the on-time and provides less power transfer and current through the transformer, and thus less power. Thus, a lower value of capacitance can be used for low power applications. Replacing the timing capacitance can be easily handled during manufacturing to tune the power requirement on a macro level, i.e. to get the output into an appropriate range for the chosen application. Additional techniques can then be used to set the voltage output on a more accurate basis.

The mobile device or its battery typically can include additional rectifier(s) and capacitor(s) to change the AC induced voltage to a DC voltage. This is then fed to a regulator/charge management chip which includes the appropriate information for the battery and/or the mobile device. The mobile device charger provides power and the regulation is provided by the mobile device. The mobile device or battery charger or power supply, after exchanging information with the mobile device or battery, determines the appropriate charging/powering conditions to the mobile device. It then proceeds to power the mobile device with the appropriate parameters required. For example, to set the mobile device voltage to the right value required, the value of the voltage to the mobile device charger can be set. Alternatively, the duty cycle of the charger switching circuit or its frequency can be changed to modify the voltage in the mobile device or battery. Alternatively, a combination of the above two approaches can be followed, wherein regulation is partially provided by the charger or power supply, and partially by the circuitry in the receiver.

Inductive Charger Pad

To allow the operation of the mobile device or battery charger or power supply regardless of position of the mobile device or battery, the total area of the mobile device or battery charger or power supply can be covered by coils or by another wire geometry that creates magnetic field.

Figure 3:
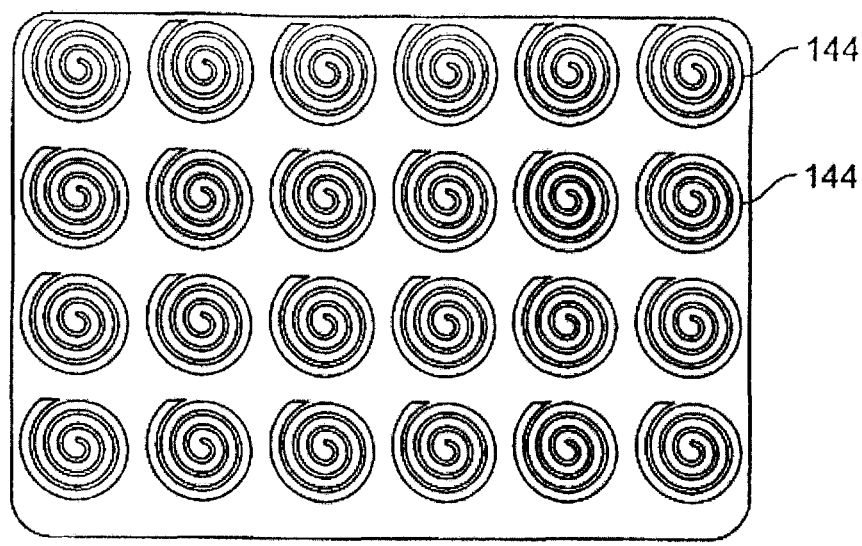
FIG. 3 shows a charging pad using multiple coils in accordance with an embodiment.

FIG. 3 shows a charging pad using multiple coils in accordance with an embodiment. As shown in FIG. 3, in accordance with an embodiment the pad 140 is largely covered with individual receiver coils 144.

Figure 4:
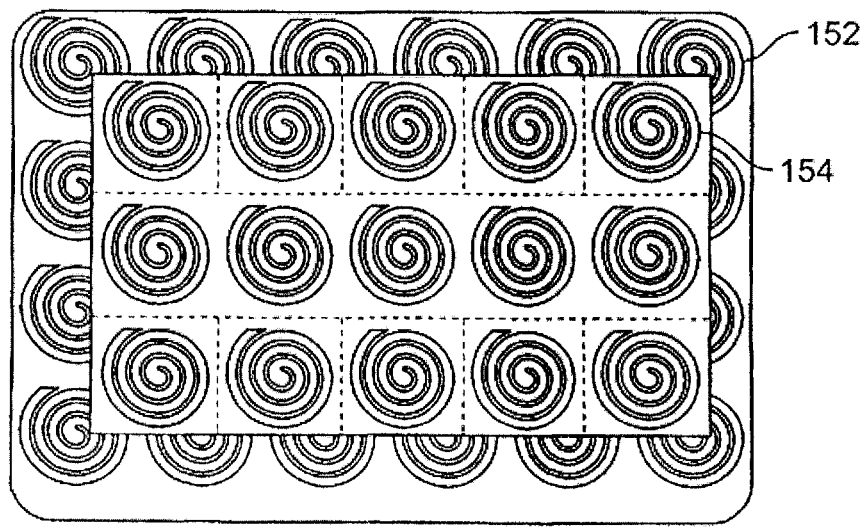
FIG. 4 shows a charging pad using multiple overlapping coil layers in accordance with an embodiment.

FIG. 4 shows a charging pad using multiple overlapping coil layers in accordance with an embodiment. This embodiment addresses the problem of voids between the multiple coils. As shown in FIG. 4, any areas of the pad 150 with minimal magnetic field between a first set of coils 152 can be filled by a second set of coils 154, so that the coils are tiled such that the centers of this coil array fill the voids in the primary set. This second set can be at a different layer of the same PCB, or in a different PCB. In each of these geometries, the sensing circuitry can probe each location of a coil in a raster, predetermined, or random fashion. Once a mobile device or battery on or near a coil is detected, that coil is activated to provide power to the receiving unit receiver of the appropriate device.

It can be seen from the above example that by providing more layers of the PCB with coils, or by providing coils of different geometry or size, one can obtain as much resolution or coverage as desired.

In accordance with an embodiment, to power mobile devices or batteries with power requirements that exceed maximum powers attainable by typical coils in a surface, the mobile device or battery, during its hand shake and verification process can indicate its power/voltage requirements to the mobile device or battery charger or power supply. Several geometries for achieving power/voltage levels otherwise not attainable from a single primary coil of the mobile device or battery charger or power supply are possible.

In accordance with one embodiment of the system geometry, the power receiving unit of the mobile device or battery has several coils or receiving units that are connected such that the power from several primary coils or sets of wires of the mobile device or battery charger or power supply can add to produce a higher total power. For example, if each primary coil is capable of outputting a maximum of 10 Watts, by using six primary coils and six receiver coils, a total output power of 60 Watts can be achieved. The number of primary and receiver coils need not be the same, and a large receiver coil (receiving unit) that is able to capture the majority of magnetic flux produced by 6 or other number of primary coils or a large primary coil powering six or another number of receiver coils can achieve the same effect. The size and shape of the multiple primary coils and receiver coils also do not need to be the same. Furthermore, neither set of primary and receiver coils need to be in the same plane or PCB layer. For example, the primary coils in the examples shown above can be dispersed such that some lay on one PCB plane and the others in another plane.

In accordance with another geometry, the PCB of the mobile device or battery charger or power supply has multiple layers, wherein coils or wire patterns of certain size and power range can be printed on one or more layers and other layers can contain coils or wire patterns of larger or smaller size and power capability. In this way, for example, for low power devices, a primary from one of the layers will provide power to the mobile device or battery. If a device or battery with higher power requirements is placed on the pad, the mobile device or battery charger or power supply can detect its power requirements and activate a larger coil or wire pattern with higher power capabilities or a coil or wire pattern that is connected to higher power circuitry. One may also achieve similar results by using a combination of the different processes and geometries described above.

Figure 5:
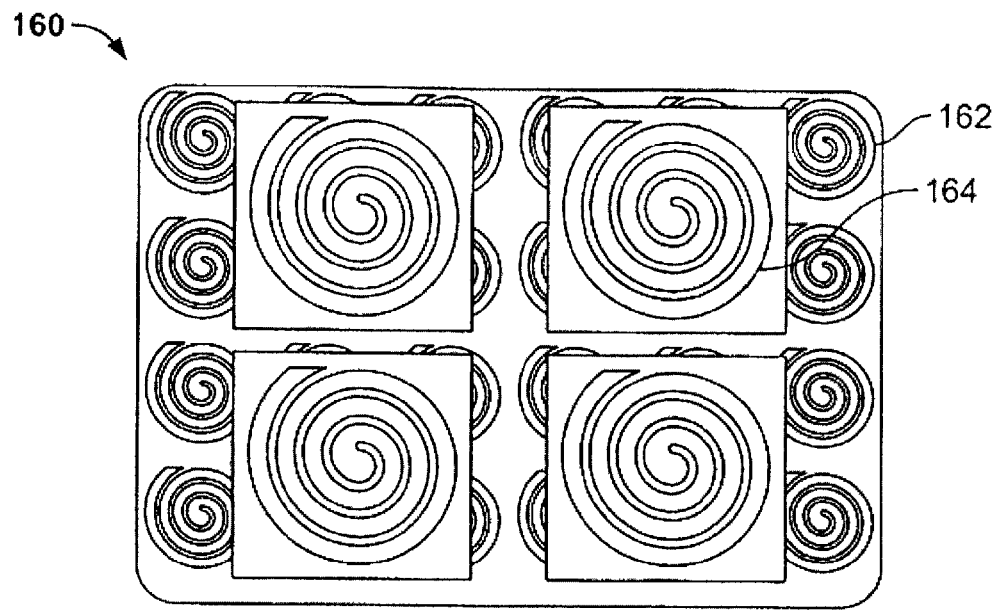
FIG. 5 shows the use of multiple coil types and sizes in overlapping pad layers in accordance with an embodiment.

FIG. 5 shows the use of multiple coil types and sizes in overlapping pad layers in accordance with an embodiment. As shown in FIG. 5, the mobile device or battery charger or power supply or pad 160 can comprise two overlapping layers with a first layer 162 containing low power coils, and a second layer 164 containing high power coils.

Inductive Charging Receiver

As described above, the inductive charging or power supply pad is used to power a receiver, which in turn is used to power or to charge a portable or mobile device or battery. In accordance with one embodiment of the receiver, the power from the mobile device or battery charger or power supply is emitted at a magnitude that is sufficient to power any foreseeable mobile device or battery (such as 5 W or 10 W for small mobile devices or batteries). The receiver that is appropriate for each mobile device or battery has a power receiving part that when matched to the mobile device or battery charger or power supply is able to receive sufficient power for the mobile device or battery. For example a receiver for a mobile phone requiring 2.5 W can be a coil with certain diameter, number of turns, wire width, etc. to allow receipt of the appropriate power. The power is rectified, filtered, and then fed into the battery or power jack of the device. As discussed above, a regulator or charge management circuit can be used before the power is provided to the battery or the mobile device.

To save energy, the power emitted by the mobile device or battery charger or power supply can be regulated. It is desirable to regulate the power emitted by the charger or power supply because if the charger or power supply is emitting 10 W of power and the receiver is designed to receive 5 W, the rest of the emitted power is wasted. In one embodiment, the receiver or the mobile device can, through an electrical (such as RF), mechanical, or optical method, inform the charger or power supply about the voltage/current characteristics of the device or battery. The primary of the charger or power supply in the circuit diagrams shown above then can be driven to create the appropriate voltage/current in the receiver. For example, the duty cycle of the switch in that circuit can be programmed with a microprocessor to be changed to provide the appropriate levels in the receiver.

In accordance with an embodiment, the programming can be performed by a look up table in a memory location connected to a microprocessor or by using an algorithm pre-programmed into the microprocessor. Alternatively, the frequency of the switch can be changed to move the circuit into, and out of, resonance to create the appropriate voltage in the receiver. In an alternate geometry, the voltage into the circuitry in the primary can be changed to vary the voltage output from the receiver. Furthermore, the induced voltage/current in the mobile device can be sensed and communicated to the charger to form a closed-loop, and the duty cycle, frequency, and/or voltage of the switch can be adjusted to achieve the desired voltage/current in the mobile device.

In accordance with an embodiment, the receiver is built onto or into the battery for the mobile device. The receiver can include one or more coils or wires shaped to receive power from the charger or power supply. The one or more coils or wires can be either printed on one or more PCBs, or formed from regular wires. As described above, the receiver can also contain rectifier(s) and capacitor(s) to produce a cleaner DC voltage. This output can be directly, or through a current limiting resistor, connected to one of the contacts on the battery. To avoid overcharging the battery, a battery regulator or charge management chip can also be used. This circuit then measures the various parameters of the battery (voltage, degree of charging, temperature, etc.) and uses an internal program to regulate the power drawn from the circuit to ensure over-charging does not occur. The circuit can also include LEDs to show the receiver being in the presence of a magnetic field from the charger, complete charge LEDs and/or audible signals.

In typical commercial and end-user applications, such as in cell phones, PDAs, and MP3 players, the battery can be incorporated into the battery pack or the device by the original equipment manufacturer (OEM), or as an after-market size and shape compatible battery pack that can replace the original battery pack. The battery compartment in these applications is typically at the bottom of the device. The user can open the battery compartment, take out the conventional battery, replace it with a modified battery in accordance with an embodiment, and then replace the battery lid. The battery can then be charged inductively when the mobile device is placed adjacent a mobile device charger.

To enhance the ability of the receiver to receive power, it may be desirable to minimize the distance between the charger's primary coil and the receiver's coil or wire. In order to achieve this, in accordance with an embodiment the receiver's coil or wire can be put on the outside of the battery pack.

Figure 6:
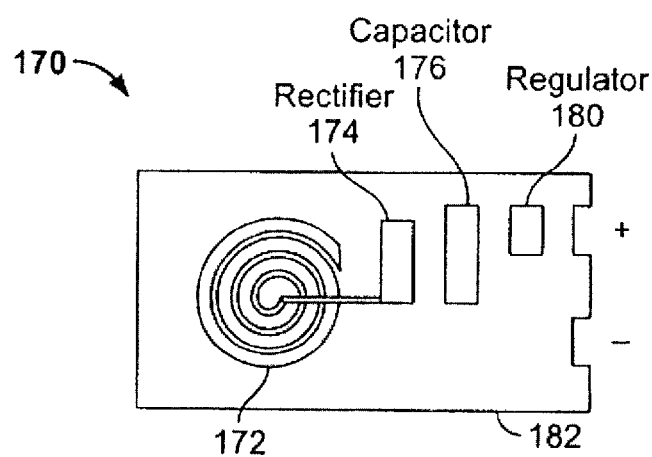
FIG. 6 shows a receiver with an integrated battery in accordance with an embodiment.

FIG. 6 shows a battery with an integrated receiver in accordance with an embodiment. As shown in FIG. 6, the receiver 170 comprises the battery 182, together with the receiver coil 172, and any rectifiers 174, capacitors 176, regulators or charge management chips 180 necessary for proper operation of the charging receiver. If the battery compartment lid of the device prevents a power receiving light emitting diode (LED) to be seen, the lid can itself be replaced with a see-through lid or a lid with a light pipe that will allow the user to see the charging indicator LED when the mobile device is placed adjacent to the charger.

In an alternative embodiment, the receiver battery can include a mechanical, magnetic, or optical method of alignment of the coils or wires of the charger and mobile device for optimum power transfer. In accordance with an embodiment, the center of the primary in the charger contains a magnet such as a cylinder or disk or ring with the poles parallel to the charger surface and the magnetic field perpendicular to the charger surface. The receiver also contains a magnet or magnetic metal part of a similar or different shape behind or in front of the coil or wire receivers. When the mobile device or battery is placed on or adjacent to the charger or power supply, the magnets attract and pull the two parts into alignment with the centers of the two coils or wires aligned. The magnets do not need to be especially strong to actively do this. Weaker magnets can provide guidance to the user's hand and largely achieve the intended results. Alternatively, audible, or visual signs (for example an LED that gets brighter as the parts are closer aligned), or mechanical means (dimples, protrusions, etc.) can be used for alignment.

In accordance with another embodiment, the coil or wires and the magnet in the charger or power supply are mechanically attached to the body of the charger or power supply such that the coil can move to align itself appropriately with the mobile device or battery when it is brought into close proximity to the charger or power supply. In this way, an automatic alignment of coils or wire patterns can be achieved.

In another embodiment, the receiver electronics described above are preferably made from flexible PCB which can be formed into a curved shape. Such a PCB can be placed on the surface of a battery pack, including one that is not flat, or that has a curved shape. The curve on the battery or back of a mobile device battery lid can be matched to a curved primary in the mobile device or battery charger or power supply and be used for alignment. One example of usage of this embodiment can be for example flashlights that have circular handles: the batteries can be charged with coils on the side of circular batteries, or circling the cylindrical battery. Similarly, the mobile device or battery charger or power supply can have a curved shape. For example, the charger or power supply surface can be in the shape of a bowl or some similar object. A mobile device or battery that may have a flat or curved back can be placed into the bowl. The shape of the bowl can be made to ensure that the coil of the mobile device or battery is aligned with a primary coil to receive power.

In another embodiment, the primary can be incorporated into a shape such as a cup. A mobile device can be placed into the cup standing on end and the receiver can be built-in to the end of the mobile device (such as a mobile phone) or battery or on the back or circumference of the device or battery. The receiver can receive power from the bottom or wall of the cup.

In another embodiment, the primary of the charger can have a flat shape and the mobile devices or battery can be stood up to receive power. The receiver is built into the end of the device or battery in this case and a stand or some mechanical means can be incorporated to hold the device or battery while being charged.

In another embodiment, the charger or power supply can be made to be mounted on a wall or a similar surface, vertically or at an angle (such as on a surface in a car), so as to save space. The charger or power supply can incorporate physical features, magnets, fasteners or the like to enable attachment or holding of mobile devices to be charged. The devices or batteries to be charged or powered can also incorporate a retainer, magnet, or physical shape to enable them to stay on the'charger or power supply in a vertical, slanted, or some other position. In this way, the device or battery can be charged or powered by the primary while it is near or on it.

For those applications where the lid of the battery compartment or the bottom part of the mobile device is made from a metal, a replacement non-metallic lid or backing can be used. Alternatively, the coil can be attached to the outside of the metal surface. This allows electromagnetic (EM) fields to arrive at the power receiver coil or wires. The rest of the receiver (i.e. circuitry) can be placed behind a metal for the receiver to work. In some other applications where the battery has metal parts, these parts may interfere with the EM field and the operation of the coil in the receiver. In these cases, it may be desirable to provide a distance between the metal in the battery and the coils. This can be done with a thicker PCB or battery top surface. Alternatively, to provide additional immunity, ferrite material (such as those provided by Ferrishield Inc.) can be used between the receiver and the battery to shield the battery or device from the EM fields. These materials can be made so as to be thin, and then used during the construction of the integrated battery/receiver.

In accordance with another embodiment, the receiver in the battery or mobile device also includes a means for providing information regarding battery manufacturer, required voltage, capacity; current, charge status, serial number, temperature, etc. to the charger. In a simplified embodiment, only the manufacturer, required voltage, and/or serial number is transmitted. This information is used by the charger or power supply to adjust the primary to provide the correct charge or power conditions. The regulator or charge management chip in the receiver can then regulate the current and the load to charge the battery correctly and can end charge at the end. In another embodiment, the receiver can control the charging process fully depending on the time dependent information on battery status provided to it. Alternatively, the charging process can be controlled by the charger in a similar manner. As described above, the information exchange between the charger and the receiver can be through an RF link or an optical transmitter/detector, RFID techniques, Near-Field Communication (NFC), Felica, Bluetooth, WiFi, or some other method of information transfer. Similarly, the receiver can send signals that can be used by the charger to determine the location of the receiver to determine which coil or section of the charger or power supply to activate. The communication link can also use the same coil or wires as antenna for data transfer or use a separate antenna. In some embodiments the received can use the actual capabilities of the mobile device (for example, the built-in Bluetooth or NFC capabilities of mobile phones) to communicated with the charging or power supply pad.

As described above, in accordance with some embodiments the receiver can be integrated into the body of the device or battery itself at a location that may be appropriate and can be exposed to EM radiation from outside. The output of the receiver can be routed to the electrodes of the battery internally inside the device and appropriate circuitry inside the device can sense and regulate the power. The device can include LEDs, messages, etc. or audible signs that indicate to the user that charging is occurring or complete or indicate the strength of the received power (i.e. alignment with a primary in the charger) or the degree of battery charge. In other embodiments, the receiver is built into an inner or outer surface of a component that is a part of the mobile device or battery's outer surface where it is closest to the charger. This can be done as original equipment or as an after-market item. The component can be the lid of the battery pack or the bottom cover of the mobile device. In yet other embodiments, the receiver can be integrated into the back or front of the battery compartment or an interchangeable shell for the mobile device for use in after-market applications. For example, in a mobile phone application, the back battery cover or shell can be removed and replaced with the new shell or battery cover with the receiver built in.

Figure 7:
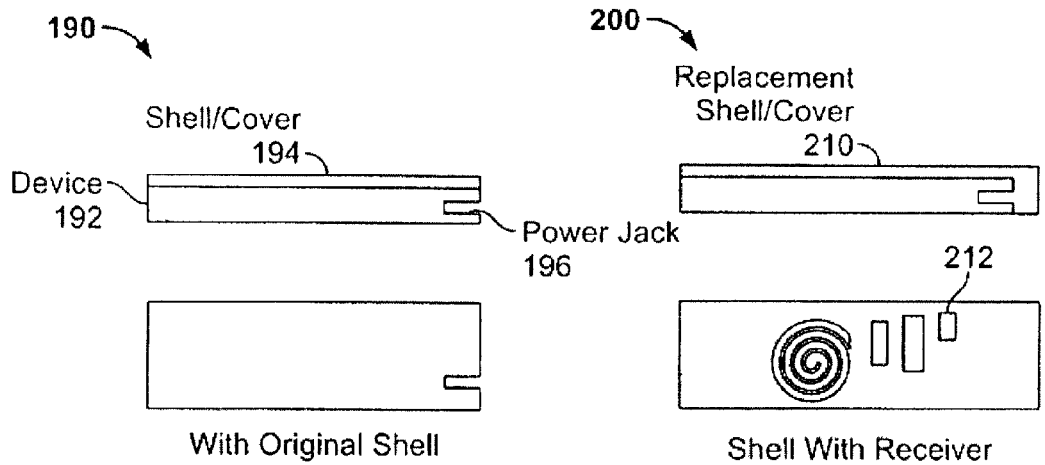
FIG. 7 shows a coupling of receiver with a device to be charged or powered in accordance with an embodiment.

FIG. 7 shows a coupling of receiver with a device to be charged or powered in accordance with an embodiment. As shown in FIG. 7, the original mobile phone setup 190 includes a device 192 with shell 194 and power jack 196. The after-market modification 200 replaces the original shell with a combination shell 210 that includes the necessary receiver coils and battery couplings. The contacts from this circuitry can then make direct contact to the battery electrodes inside the mobile device or to some contact points inside the mobile device if such contacts exist or become provisioned by the device manufacturer during manufacture. Alternatively, the receiver may be a component (such as a shell) that has a connector that plugs into the input power jack of the mobile phone or electrodes of a battery. The receiver can be fixed to, or detachable from, the mobile device or battery. This can be achieved by having a plug that is attached either rigidly or by a wire to the receiver (shell). Alternatively, the replacement receiver (shell) can be larger than the original shell and extend back further than the original shell and contain the plug so that when the receiver (shell) is attached, simultaneously, contact to the input power jack is made. Alternatively, the receiver (shell) can have a pass-through plug so that while contact is made to this input power connector, the connector allows for an external regular power supply plug to be also used as an alternative. Alternatively, instead of a pass-through, this part can include a power jack in another location in the back so that a regular power supply can be used to charge the battery. In cases where the connector to the device performs other functions such as communication to the device, a pass-through connector can allow communication/connectivity to the device.

In accordance with another embodiment, the replacement receiver (i.e. the replacement shell) or the plug in unit, in addition to the power receiver components and circuitry, can include additional circuitry that can provide further functionalities to the mobile device. These can include, for example, the ability to exchange data through Bluetooth, WiFi, NFC, Felica, WiMax, RFID, or another wireless or optical mechanism. It can also provide extended functionalities such as Global Positioning System (GPS) location information, flashing lights, flashlight, or other decorative or electronic functions. As described above, various methods for improving coil alignment, or location, battery manufacturer, or battery condition information transfer can also be integrated into the receiver or replacement shell.

In another embodiment, the receiver is supplied in the form of a separate unit that is attached to the input jack of the mobile device or battery or integrated into a receiver protective skin for the mobile device. Many leather or plastic covers for mobile phones, cameras, and MP3 players already exist. The primary purpose of these covers is to protect the device from mechanical scratches, shocks, and impact during daily use. However, they typically have a mere decorative or advertising application. In accordance with one embodiment, the receiver is formed of a thin PCB with the electronics formed thereon, and the receiver coil or wire that is attached to the back of the device and plugs into the input jack similar to the shell described above. Alternatively, it can be connected through a flexible wire or flexible circuit board that is routed to a plug for the input power jack.

In accordance with another embodiment, the receiver can be a separate part that gets plugged into the input jack during charging and is placed on the charger and can then be unplugged after charging is finished.

In another embodiment, the receiver is built in the inside or outside surface or in between two layers of a plastic, leather, silicone, or cloth cover for the mobile device and plugs in or makes contact to the contact points on the device.

It will be noted that certain devices such as notebooks and some music players have metal bottom surfaces. The methods described above for changing the back surface or use of a plug in the mobile device or a secondary skin with an integrated receiver is particularly useful for these applications. As described previously, the effect of the metal surface can also be minimized, if necessary, by increasing the distance between the wires of the receiver and the metal surface or by placing a ferrite layer in between the receiver and the metal bottom.

It is also noted that the use of methods such as curving the receiver or integrating magnets, LEDs, audio signals or messages, etc. for alignment, or methods for location, manufacturer or charging condition identification, as described above are possible with all embodiments of an embodiment described above. In any of the above cases, the charger or power supply can contain lights, LEDs, displays, or audio signals or messages to help guide the user to place the mobile device or battery on a primary coil for maximum reception, to show charging is occurring, and to show the device is fully charged. Displays to show how full the battery is or other information can also be incorporated.

Flexible/Modular Charging Pad

In accordance with an embodiment a flexible mobile device charger or power supply is provided in the shape of a pad that can be folded or rolled up for carrying. In one implementation of an embodiment, the electronics of the charger or power supply are placed on a thin flexible PCB or the coils are made of wires that can be rolled up or shaped. The electronics components made of silicon chips, capacitors, resistors and the like may not be flexible but take up very little space. These rigid components can be mounted on a flexible or rigid circuit board, while the main section of the pad containing the coils or wires for energy transfer can be made to be flexible to allow conformity to a surface or to be rolled up. Thus the pad resembles a thin mouse pad or the like.

In some cases, it may be advantageous to the user to have a mobile device charger or power supply that is extendible in functionalities. The cases include but are not limited to:

A user may purchase a mobile device or battery charger or power supply for charging or powering a single low power device or battery but, at a later stage, may want to extend the capability to charge or power more devices or batteries simultaneously.

A user may purchase a mobile device or battery charger or power supply for charging or supplying power to one or more low power devices or batteries but may want to charge or supply power to more low power or high power devices or batteries.

A user may buy a mobile device or battery charger or power supply that can charge or supply power to one or more low-power or high-power devices or batteries and later wish to have the communication or local storage, or a rechargeable battery, or means of power generation such as solar panels or some other capability, added to the charger or power supply.

In all of the cases above and others, it can be useful to have a modular approach to expand the capabilities of the mobile device or battery charger or power supply.

Figure 8:
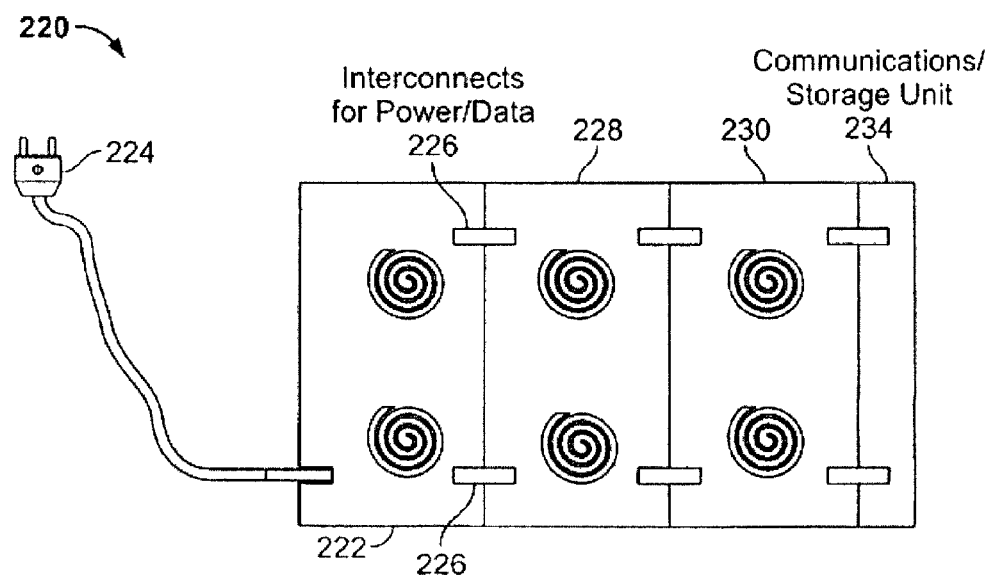
FIG. 8 shows a pad allowing modular or multiple connectivity in accordance with an embodiment.

FIG. 8 shows a pad 220 in accordance with an embodiment that allows for modular or multiple connectivity. In this case, the user can purchase a first unit 222 that is powered by an electric outlet 224. However, interconnects 226 for power and data are provided so that additional units 228, 230 can simply fit or plug into this first one directly or indirectly and expand the capabilities as the customer's needs grow. Data communications and storage units 234 can also be attached in a modular fashion. This approach would enable the customer to use the technology at a low cost entry point and grow his/her capabilities over time.

Some of the electronics devices that can benefit from these methods include: mobile phones, cordless phones, personal data assistants (PDAs), pagers, walkie-talkies, other mobile communication devices, mobile electronic mail devices, Blackberry's, MP3 players, CD players, DVD players, game consoles, headsets, Bluetooth headsets, hearing aids, head-mounted displays, GPS units, flashlights, watches, cassette players, laptops, electronic address books, handheld scanning devices, toys, electronic books, still cameras, video cameras, film cameras, portable printers, portable projection systems, IR viewers, underwater cameras or any waterproof device, toothbrushes, shavers, medical equipment, scientific equipment, dental equipment, military equipment, coffee mugs, kitchen appliances, cooking pots and pans, lamps or any battery, DC, or AC operated device.

In addition, inductive power transfer can provide power to devices that are not so far battery operated. For example, a mobile device charger or power supply in the shape of a pad placed on a desk or a kitchen table can be used to power lamps or kitchen appliances. In one embodiment for the use in a kitchen, a flat charger, or power supply such as a pad, placed on or built into a counter can allow the chef to place devices on the charger or power supply to be inductively charged or powered during use and simply place them away after use. The devices can be, for example, a blender, mixer, can opener, or even pot, pan, or heater. This can eliminate the need for a separate cooking and work area. It will be noted that placement of a metal pan close to the inductive pad can directly heat the pan and the contents while keeping the charger or power supply surface cool. Due to this reason, inductive kitchen ranges have been commercialized and shown to be more efficient than the electric ranges that work by resistive heating of a coil.

In another embodiment, rather than direct heating of metal pans by nearby inductive fields, cooking pans may include a receiver and heating or even cooling elements. Once placed on a charger, the pan will heat up or cool down as desired by a dial or the like on the pan allowing precise temperature control of the pan and the contents.

Similarly, in an office or work area setting, if a charger or power supply is readily available for charging or powering mobile devices or batteries, it can also be used to power up lamps for illumination of the desk or used to power or charge office appliances, such as fax machines, staplers, copiers, scanners, telephones, and computers. In one embodiment, the receiver can be built into the bottom of a table lamp and the received power is used to power the incandescent or LED lamp.

In another embodiment, a mug, cup, glass, or other eating appliance such as a plate can be fitted with a receiver at its bottom. The received power can be used to heat the mug, etc. with a heating coil thus keeping beverages or food warm to any degree desired. Furthermore, in accordance with an embodiment, by use of devices such as thermoelectric coolers the contents can be cooled or heated as desired.

Similarly, many children's toys often run out of battery power due to extended use or simple forgetfulness to turn the device off. Often these batteries are included inside a battery compartment that for safety reasons can only be opened by a screwdriver. Inclusion of the receiver into toys or batteries inside can reduce the need to change the device batteries and allow recharging with a much simpler method.

In another implementation, the receiver can be built into medical devices or their batteries that are implanted or inserted in the body. Since batteries in these devices such as pace makers, cochlear implants, hearing aids, or other monitoring devices may need periodic charging, inductive power transfer can provide an ideal non-contact method for charging and testing the performance of the devices (i.e. check up) or downloading data that the devices have logged.

In another implementation, some active RFID tags include batteries that can send out information about the status or location of a package or shipment. An inexpensive method for charging these tags is to include a receiver with each tag. Thus, a charger can be used to power or charge these RFID tags.

It will be noted that the effective working distance of the inductive charger is dependent on the power and the frequency of the source and the size and geometry of the coil. By increasing the frequency to several or tens of MHz, one can obtain a working distance of several inches or feet depending on the application for the technology. It will also be noted that any of the above embodiments that eliminate the input power jack are especially important because they add to product reliability by removing a source of mechanical or environmental failure. In addition, elimination of the jack is imperative for water proof applications and for extra safety.

Efficiency Enhancements Through Coil Circuit

In accordance with an embodiment, in order for the power efficiency to be maximized and to minimize losses in the coil, the coils should be manufactured to have as low a resistance as possible. This can be achieved by use of more conductive material such as gold, silver, etc. However the costs of these materials are sometimes prohibitive. In practice, reduced resistivity can be obtained by using thicker copper-clad PCBs or wider tracks. Most common PCBs use 1-2 oz copper PCBs. In accordance with some embodiments the coil PCB used for the wireless charger can be made from PCBs clad with between 2 and 4, or even 6 oz copper. The process of manufacture of the PCB can also be optimized to achieve higher conductivity. For example, sputtered copper has a higher conductivity than rolled copper and is typically better for this application. In operation, the coil and the circuitry demonstrate a resonance at a frequency determined by the parameters of the design of the coil (for example, the number of windings, coil thickness, width, etc.). Previous work has concentrated on circuits driven by square waves with a MOSFET. This approach has the disadvantage that since a square wave is not a pure sinusoid, it produces harmonics. These harmonics are undesirable because:

The PCB coil produces optimum power transfer efficiency at a particular frequency. The harmonics in the primary signal are not transferred as efficiently and decrease the overall system efficiency.

The rapid voltage change in the leading and falling edge of the square wave creates oscillations that create further harmonics resulting further EMI.

The harmonics radiated by the primary create higher frequency components that contribute to the EMI that is more radiative (due to higher frequency). It is desirable to limit the frequency range of the operation of the overall system to as low a frequency as possible while maintaining the other requirements of the system (such as sufficient working distance, etc.), so these harmonics must be avoided.

At the instance of switch turn-on and turn-off, the change in the in-rush current to the coil causes huge voltage swings across the coil for a short period of time. All the power is transferred to the receiver during these times that are short.

Previous attempts to achieve 90% transfer efficiency with PCB coil primary and receiver have used a laboratory power supply to drive their circuit. While this approach has demonstrated the higher efficiency that can be achieved with a sinusoidal voltage on the coil, such power supplies are complex, costly, and too large to be able to be used for any practical charger application. In accordance with an embodiment, a capacitor is added in parallel to the drain/source contacts of the MOSFET.

Figure 9:
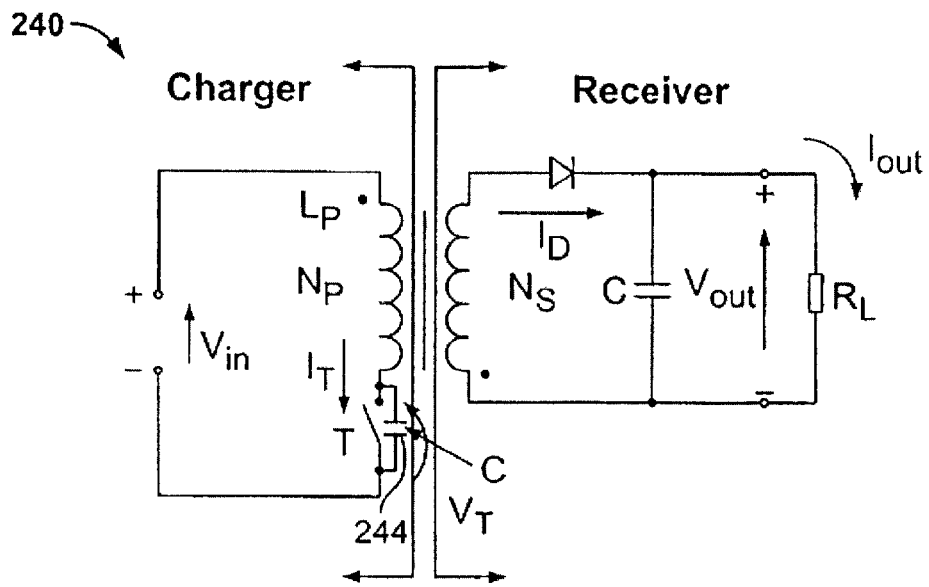
FIG. 9 shows a figure of a circuit diagram in accordance with an embodiment.

FIG. 9 shows a figure of a circuit diagram 240 in accordance with an embodiment. The coil in the wireless charger system is driven by switching the FET at the resonance frequency of the circuit when the receiver is present. Without the receiver nearby, the circuit is detuned from resonance and radiates minimal EMI. The capacitor 244 acts as a reservoir of energy that discharges during switch off time and enhances energy transfer. As with the examples described above, changing the value of the capacitance allows for tuning the power and efficiency levels on a lower-power/high-power basis, and additional features and techniques can be used to fine tune the power output for particular devices.

The circuit designs illustrated in FIG. 2 and FIG. 9 use a zero-crossing power supply. Briefly, in a zero-crossing power supply, when the transistor in the primary coil is first turned on, electrical current passes through the primary coil and the transistor to ground. When the transistor is then turned off, the voltage level at the transistor swings high (for example, if the input voltage is 5V, then the voltage level may swing to 10V, or even 100V). A non-zero-crossing circuit allows the current to drop to zero, before the cycle is restarted. A forward mode circuit can then use an inductor in series with the load to revive the current and charge up the inductor, while a diode allows charging in both directions (when full phase AC is used).

In a traditional transformer design, zero-crossing is not used, since it invariably results in lower efficiency compared to non-zero designs, at least with higher power or ferrite cores. This is primarily because the traditional ferrite cores act as capacitors and store energy, which in turn reduces the circuit efficiency. As described above, in accordance with an embodiment, when a non ferrite coil there is no magnetic flux, so the efficiency is not affected to the same extent.

Furthermore, since the system does not use a ferrite or ferromagnetic core, the overall size and weight of the device can be reduced. In accordance with some embodiments the coil can be formed on a printed circuit board (PCB), with no heavy ferrite coils, no soldering and no wiring to the coils. In accordance with some embodiments there is no need for a magnetic core in the secondary in the receiver. Since magnetic cores are usually large and heavy this results in considerable size savings.

By way of example, in accordance with an embodiment that uses an IRFR0220 chip as a FET and use 4 oz copper coils with 9 turns and 1.25" diameter, the circuit in FIG. 2 above, can be loaded with RL of 10 Ohm and tuned to operate at 1.3 MHz. With matching coils in the primary and secondary in the receiver, without capacitor C, total circuit efficiency of the circuit including the clock and FET driver circuit approaches 48%. Addition of a 1600 pF capacitor in parallel to the FET increases the total circuit efficiency to 75% (a better than 50% increase in efficiency), while simultaneously decreasing the voltage across the FET and also the harmonics in the circuit. The coil to coil transfer efficiency with the capacitor placed in parallel with the FET is estimated to be approximately 90%. The advantages of this approach include:

High efficiency (~90% coil to coil).
  Low ringing oscillation and EMI.
  Simplicity and low cost.
  Lower FET source-drain voltage swing allowing use of a larger selection of FETs.

In many applications, it is also desired that the pad and the receiver are arranged so that the pad does not emit power unless the receiver is nearby.

Figure 10:
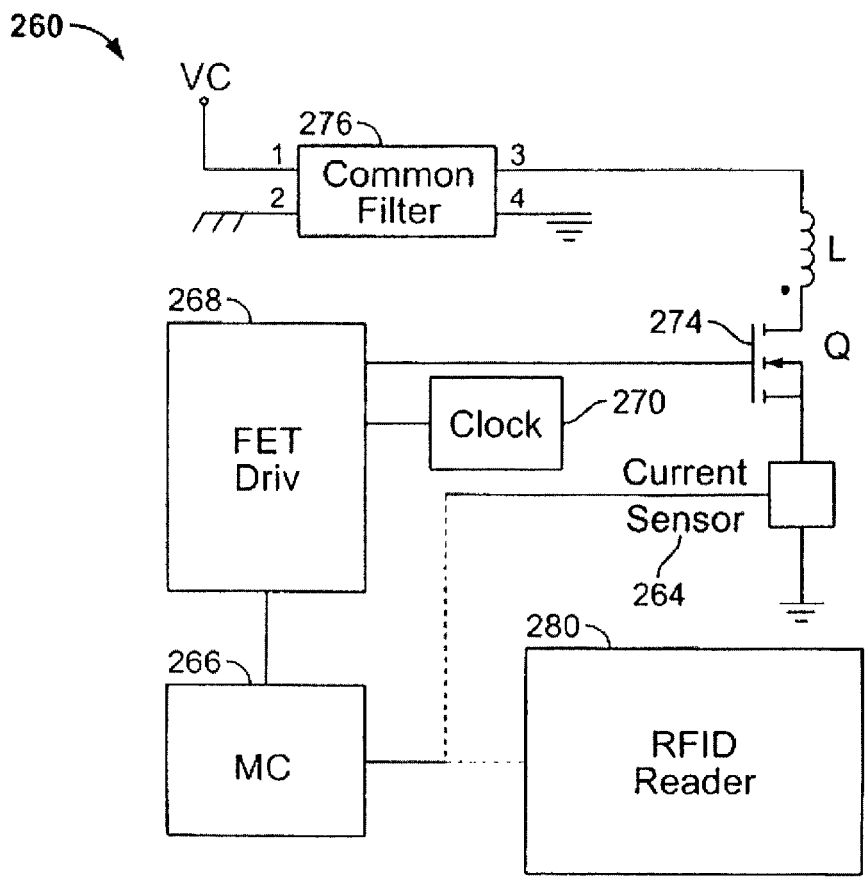
FIG. 10 shows a figure of a circuit diagram in accordance with an embodiment.
Figure 11:
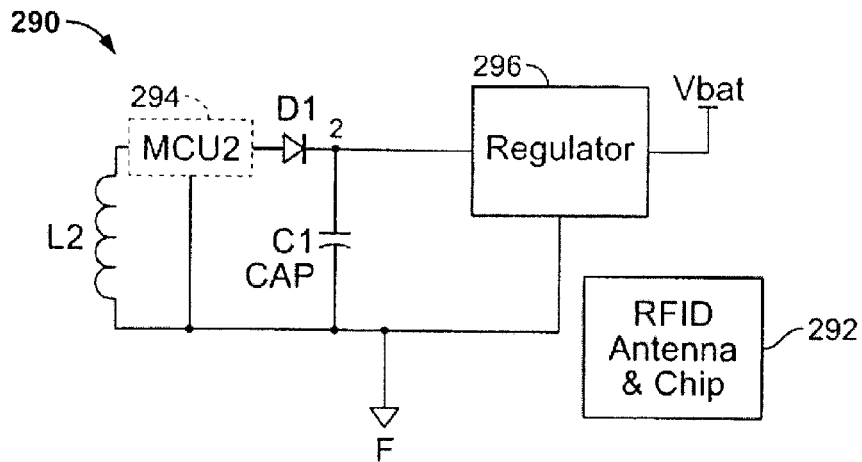
FIG. 11 shows a figure of a circuit diagram in accordance with an embodiment.

FIG. 10 and FIG. 11 show circuit diagrams in accordance with an embodiment. In addition to high efficiency, one method that is required for minimizing EMI and maintaining high overall efficiency is the ability to recognize the presence of a receiver nearby, and then turning on the pad only when appropriate. Two methods for this are described below.

As shown in FIG. 10, in accordance with one embodiment, the pad circuit 260 incorporates a micro control unit (MCU1) 266 that can enable or disable the FET driver 268. The MCU1 receives input from another sensor mechanism that will provide information that it can then use to decide whether a device is nearby, what voltage the device requires, and/or to authenticate the device to be charged or powered.

One of the sensor mechanisms for this information are through the use of an RFID reader 280 that can detect an RFID tag of circuit and antenna in the receiver (i.e. device or battery to be charged or powered). The information on the tag can be detected to identify the voltage in the receiver required and to authenticate the circuit to be genuine or under license. The information on the tag can be encrypted to provide further security. Once a device or battery containing the tag is nearby the pad, the RFID reader can be activated, can read the information on the tag memory, and compare with a table to determine authenticity/voltage required or other info. This information table can also reside on the MCU1 memory. Once the information is read and verified, the MCU1 can enable the FET driver to start driving the coil on the pad and to energize the receiver.

In another embodiment the MCU1 relies on a clock 270 to periodically start the FET driver. The current through the FET driver is monitored through a current sensor 264. Several methods can be implemented with this implementation, including for example:

A small resistor can be placed in series with the FET to ground contact. The voltage across this resistor can be measured by a current sensor chip, such as a Linear Technology Current Sense Amplifier part number LT1787.

A Hall sensor, such as a Sentron CSA-1A; that measures the current from a wire running under it, can be placed on top of the PCB line from the FET to the ground to measure the current without any electrical connection to the circuit. The advantage of this approach is that no extra resistor in series with this portion of the circuit is necessary reducing the impedance.

Other techniques may be used to measure the current.

A Hall sensor or a Reed switch can sense a magnetic field. If a small magnet is placed inside the receiver unit of the system, a Hall sensor or Reed switch can be used to sense presence of the magnet and can be used as a signal to start the FET.

Other capacitance, optical, magnetic, or weight, etc. sensors can be incorporated to sense the presence of a secondary or receiver and to begin the energy transfer process.

FIG. 11 shows a figure of a circuit diagram 290 in accordance with an embodiment. In accordance with an embodiment, the MCU1 can periodically start the FET driver. If there is a receiver nearby, it can power the circuit. The regulator 296, or another memory chip in the circuit can be programmed so that on power-up, it draws current in a pre-programmed manner. An example is the integration of an RFID transponder chip in the path, such as ATMEL e5530 or another inexpensive microcontroller (shown here as MCU2 294), that upon power-up modulates the current in the receiver that can then be detected as current modulation in the primary. As with the previous example, other sensors, such as an RFID antenna 292 can also be used to provide positional and other information.

Figure 12:
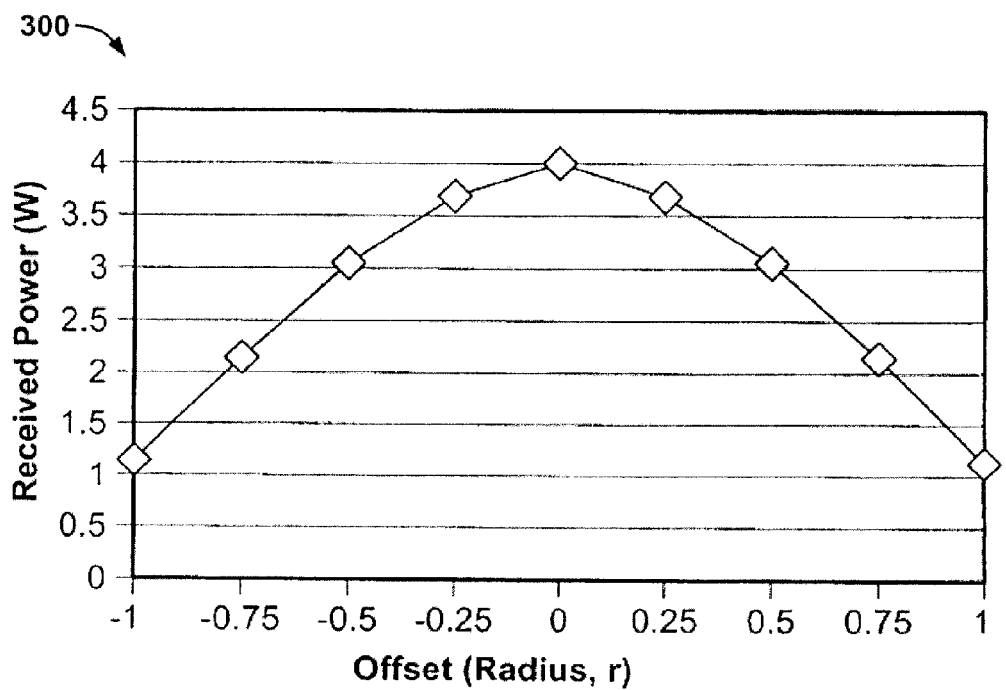
FIG. 12 shows a figure of power transfer chart in accordance with an embodiment.

FIG. 12 shows a figure of a power transfer chart 300 in accordance with an embodiment, illustrating transferred power as a function of offset between coils.

Efficiency Enhancements in Coil Layout

An important aspect of power transfer efficiency relates to the alignment of coils with respect to each other.

Figure 13:
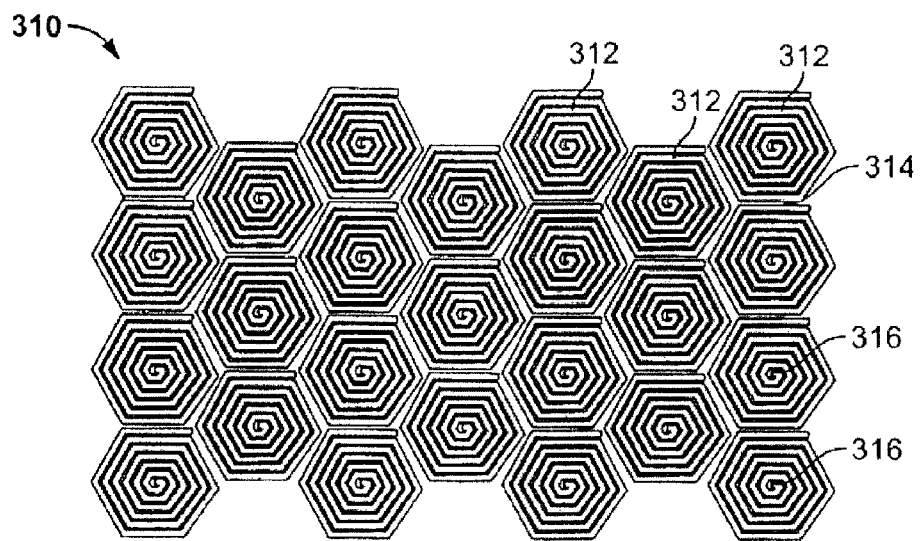
FIG. 13 shows a figure of a coil layout in accordance with an embodiment.
Figure 14:
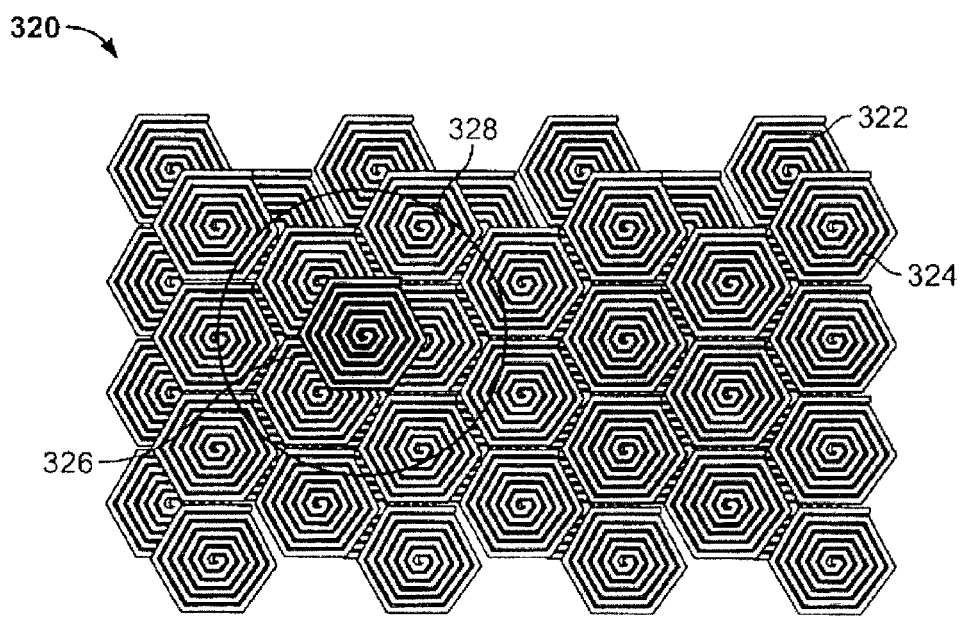
FIG. 14 shows a figure of a coil layout in accordance with an embodiment.

FIG. 13 and FIG. 14 show figures of a coil layout in accordance with an embodiment. If position independence is required, the pad PCB can be patterned with a coil pattern to cover the full area. FIG. 13 shows a pad type charger or power supply 310 including a layer of coils 312 with minimal spacing 314 between the coils. Each coil has a center 316 associated with it. In accordance with an embodiment, the power transfer for a 1.25" diameter coil as the center of the receiver is offset from the center of primary. The power drops off to 25% of the maximum value when the two coils are offset by a coil radius. As described above, in order to better keep the coils aligned, use of magnets centered on the primary and the receiver coil can provide an automatic method of bringing the two parts into alignment.

In order to produce uniform fields, a number of coils around the receiver coil will typically need to be turned on to produce a field. However, with such a pattern, if a receiver coil is placed in between two primary coils, the voltage is still not optimized. Research has shown that to obtain uniform fields, three layers of coil patterns offset with respect to each other are required.

FIG. 14 shows a pad-type charger 320 with two of the three layers 322, 324 required to achieve position independent magnetic field pattern. For a receiver placed at the center of the circle, all the coils nearby (in and around the circle 328) will need to be turned on to achieve a uniform field in the desired location 326. While this approach solves the offset issue and can be used to provide position independence, it does not produce high transfer efficiency. The reason is that ten or more coils have to be turned on near the receiver center to create the uniform field in that area, which in turn leads to inefficient power transfer.

Efficiency Enhancements Through Independent Coil Movement

In accordance with some embodiments, techniques are included to provide high transfer efficiency while maintaining position independence.

Figure 15:
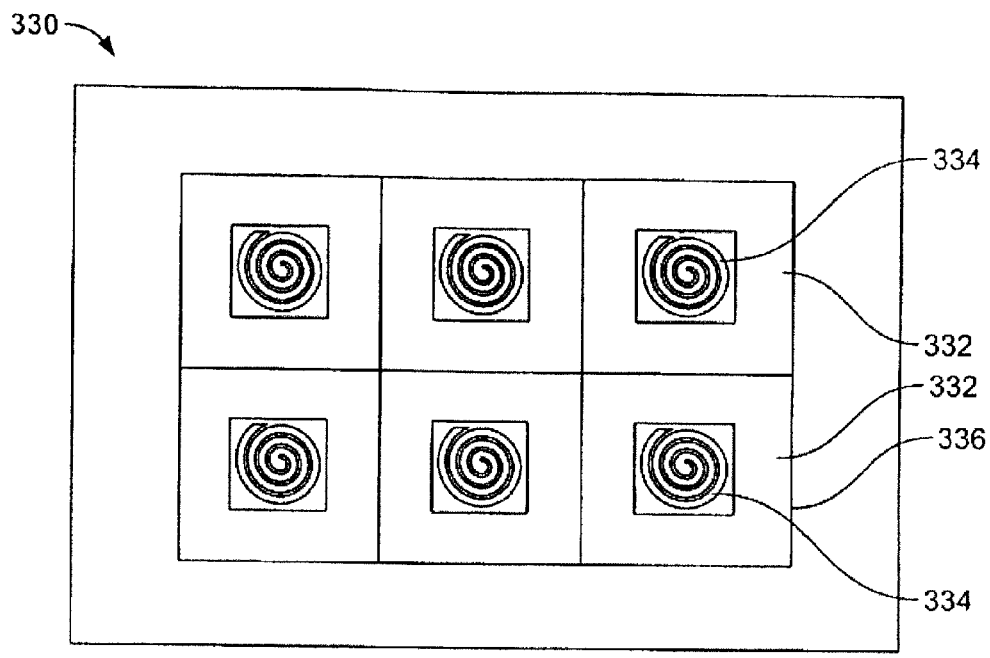
FIG. 15 shows a figure of a charging pad with multiple coils in accordance with an embodiment.

FIG. 15 shows a figure of a charging pad with multiple coils in accordance with an embodiment. The area of the pad 330 is divided into a plurality of, or multiple segments 332, that are bounded 336 by a wall or physical barrier, or simply some tethering means with no physical walls but that otherwise restrict movement to within the segment. The coils 334 are mounted such that they can move laterally, or float, within the area of their segments while continuing to be connected to the drive electronics placed on the edges of the area. In accordance with an embodiment, the floating coils and the drive circuit are sandwiched between thin upper and lower cover layers that act to allow the coils lateral movement while limiting vertical movement. When a receiver coil is placed on the pad, the pad senses the position of the receiver coil and moves the coils to the right position to optimize power transfer.

Figure 16:
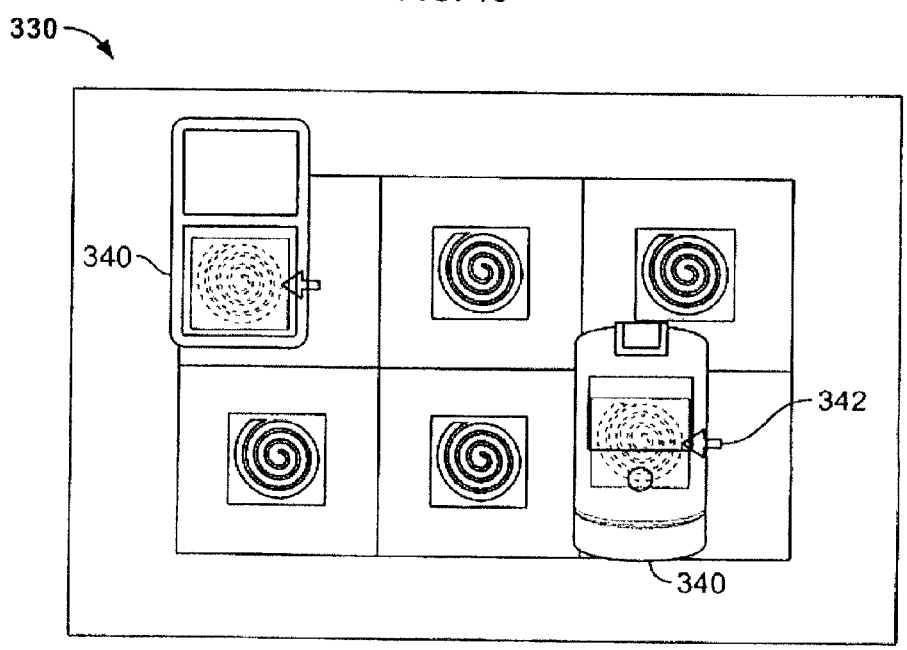
FIG. 16 shows a figure of a charging pad with movable coils and two devices receiving power or charge in accordance with an embodiment.

FIG. 16 shows a figure of a charging pad with movable coils in accordance with an embodiment. When the mobile device, for example a cell phone 340, or a battery is placed on the pad 330, the nearest coil moves 342 within its segment to better orient itself with the mobile device or battery. In accordance with one embodiment, the method used for achieving this is by attaching a magnet to the bottom center of each coil in the pad. A matching magnet at the center of the receiver coil attracts the primary magnet nearby and centers it automatically with respect to the receiver coil.

In accordance with an embodiment, each coil in this configuration can be suspended by the wires carrying power to the coil or by a separate wire/spring or by another mechanism so that each coil can move freely in the plane of the pad while it can receive power from an individual or shared driving circuit. In order to facilitate movement, the surface of the coils or the bottom surface of the top layer for the base unit (the area where the coils move against) or both layers can be made smooth by use of a low friction material, attachment of a low friction material, or lubrication. The wire/spring or current carrying mechanism described above can also be used to center each coil in an area at the center of desired movement sector for each coil. In this way, without a receiver coil in the vicinity, each coil in the base unit stays at the central location of its sector and responds and moves to match a receiver coil when a device or battery is brought nearby. Overlap of movement between adjacent charger or power supply coils can be controlled by means of limiting movement through limiting length of current carrying wires to the coil, arrangement of the suspension, or spring, or placement of dividing sectors, pillars or by any other mechanism.

In another embodiment, the pad will include a method for detecting the presence of the mobile device, battery/receiver and taking appropriate action to turn on the coil and/or to drive the coil with the appropriate pattern to generate the required voltage in the receiver. This can be achieved through incorporation of RFID, proximity sensor, current sensor, etc.

A sequence of events to enable position independence and automatic pad turn-on can be:

- Multiple movable coils are used to cover the pad surface area.
- The coils in the pad are normally off and periodically powered up sequentially to sense whether the receiver is nearby by measuring the current through the primary coil. Alternatively, proximity sensors under each section can sense the presence of a magnet or change in capacitance or other parameter to know where a device is placed. RFID techniques with localized antennas under each section or such can also be used.
- Once a device is identified as placed in a section, the pad can interrogate the device through one of the processes described earlier to authenticate and to understand its voltage/power, etc. requirements.
- The MCU1 unit uses the information received above to set the PWM pattern which it will use to drive the FET drive to produce the appropriate voltage in the receiver.
- The board continues to 'search' for other devices on the pad by scanning coils or using the RFID system, etc. and then turn on other coils as appropriate.
- The pad also uses monitoring to find out when and if the first mobile device is removed from the pad, or when the end of charge is reached.

Efficiency Enhancements in Coil Registration and Switching

In accordance with an embodiment, a global RFID system that can identify the approach of a mobile device to the pad can be used to 'wake up' the board. This can be followed by sequential polling of individual coils to recognize where the device is placed in a manner similar to described above. Other embodiments can be used to provide safeguards against false charging of objects placed on the base unit. It is known that a metal object placed on coils such as the ones in the base of the charger or power supply system will cause current to flow in the primary and transfer power dissipated as heat to the metal object. In practical situations, this will cause placement of keys and other metal objects on the base unit to trigger a start and to needlessly draw current from the base unit coil and possibly lead to failure due to over-heating. To avoid this situation, in embodiments such as described above, the switching of voltage to the coil will not start unless an electronic device with a verifiable RFID tag is nearby thereby triggering the sequence of events for recognizing the appropriate coil to turn on and operate. In an alternate geometry, the total system current or individual coil current is monitored, and, if a sudden unexpected drawn current is noticed, measures to investigate further or to shut down the appropriate coil indefinitely or for a period of time or to indicate an alarm is taken.

In another embodiment, the regulators or battery charging circuit in mobile devices or batteries, or the regulator in a receiver electronics, typically has a start voltage (such as 5 V) that is required to start the charging process. Once the battery charge circuit detects the presence of this voltage, it switches on and then proceeds to draw current at a preset rate from the input to feed the battery for charging. The battery charger circuits operate such that an under or over voltage at the start will prevent startup. Once the startup occurs, the voltage at the battery charger output is typically the voltage of the battery and depends on the state of charge, but is for example 4.4 V to 3.7 V, or lower for Lithium-Ion batteries. With a wireless charge system such as described here, the voltage on the receiver is highly dependent on relative position of the primary and receiver coil as shown in FIG. 5. Since typically the start voltage of the battery charger is within a narrow range of the specified voltage, under-voltage and over-voltage in the receiver coil due to misalignment or other variation will result in shutdown of the battery charger circuit.

Efficiency Enhancements Through Coil Voltage Clamping

Figure 17:
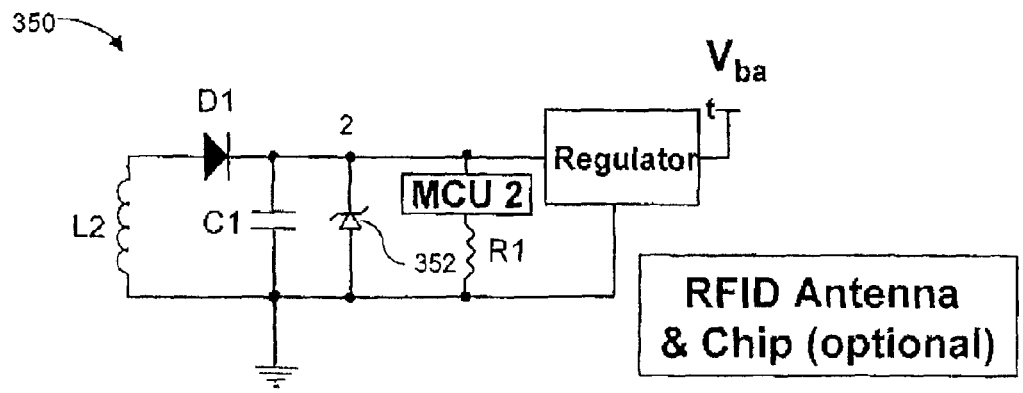
FIG. 17 shows a figure of a circuit diagram in accordance with an embodiment.

FIG. 17 shows a figure of a circuit diagram 350 in accordance with an embodiment. In accordance with one embodiment, a Zener diode 352 is incorporated to clamp the maximum voltage at the output of the receiver prior to the regulator or battery charger circuit, as shown in FIG. 17. Using a Zener allows more insensitivity to placement between the primary and receiver coil while maintaining the ability to charge or power the device. For example, the drive pattern on the primary can be set so that when the primary and receiver coil are aligned, the voltage on the receiver is above the nominal voltage for the battery charger startup. For example, for a 5 V startup, the voltage at center can be set for 6 or 7 volts. In this way, the Zener can be chosen to have an appropriate value (5 V) and clamp the voltage at this value at the input to the battery charger unit while the coils are centered or misaligned. Once the battery charger starts operation after detection of the appropriate voltage at the input, the battery charger circuitry will pull the voltage at this point to the pre-programmed voltage or voltage of the battery. In this way, the use of Zener diode enables less sensitivity to position and other operational parameters in wireless chargers or power supplies and is extremely useful.

Efficiency Enhancements Through Coil Stacking

Figure 18:
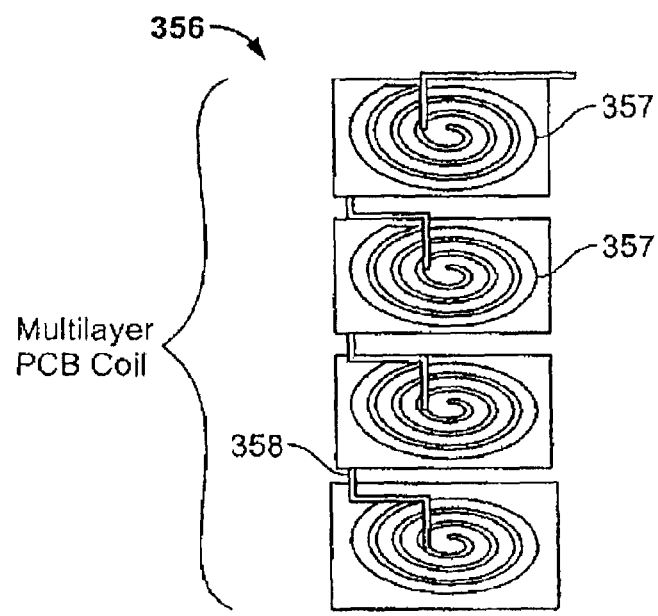
FIG. 18 shows an illustration of a means of stacking coils, in accordance with an embodiment.

FIG. 18 shows an illustration of a means of stacking coils, in accordance with an embodiment. In accordance with an embodiment, to achieve higher flux densities, a coil is constructed with two or more layers, for example by using two or more layers of printed circuit board. Multiple layer boards can be used to allow compact fabrication of high flux density coils. By altering the dimensions of the coil in each layer (including the thickness, width, and number of turns) and by stacking multiple layers, the resistance, inductance, flux density, and coupling efficiency for the coils can be adjusted so as to be optimized for a particular application.

In accordance with an embodiment, a transformer comprising two PCB coils separated by a distance has many parameters that are defined by the design of the coil, including:

- R1 is the primary winding resistance,
- R'2 is the secondary (in the receiver) winding resistance referred to the primary,
- RL is the resistive load,
- Llk1 is the primary leakage inductance,
- Llk2 is the secondary leakage inductance referred to the primary,
- LM1 is the primary mutual inductance,
- C1 is the primary winding capacitance,
- C'2 is the capacitance in the secondary winding referred to the primary,
- C12 is the capacitance between primary and secondary windings, and
- n is the turns ratio.

In accordance with the embodiment shown in FIG. 18, a multi-layer PCB coil 356 is created in separate PCB layers 357, which are then connected 358, and manufactured together via common techniques used in PCB fabrication, for example by use of a via or contacts. The resulting overall stack is a thin multi-layer PCB that contains many turns of the coil. In this way, wide coils (low resistance) can be used, while the overall width of the coil is not increased. This technique can be particularly useful for cases where small x-y coil dimensions are desired, and can be used to create higher flux densities and more efficient power transfer.

Efficiency Enhancements Through Coil Shape and Materials

In accordance with an embodiment, the system can use a non-ferrite material for both the primary and the secondary (receiver) coils. For example, the coils can be made of copper material that is sputtered, deposited, or formed onto a printed circuit board (PCB), as described above. As also described above the coils can be formed in any number of different shapes, including, for example, flat or planar hexagonal shapes, or spirals. The coils can also be distributed in layers of coils, spirals, and other various shapes.

One of the advantages of using a non-ferrite or non ferromagnetic material for the primary and secondary (receiver) is that the coils can be made much flatter and thinner than a ferrite coil. Additionally, non-ferrite coils can be made to have a lower inductance than a comparable coil made from a ferrite material (the inductance is on the order of 1 micro Henry, although the actual value will vary depending on the frequency of the voltage applied to the coil). The non-ferrite nature effectively eliminates hysteresis in the coil, and allows the system to be switched on and off more rapidly, and with less energy storage artifacts.

Variations in Coil Circuitry

In accordance with some embodiments, an inductance-capacitance (often referred to as an LC or "tank capacitor") circuit can be used to provide a range of power outputs to approximately suit the intended application. For example, the circuit can be optimized to suit either low-power applications, or high-power applications.

Depending on the particular intended application, the original capacitor (referred to herein as a "timing capacitor") in the circuit design can be removed and/or replaced with a different value of capacitor to obtain a different overall level of power output. From a manufacturing perspective this is a relatively simple and inexpensive procedure. This technique can also be used to easily manufacture different charger or pad embodiments for different end-user applications, in that the majority of the pad components can be designed to be common to each pad design, with the primary difference being the value for a single capacitor. This single capacitor can then be specified or changed during the manufacturing process. Although the timing capacitor can be used to adjust the system for, e.g. high-power or low-power applications, the final power output as it is received at the mobile device can be fine-tuned using additional techniques and features such as those described in further detail below.

Coil Waveform Generation

In accordance with an embodiment, a half-phase electrical waveform is used to charge the tank circuit, and to subsequently provide inductive power to the receiver coil in the mobile device. Unlike a full-phase waveform, the half-phase waveform can be used with a zero-crossing power supply. In accordance with this embodiment, when the transistor in the primary coil is first turned on, electrical current passes through the primary coil and the transistor to ground. When the transistor is turned off, the voltage level at the transistor swings high (anywhere from twice, to many times the value of the input voltage). This is the standard oscillation behavior of an inductor. When the current falls to zero the transistor is turned on again, and the process is repeated.

Many traditional transformer designs do not use half-phase waveforms, and instead use a non-zero-crossing design, since their ferrite core acts like a capacitor and stores energy during the off phase, which results in large losses in power efficiency if zero-crossing was used. However, in accordance with an embodiment, the use of non-ferrite coils, coupled with lower power (on the order of 2 Watts) allows for suitable efficiency with a half-phase and a zero-crossing circuit.

Furthermore, in accordance with some embodiments the half-phase waveform can be designed to have an exponential or curved shape, rather than an abrupt shape, so that higher frequency emissions are reduced. These higher frequency emissions might otherwise cause problems with portable and other devices, or conflict with federal communications regulations that prohibit high frequency emissions in consumer electrical devices.

Automatic Voltage Setting

In accordance with some embodiments, the system can include additional circuits, components, features, and techniques, which perform specialized tasks, such as mobile device identification, and automatic voltage or power-setting for different devices. As described above, although the timing capacitor can be replaced to modify the circuit frequency and the resulting output voltage of the system, this is not a practical solution for allowing a consumer to modify the voltage, or to modify the voltage to suit the particular requirements of individual mobile devices. In practice the timing capacitor can be used to provide a particular range of output power (i.e. high power applications; or low power applications). Additional techniques are then used to adjust the power for a particular device. This is particularly important when the charger or the pad is designed to power or charge multiple different devices simultaneously, since each of those different devices may have different power and voltage requirements. In accordance with various embodiments, different features can be used to support this, including:

Hardwiring the receiver coil to take the voltage requirements of its device into account, and to use the appropriate dimensions to receive the correct voltage for that device. However, while this approach works to adjust the voltage for that device, it is by its nature hard-wired and does not provide much flexibility to adjust the voltage for interoperability between different devices and different chargers or power supplies.

Use of dynamic programming to obtain a different voltage. In accordance with this embodiment, if the timing capacitance is known, then the frequency of the circuit can be adjusted to produce the required output voltage.

In a zero-switching circuit, clipping can be used to tune the voltage. This can include turning the circuit on, then allowing it to turn off but clipping the waveform earlier, and then turning it on again. The process is then repeated. The clipping may be less efficient than unclipped switching, but can be used to tune the voltage.

When used with the above capacitor-based techniques, the choice of timing capacitor can be used to determine the overall range of the charger, power supply, or pad (for example, whether it is best suited for low power, or for high power applications). The additional features can then be used to fine-tune the frequency and the output voltage. In accordance with some embodiments, additional features can be used to improve efficiency and to add functionality.

As described above, in accordance with one embodiment, the pad circuit 260 incorporates a micro control unit (MCU) 266 that can enable or disable the FET driver 268. The MCU receives input from another sensor mechanism that will provide information that it can then use to decide whether a device is nearby, what voltage the device requires, and/or to authenticate the device to be charged. The communicated feedback from the receiver to primary can be used by the primary to, for example, adjust the frequency, or to otherwise alter the output voltage to that receiver, using the frequency/output characteristics described above. Some traditional transformer designs use a third coil to provide a measure of feedback. However the use of an MCU as described herein eliminates the need for such extra coil feedback devices.

Also as described above, in accordance with one embodiment, a Zener diode 352 is incorporated to clamp the maximum voltage at the output of the receiver prior to the regulator or battery charger circuit. In each of the feedback designs described above, the actual communication between the receiver and the primary as to voltage requirements can be of open loop design, or of closed loop design. In an open loop design, the charging device, pad or power source provides the power to the primary, which is then inductively transferred to the receiver and the mobile device or battery other device to be charged. The primary itself determines how much power should be received at the receiver. In a closed loop design, such as in a switching mode power supply, the device/receiver communicates information back to the primary, and then the primary determines how much power should be sent to the receiver.

Device Identification and Verification

Figure 19:
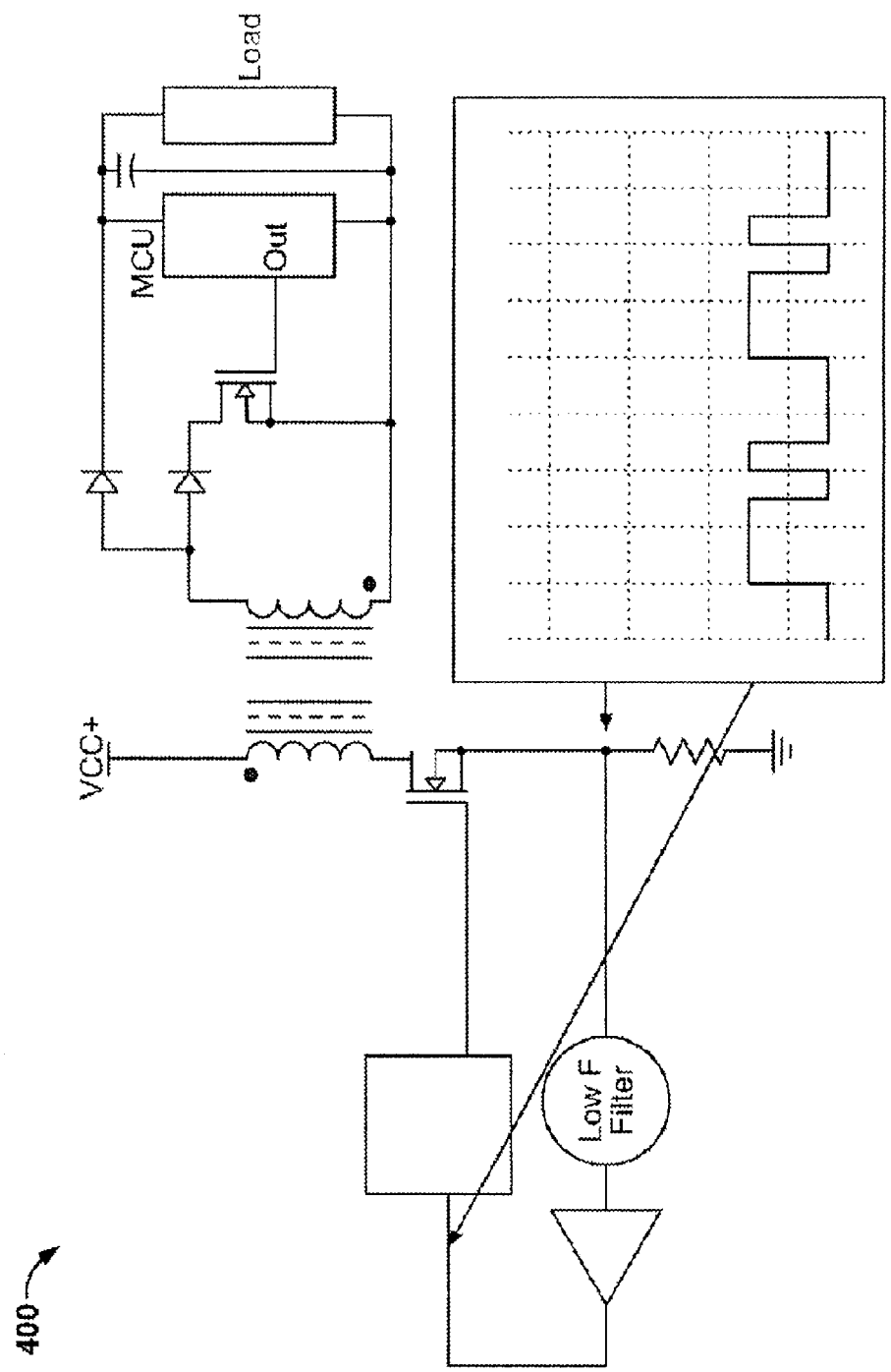
FIG. 19 shows a figure of a circuit diagram for identification verification in accordance with an embodiment.

FIG. 19 shows a figure of a circuit diagram 400 for identification verification in accordance with an embodiment. In accordance with an embodiment, the circuit design can be used to ensure a device is valid, i.e. authorized to be used with the charger, power supply or pad. The information can also be used as part of an open-loop or closed-loop design to set the voltage for the device. In operation, the primary circuit is first turned on. An initial signal is generated as the circuit induces power in the receiver. This information is quickly compared with a number or value stored in the MCU, and is used to determine whether the mobile device (or the receiver associated with that mobile device or battery) is valid for operation with the base unit, charger, power supply, or charging pad. In addition to validation the information can similarly be used to set the charging voltage for the receiver, battery, or mobile device.

Figure 20:
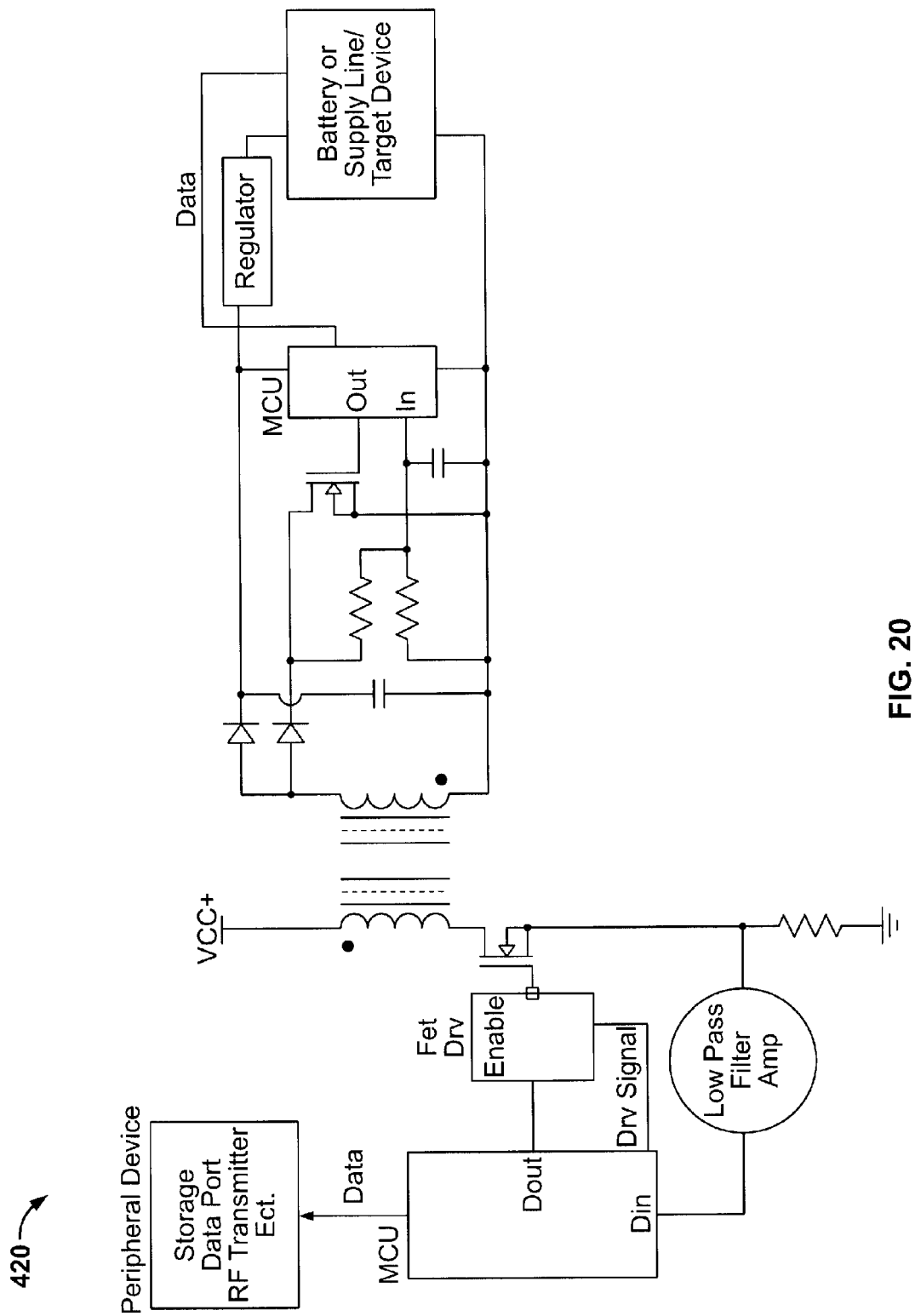
FIG. 20 shows a figure of a circuit diagram for bidirectional communication in accordance with an embodiment.

FIG. 20 shows a figure of a circuit diagram 420 for bidirectional communication in accordance with an embodiment. As shown in FIG. 20, in accordance with an embodiment the charger or power supply or primary can include means for communication with the receiver, battery, or mobile device, including for example radio frequency (RF) or other means of communication.

Figure 21:
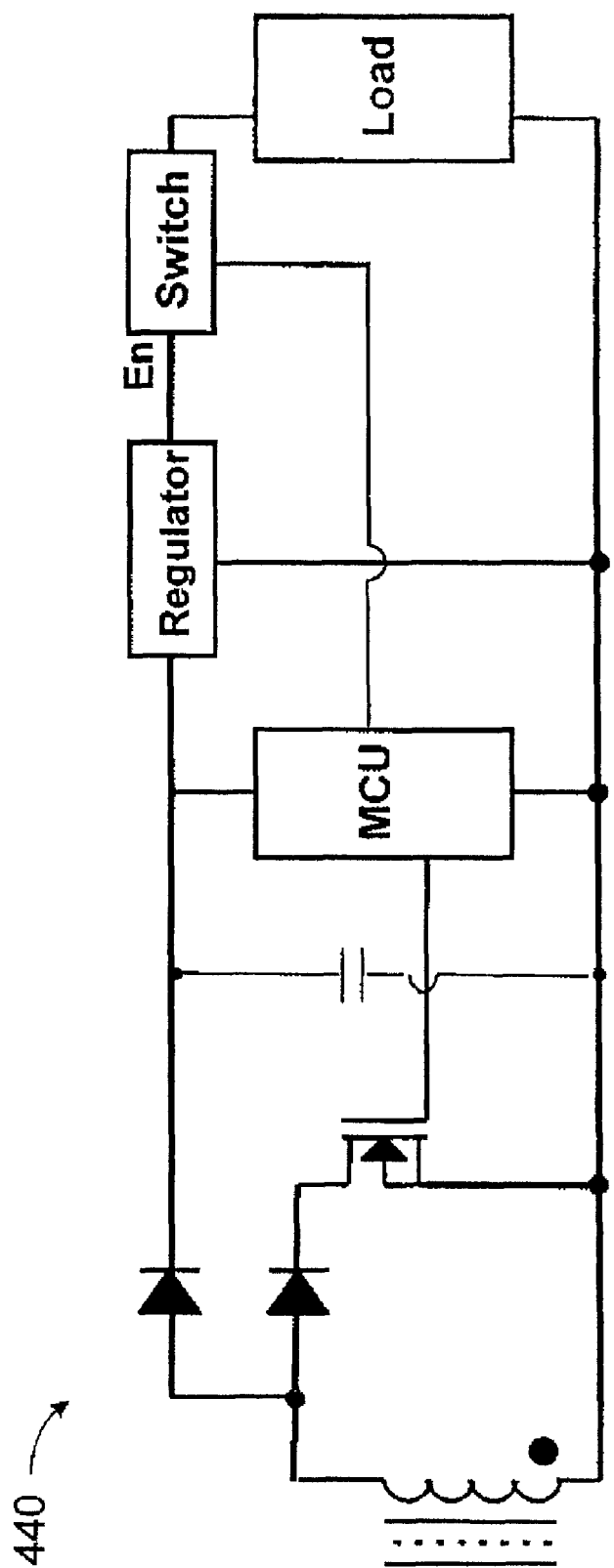
FIG. 21 shows a figure of a circuit diagram for output controller in accordance with an embodiment.

FIG. 21 shows a figure of a circuit diagram 440 for output controller in accordance with an embodiment. As shown in FIG. 21, in accordance with an embodiment the output controller in the receiver waits until power is sufficient, and then turns the power on to the mobile device or battery.

Figure 22:
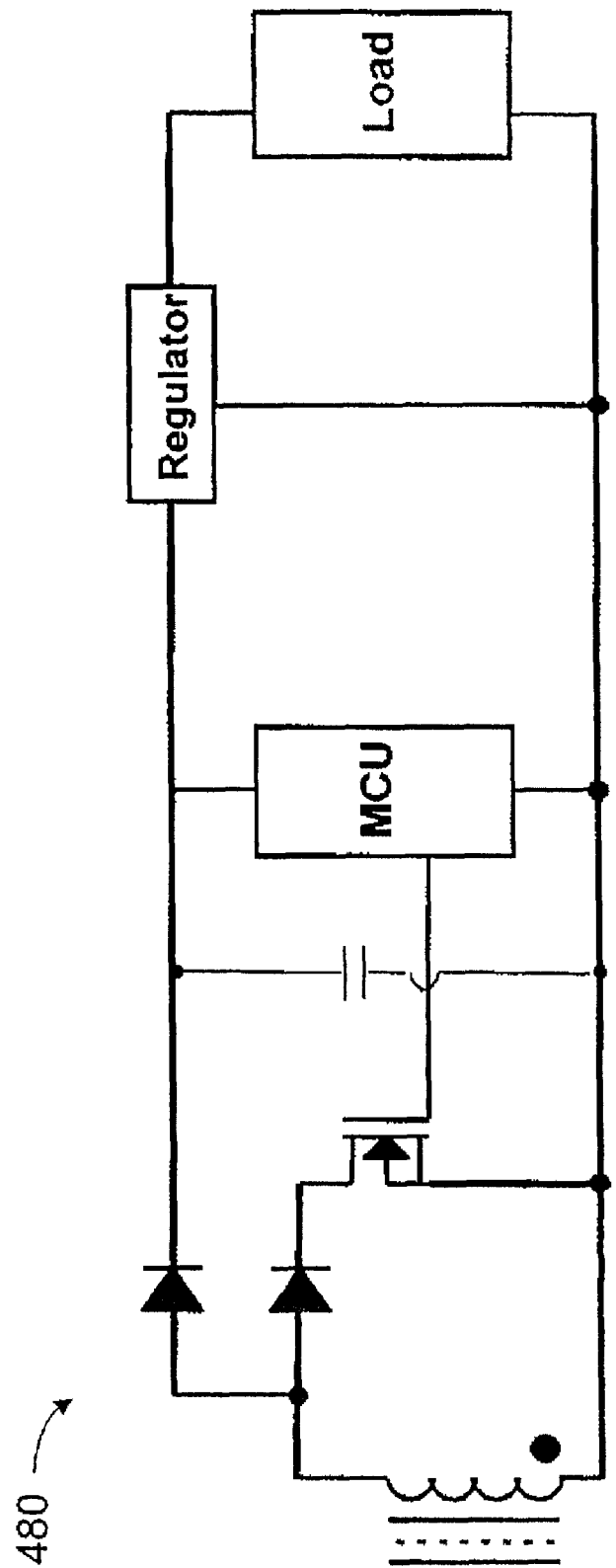
FIG. 22 shows a figure of a circuit diagram for the receiver with regulator in accordance with an embodiment.

FIG. 22 shows a figure of a circuit diagram 480 for receiver with regulator or charge management circuit in accordance with an embodiment. As shown in FIG. 22, in accordance with an embodiment the receiver includes a regulator for regulating the voltage.

Figure 23:
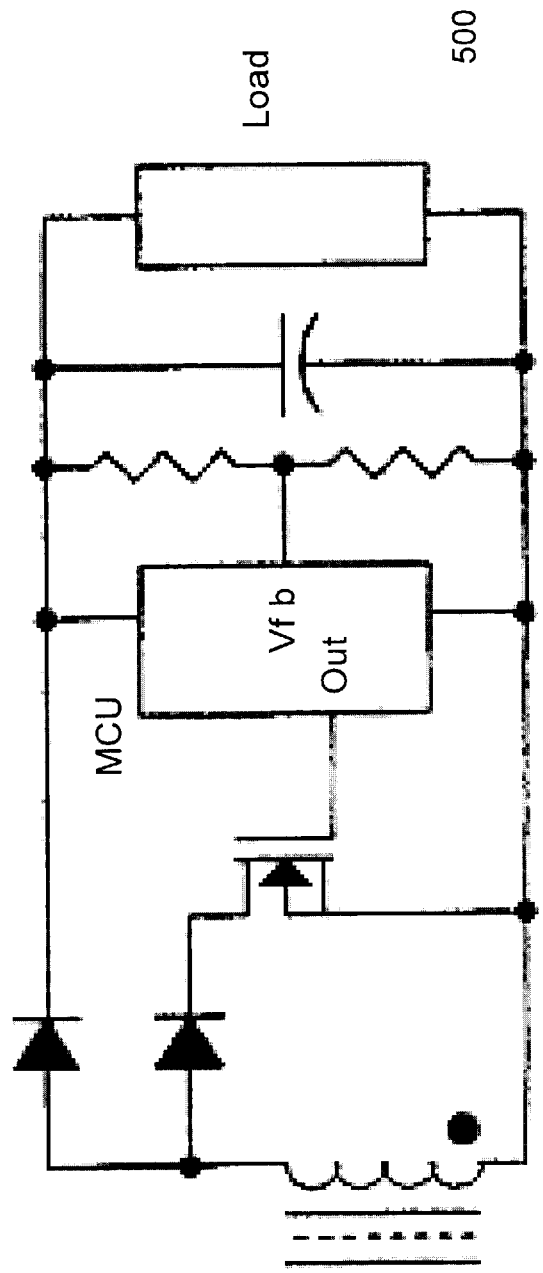
FIG. 23 shows a figure of a circuit diagram for MCU regulation in accordance with an embodiment.

FIG. 23 shows a figure of a circuit diagram 500 for MCU regulation in accordance with an embodiment. As shown in FIG. 23, in accordance with an embodiment the MCU can provide the voltage regulation.

Figure 24:
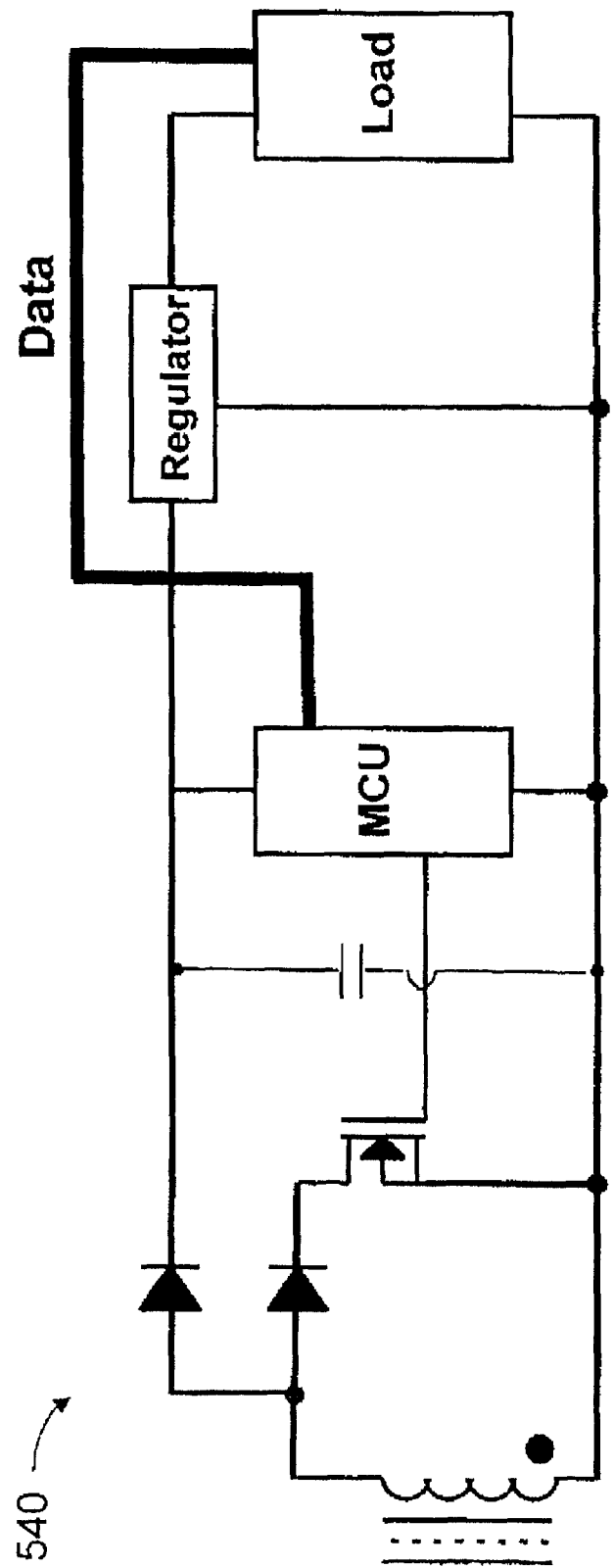
FIG. 24 shows a figure of a circuit diagram for unidirectional communication in accordance with an embodiment.

FIG. 24 shows a figure of a circuit diagram 540 for unidirectional communication and data transfer in accordance with an embodiment. As shown in FIG. 24, in accordance with an embodiment the receiver can include a means of transferring data to the mobile device to which it is coupled.

Figure 25:
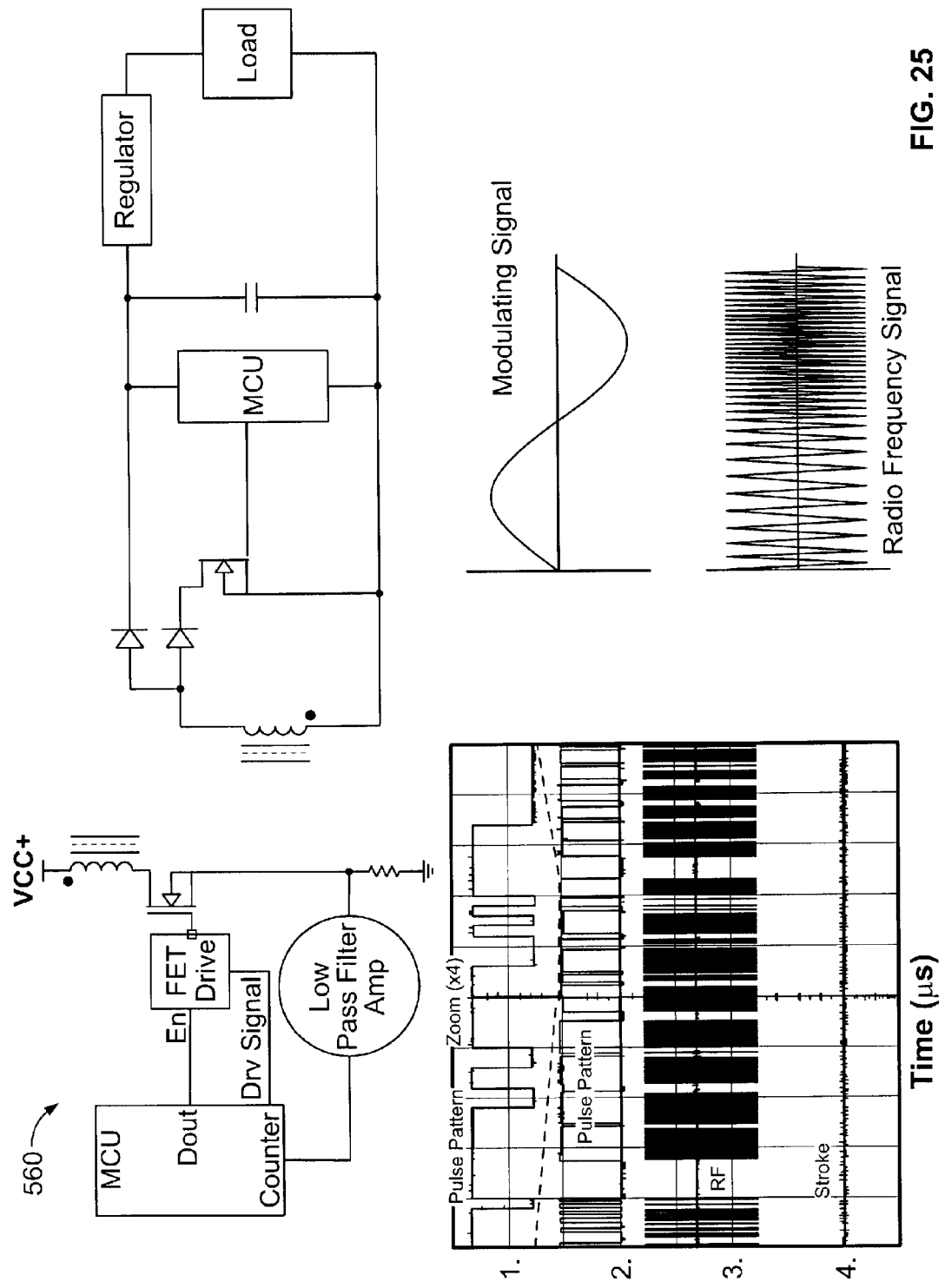
FIG. 25 shows a figure of a circuit diagram for time-based regulation in accordance with an embodiment.

FIG. 25 shows a figure of a circuit diagram 560 for time-based regulation in accordance with an embodiment.

Zero Voltage Switching

In accordance with some embodiments, the system can use a technique such as Zero Voltage Switching (ZVS) to provide more efficient power transfer and power supply control. These techniques can also be used to provide more efficient regulation for power transfer between coils of small induction value, such as those created by spiral patterns in PCBs, stamped metal coils, and low number of turns wound wire coils. In switching mode power supplies used today, the common geometries used are boost buck, flyback, boost, or a variation of these types. In most of these geometries, the input voltage is switched rapidly by a transistor such as a FET and the energy is transferred across a transformer to a load. In accordance with an embodiment, by adjusting the duty cycle of the switching circuit, regulation of transferred power is achieved.

Figure 26:
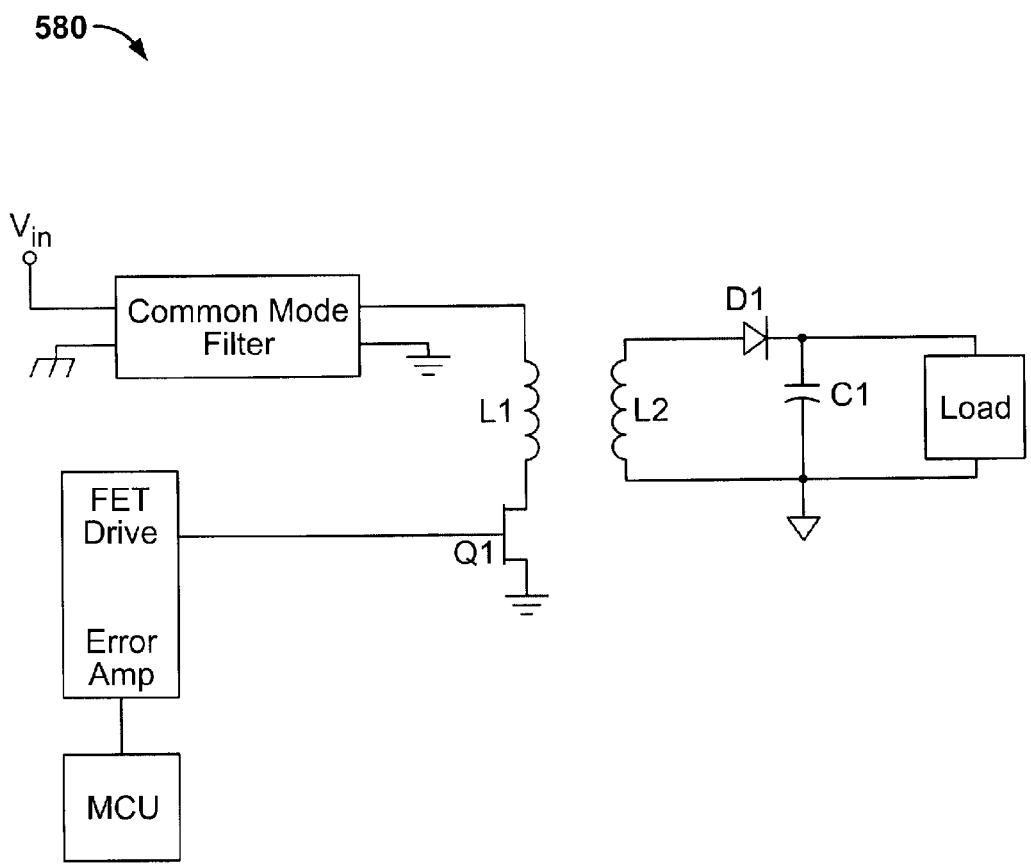
FIG. 26 shows a high level view of a flyback power supply geometry in accordance with an embodiment.

FIG. 26 shows a high level view of a flyback power supply geometry 580 in accordance with an, embodiment. During the time that the FET is closed, the current through the primary coil stores energy in this coil and during the period that the FET is open, this energy is transferred to the secondary (receiver) coil and into the load. The energy stored in the coil is directly proportional to the inductance of the coil and values of several hundred Henry are typical for 10's or 100's of Watts of power supply power.

In contrast, Printed Circuit Board Coils (PCBC's) are typically spiral circular, rectangular, or other shape coils that are printed on rigid or flexible PCB material or stamped out of sheets of copper or by other methods where the coil or transformer in a power supply is primarily flat and takes very little space. Two of these coils placed with a distance between them (such as on both sides of a PCB material) or with an air or material gap (such as in wireless power applications where a charger transmits power to a receiver in an electronic or electric device that can be separated or removed from the charger) can be used to form a transformer such as the one shown in FIG. 26. Switching of these coils at high frequency (~1 MHz depending on the coil geometry and size) can transfer power across an air or material gap and an efficient power supply with a very small transformer can be developed. Uses of such compact coils for wireless powering of mobile devices such as mobile phones and MP3 players have been demonstrated. However, many prior techniques used a laboratory power supply to provide a sinusoidal or similar voltage to the primary coil and study the transferred power, rather than a compact efficient circuit for a power supply.

In accordance with a ZVS geometry embodiment, a capacitor is added to the circuit so that in the switch OFF position, the capacitor and the coil inductor create a resonant circuit. During the switch ON time, current passes through the inductor while the voltage across the capacitor is zero. During the period where the switch is turned off, the voltage across the capacitor rises to a maximum value of twice the input voltage and then resonates back to zero. A characteristic of this geometry is that the switch is closed exactly when this voltage arrives back to zero (hence the name Zero Voltage Switching), thereby minimizing power usage and achieving high efficiencies. Some of the benefits of this geometry include: High efficiency and 'Loss-less' transitions; Reduced EMI/EMC due to soft switching and use of sinusoids rather than square waves; Peak current is not higher than square wave switching; and Relatively simple control and regulation. In addition, this geometry can work very efficiently with low inductance values and is therefore better suited for the PCBC applications. In accordance with various embodiments the geometry can be configured to operate in various topologies, for example buck, boost, buck-boost, and flyback.

Some embodiments provide more efficient power transfer and power supply control and regulation for power transfer between coils of small induction value such as created by spiral patterns in PCBs, stamped metal coils, low number of turns wound wire coils, etc. In addition, typically, magnetic cores are not used if the coils are driven at high frequency. For a spiral coil, the inductance of a coil is given by:

$$L = \frac{r^2 N^2}{(2r + 2.8d) \times 10^5}$$

Where
L=inductance (H)
r=mean radius of coil (m)
N=number of turns
d=depth of coil (outer radius minus inner radius) (m)

For example, for a coil of 10 turns, an outer radius of 15 mm, and inner radius of zero, then L=1 H. While larger values can be obtained by increasing the number of turns or stacking a number of coils vertically and connecting them in series, this larger induction comes at the price of increased resistance and therefore loss in the inductor.

Spiral coils printed on PCBs without use of any magnetic core can provide high power transmission efficiency if operated at high frequency. An analogous method to the above technique is one referred to as Zero Current Switching (ZCS). ZCS operates by similar principles; however switching is done during zero current passing through the switch thereby achieving low switching losses. In the following discussion, ZVS switching is generally discussed; however, the ZCS geometry can equally be applied to the following. In accordance with some embodiments, methods are described for achieving and optimizing high power transfer with such small and/or thin coils with low induction values and describe several techniques for control and regulation of this power in real world power applications. While this technology is generally described for any type of power supply using such inductors, in accordance with a particular embodiment the two coils in the transformer are separated, with the primary being in an inductive charger and the receiver embedded in a device, battery, casing, skin, or other part of an electronic or electric device. In this case, a wireless charger or power supply can be created which is especially useful for charging or powering mobile electronic or electric devices or batteries.

The advantages of use of ZVS geometry in general, and in particular for coils with small inductance and no magnetic cores, has been described above. However; another important aspect of power supply design is the Control and Regulation Circuitry that is implemented. Regulation of the power to a load can be achieved by a linear or switching regulator at the output stage. However, if the regulation of the power is achieved in this way and constant power is supplied from the primary coil, under light load conditions (such as when a battery is fully charged or a device is on stand-by, then the power generated and transmitted by the primary is mostly wasted leading to a low efficiency power supply. A better solution is achieved by adjusting the power into the primary coil under different load conditions, to maintain high efficiency during different load conditions or battery charging stages.

In accordance with an embodiment, such control of output power in a ZVS power supply can be achieved by changing the frequency of the operation. In this embodiment, the output power is inversely proportional to the operating frequency and control can be achieved by an appropriate control circuit.

Figure 27:
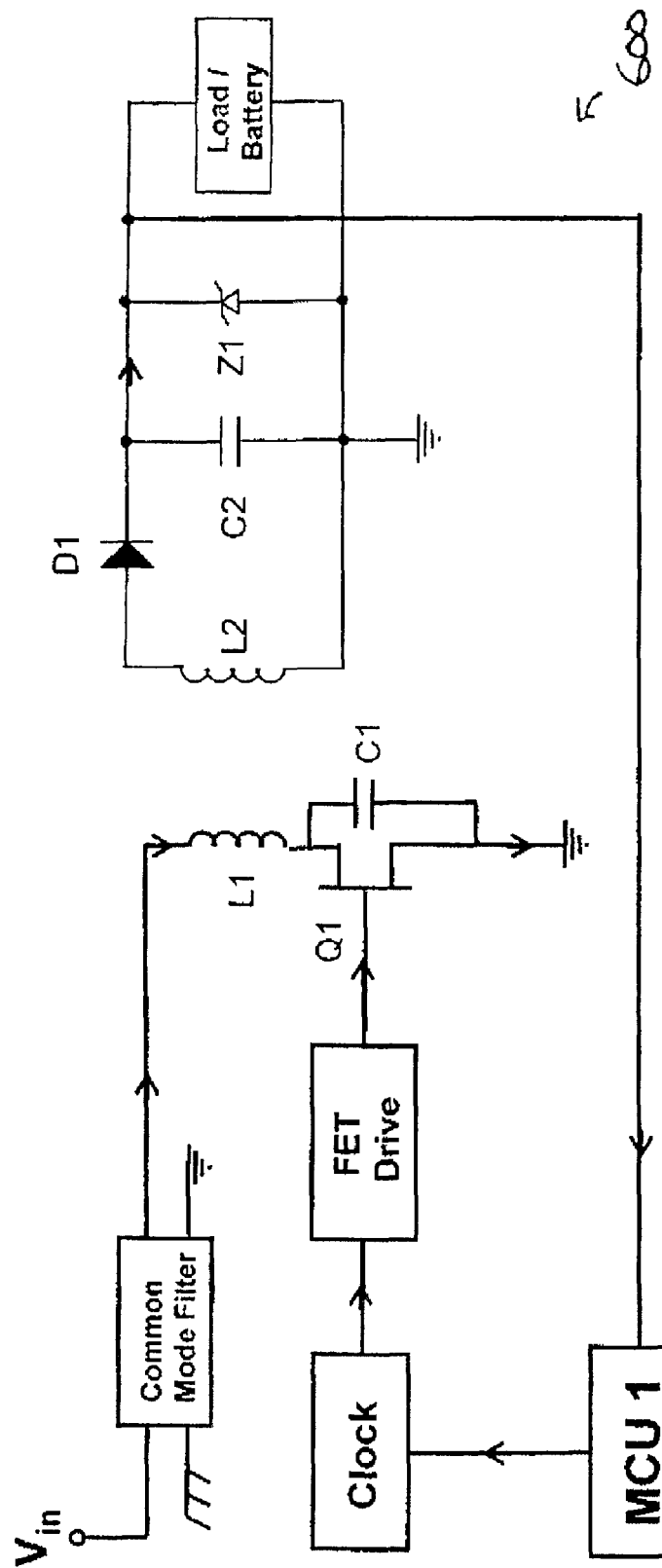
FIG. 27 shows an embodiment in which the output voltage to a load is monitored and with changes in the load condition, a chip or a Micro Controller Unit (MCU) varies the frequency or the duty cycle of the FET driver to achieve optimum operation.

FIG. 27 shows how the output voltage to the load is monitored and with changes in the load condition, a chip or a Micro Controller Unit (MCU) varies the frequency or the duty cycle of the FET driver to achieve optimum operation and controlled output voltage with a changing load. As shown in FIG. 27, a digital control 600 for operation is shown. However, analog operation can also be achieved and may be simpler and faster in response time to load changes and preferable in some applications. In the implementation shown, the primary (Control Circuit, Clock, FET Driver, FET, primary coil, etc.) and the receiver (secondary coil, rectifier, capacitor, other circuitry, etc.) are able to communicate through a wired connection.

Switching Mode Power Supply with Wireless Communication

In accordance with an embodiment that includes a charger or power supply wherein the charger or power supply and the receiver are separable from each other (wireless or inductive charging or supply of power to devices), the charger or power supply can contain the basic control and switching functions while the receiver contains the rectifier diode and capacitor for smoothing of the output voltage and additional circuitry. In this embodiment the two parts need to communicate with each other wirelessly.

Figure 28:
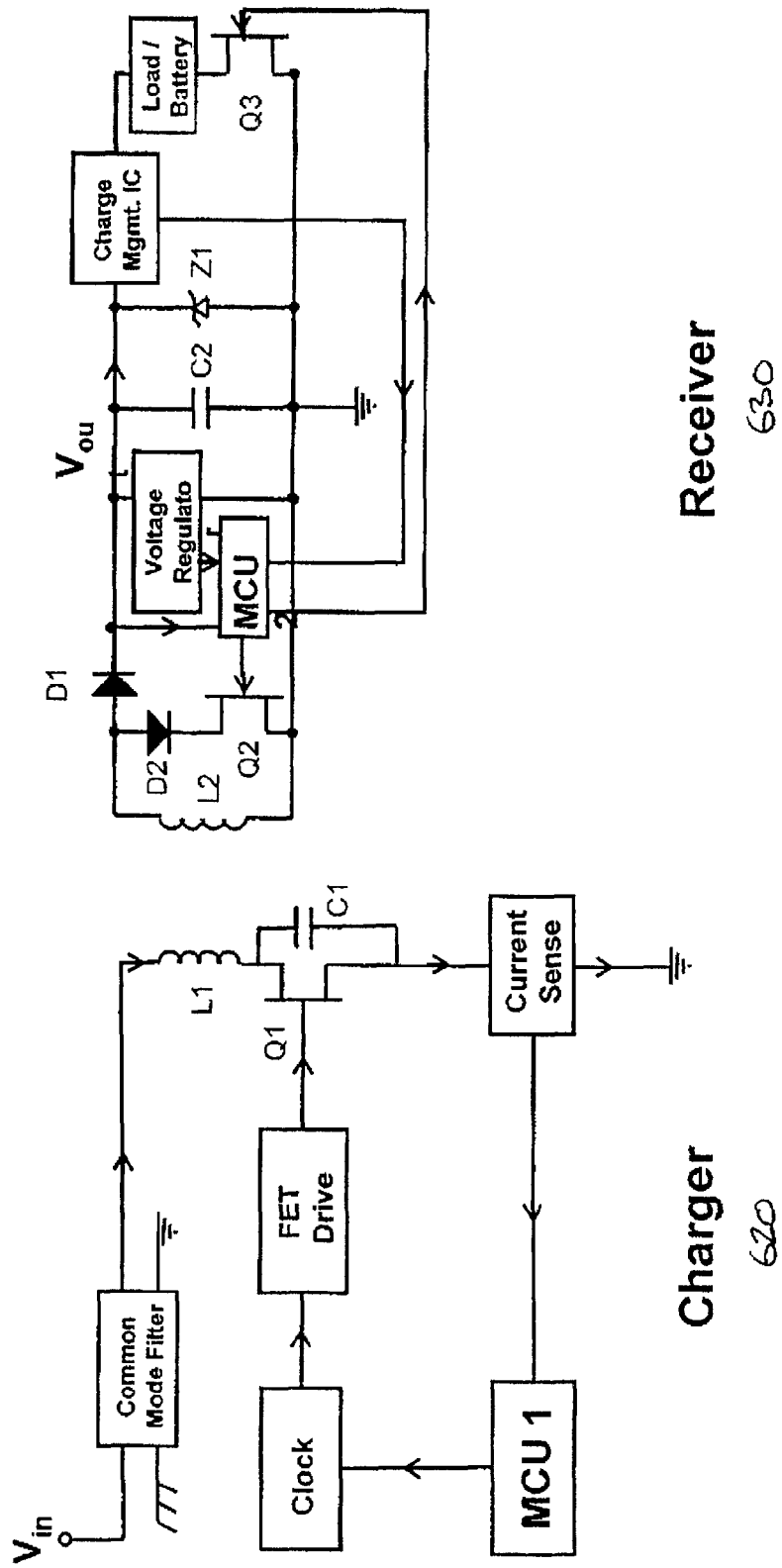
FIG. 28 shows an implementation of a charger in accordance with an embodiment, wherein the primary stage and the receiver stage communicate wirelessly.

FIG. 28 shows an implementation of a more sophisticated charger or power supply. According to this embodiment, where the primary stage and the secondary (receiver) stage communicate wirelessly. In the geometry shown in FIG. 28, a digital control scheme is implemented. The primary (charger or power supply) 620 is controlled by a Micro Control Unit (MCU1) that receives signals from a Current Sensor in series with the coil. The communication between the charger and the receiver 630 is achieved through the same coil as the power transfer. However, these functions can be separated.

In the geometry shown, the secondary (receiver) contains circuitry that enables this part to modulate the load as seen by the primary. In accordance with an embodiment this is achieved through modulation of switch Q2 by an MCU2 in the receiver. This can be a very small Programmable IC (PIC) and can easily fit into very small form factors. As the primary charger or power supply sends power to the secondary receiver, the circuit in the receiver turns on. The power received is rectified and filtered by rectifier D1 and Capacitor C2 respectively. Since MCU2 requires constant voltage input at all times, a small, low current regulator (Voltage Regulator) for powering MCU2 only is incorporated. This can be a linear or switching regulator. Since the power usage of MCU2 is very small and the unit can also be put into hibernation between tasks, use of this regulator does not affect the overall efficiency much. The output of the rectified stage is input to a device or Charge Management IC for the case of a battery charger configuration. This Charge Management IC is integrated into most Original Equipment Manufacturer (OEM) mobile devices that operate by rechargeable batteries or can be integrated into or on a rechargeable battery to directly charge the battery when the battery is in proximity to the charger. The Charge Management IC typically, for a fully drained battery, will pass on the maximum input current to the battery to enable rapid charging when the battery is at low voltage. This presents a low impedance load to the power supply circuit and requires the power supply to sustain the voltage at the required value while supplying the current. The Charge Management IC is in communication with the MCU2 which also monitors the output voltage (Vout) and tries to maintain this Vout within a pre-programmed range. This is achieved by MCU2 sending a digital signal to Q2 to modulate the switch. This modulation is prior to the rectifier stage and is at high frequency so the rectified and smoothed Vout is not affected. However, this modulation of the impedance of the secondary stage affects the current through the primary coil stage and can be easily detected by the Current Sense circuit in the primary.

In accordance with an embodiment the Current Sense circuit can comprise a small resistor in parallel to a voltage amplifier, a Hall sensor, etc. The output of the Current Sensor is connected to MCU1 and the digital sequence is detected by an A/D converter. The firmware in MCU1 determines whether the output voltage is too high or too low and then executes the appropriate step to adjust accordingly by sending a signal to a clock to adjust the frequency of the FET drive to bring the output of the power supply to within acceptable range. Higher drive frequency corresponds to lower output power by shortening the time for integration of power in the resonant ZVS cycle and lower frequency corresponds to higher output power.

In accordance with an embodiment, one method for implementing the variable frequency is to use a variable frequency source whose output frequency changes with change in the voltage to its input. Using a programmable resistor and changing this resistor value by varying a voltage signal from MCU1, the frequency for driving FET 1 can be changed. Other methods for achieving this change are also possible.

As an example of the method for control, in a typical application, the operating frequency of the circuit can be 1-2 MHz and the data transmission for control is at 14.4 kbits/sec. If the full output power range is achieved by moving the frequency in the 1.2-1.4 MHz, this range is broken into 256 steps. In one implementation, the receiver sends a digital code corresponding to the output voltage and MCU1 compares this to the earlier output voltage value and makes a determination about which direction and by how many steps to move the frequency. The frequency is then changed accordingly. In another implementation, MCU2 sends one of 2 values corresponding to a voltage high or low condition. If the voltage is within range, MCU2 does not communicate with the primary. When a voltage high signal is received, MCU1, takes a predetermined step towards higher frequency to lower the output power and the process is repeated until output voltage is within required range. A voltage low signal has the opposite effect. Many variations of these basic methods are possible to allow rapid, efficient locking of the output voltage. Proportional-Integral-Derivative (PID) techniques, etc. can also be used. Depending on the geometry, the circuit may also use a switch Q3 in series with the load. This optional switch may be opened during communication to create a better signal to noise ratio. Since communication occurs in several msec, opening and closing Q3 rapidly does not have a large impact on charging time of a load battery that can be in many hours.

In accordance with an embodiment, as the battery charges and its terminal voltage rises, the Charge Management IC throttles the incoming current back, and switches to a mode where the voltage across the battery terminal is maintained at or near its final value. The supply will sense a higher output impedance and MCU2 and MCU1 work in concert to keep the output within range throughout the charging cycle. At the end of the charge cycle, the Charge Management IC can signal end of charge cycle to MCU2 which sends a pre-determined code to MCU1 to shut down the charger, move to hibernation mode or take some other pre-determined step.

It is important to note that, in the embodiment, the voltage regulator in the receiver does not regulate the output voltage to the load itself. If the regulator was performing this function, then the control and regulation described here would not be necessary. However, the overall system efficiency is much lower and, with a constant power going into the receiver, some fraction of this power is wasted as the battery reached a full charge or as the load became lighter and less power was required. This wasted energy can heat up the receiver, the load, or the device battery depending on the geometry. All of these cases are undesirable. In the geometry described here, the primary can in these cases adjust to send less power to the receiver, thereby maintaining high efficiency regardless of load condition.

Verification and Data Transmission

In accordance with an embodiment, the digital transmission process described here is bi-directional, and can be used for verification process at start of charge or power transfer to ensure that the right kind of device is present and about to be charged, or to inform the charger or power supply about the voltage/power requirements of the device or battery to be charged or powered. In accordance with an embodiment, this bi-directional data transfer can also be used for actual data communication between a device and a charger or power supply. For example, the charger or power supply can be powered by the USB outlet of a laptop and simultaneously receive data from the laptop to be transferred to a mobile device. When a mobile device or battery is on the charger or power supply, it can be charged or powered, and its data can also be synchronized simultaneously through this channel.

Extension to Other Geometries

While the above discussion has focused on one implementation of the control with a Zero Voltage Switching power supply, the basic concepts for the control, verification, and data transmission are applicable to other geometries and topologies, and can be implemented in a similar manner. In accordance with some embodiments, the Charge Management Circuit is optional and is only used when a battery is present at the load. For example, as shown in FIG. 28, If Vout is used to directly operate a load, the Charge Management Circuit is not used and Vout is directly connected to the load.

Fully Regulated Switching Mode Supply with Wireless Communication

FIG. 28, described above, shows the basic building blocks for a digitally controlled wireless control circuit for a Zero Voltage Switching (ZVS) circuit were described. The geometry shown in FIG. 28 can regulate the output power through a wide range. However, as a battery charges or the load condition changes to require very low output powers, the accuracy required for control of the Vout may require many finer steps or not be possible with the geometry of FIG. 28 alone.

Figure 29:
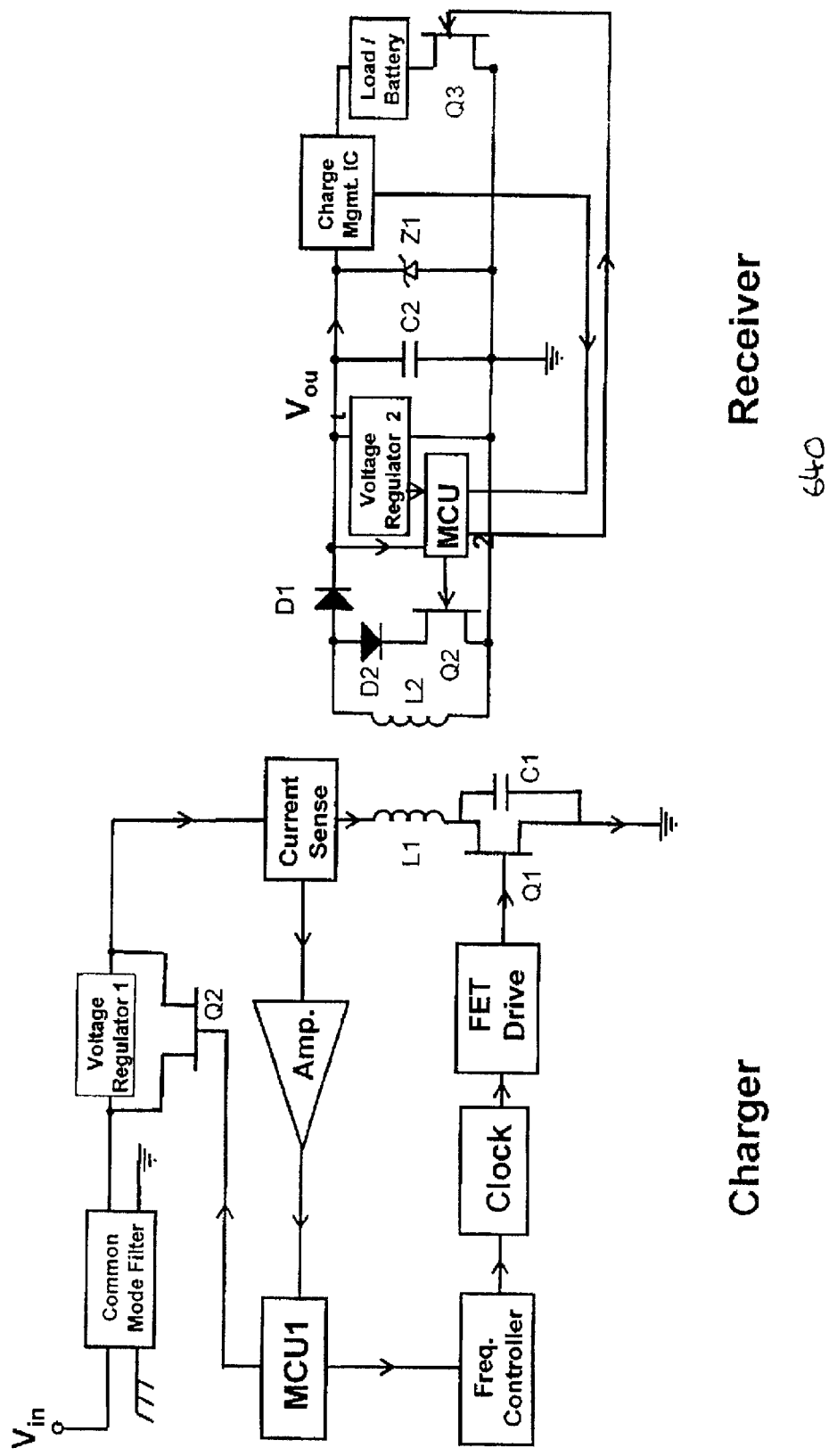
FIG. 29 shows an embodiment that includes Zero Voltage Switching (ZVS).

FIG. 29 shows an embodiment that includes an enhancement that can be used to address the ZVS issue.

In the fully regulated power supply shown in FIG. 29, a voltage regulator (Voltage Regulator 1) that can switch the input voltage between 2 values or more is used. In normal operation, Q2 is closed and the Voltage Regulator 1 is shut down though its enable pin. Therefore, the input voltage is directly available for the Coil L1 and is regulated as described earlier. However, if the output requires extremely low powers (such as end of charge stage for batteries), and the charger determines that a switch to a different range is required, Q2 is opened, and Voltage Regulator 1 is switched on to change the input to Coil 1 to a lower voltage value. Regulation is maintained at this range by shifting to the appropriate frequency to achieve required output power. For example, if Vin is 5 V, this lower voltage level may be 3 V. Multiple voltage levels are also possible.

Since for most cases, and in high power conditions, Q2 is open and Voltage Regulator 1 is turned off, high overall system efficiency can be achieved. Only during the lowest current conditions, the input voltage is changed by switching this Voltage Regulator 1 on and regulating at this level. Depending on the type of regulator used, some efficiency loss can be expected in this regime. However, this occurs at very low output power levels only. Voltage Regulator 1 can be a high efficiency Switching DC-DC supply or a lower frequency, less complicated and less costly linear regulator depending on efficiency/cost trade-offs.

Regulated Switching Mode Power Supply with Opto-Coupler Feedback

The geometries described above use a digital method for transmission of information between a primary and receiver circuit. However, in some cases, the load changes instantaneously. Examples are when in a laptop computer, the screen or the hard drive start or shut down, etc. To handle these cases, the feedback loop has to be extremely fast to avoid having severe and rapid voltage overshoots and undershoots. This becomes especially important for high power applications.

Figure 30:
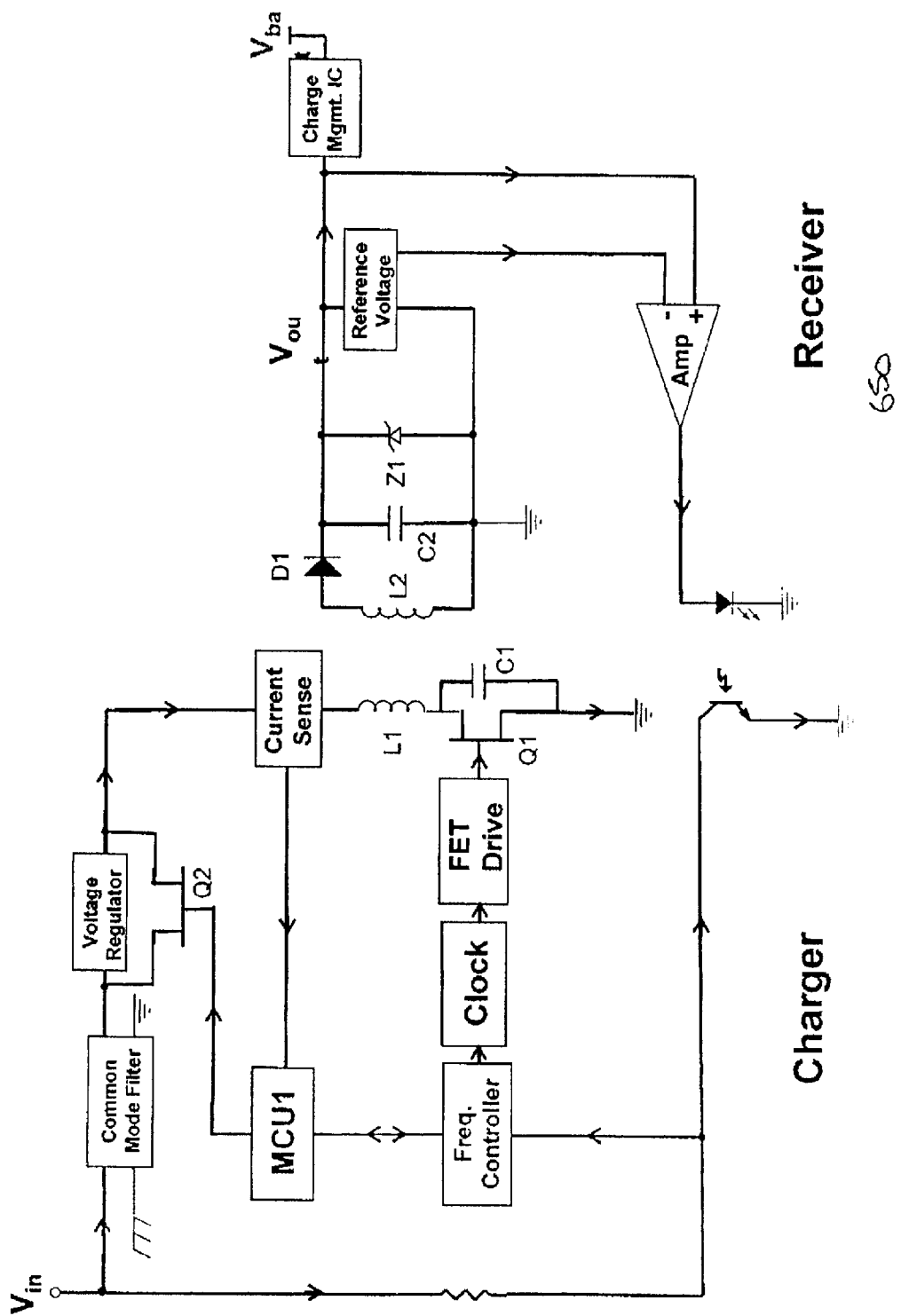
FIG. 30 shows an embodiment in which, instead of a digital feedback circuit, an analog circuit based on coupling between a light emitting diode (LED) and a light detector can be used.

FIG. 30 shows an embodiment in which instead of a digital feedback circuit, an analog circuit based on coupling between an LED and a light detector can be used.

In this case, the output voltage, Vout is continuously compared to a reference voltage and the intensity of light from a diode changes rapidly in proportion to the voltage value. A detector in the charger stage provides a voltage value to a frequency controller that controls the FET drive. An MCU in the charger, MCU1 also monitors the process and can switch on an optional lower voltage input to the primary coil (through Q2 and Voltage Regulator) if necessary. It can also sense the end of charge or perform verification or other tasks.

In some embodiments a high power completely wireless inductive charger for a laptop requiring up to 90 W continuously can be implemented with this scheme. In accordance with an embodiment the transformer coils are PCB spiral coils that have 4" or more diameters and comprise 7 turns with a total inductance of 1 micro Henry. The rapid response time of the analog circuit allows maintaining of the output voltage with rapid swings in the load. The charger or power supply comprises a pad where the charger or power supply circuitry and a flat spiral PCB coil are integrated into and the receiver comprises circuitry and a similar coil integrated into the bottom of a laptop. The optical components are mounted such that the light from the transmitter is detected by the receiver in the charger or power supply.

Digital communication through the optical parts is also possible to achieve this result, but requires a higher bandwidth and high speed processing.

It will be evident that these features, or any other geometry described here, can be combined to achieve the desired results. For example, while the control process for regulation may be through the opto-coupler feedback described here, a separate digital data link through the coil can be established for data transmission or verification of the charger, power supply, or vice versa.

Regulated Switching Mode Power Supply with Isolated Transformer Feedback

In accordance with an embodiment, another geometry for the regulation uses a similar analog feedback technique with the feedback information being transferred through a separate isolated transformer.

Figure 31:
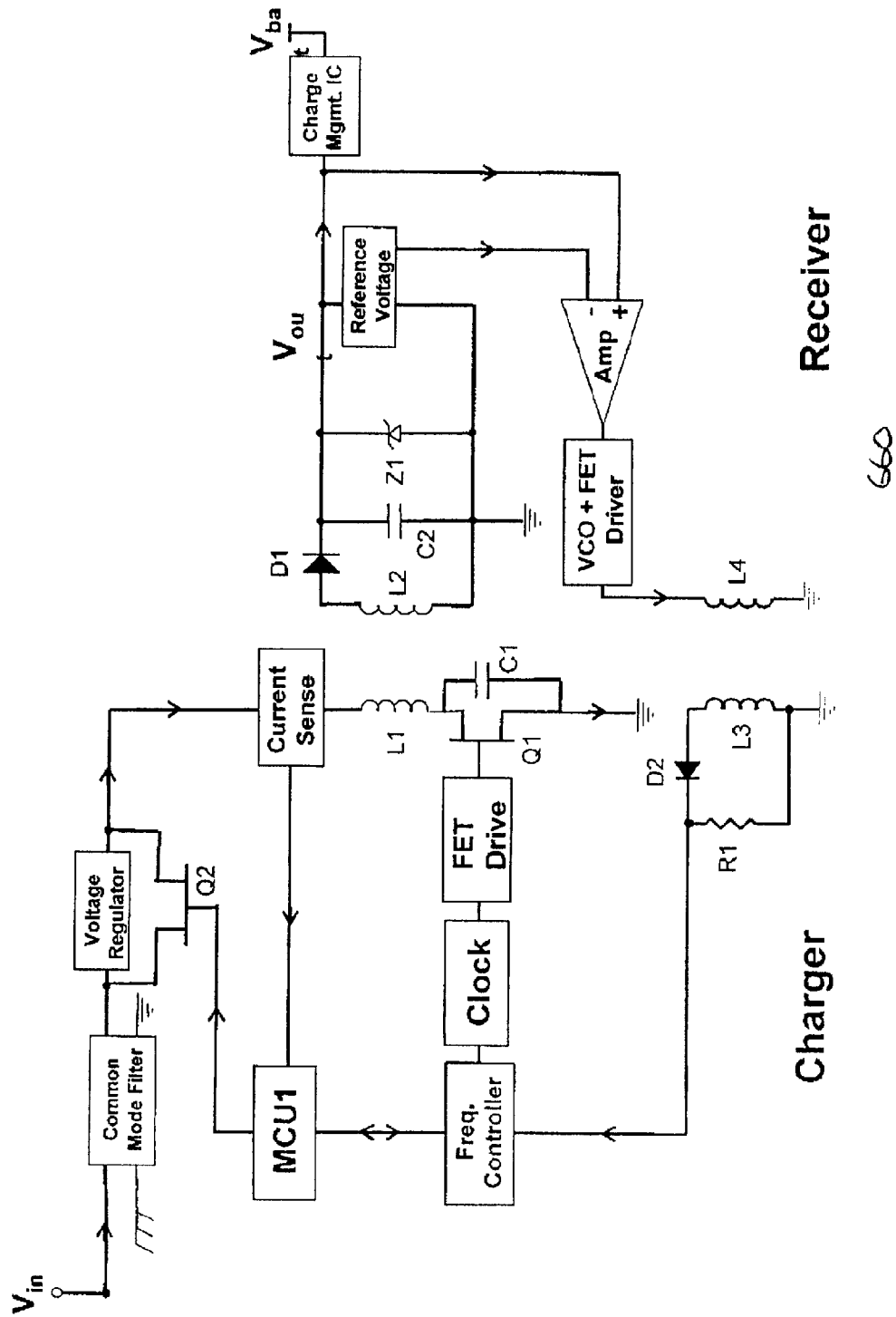
FIG. 31 shows an embodiment in which the opto-coupler is replaced by a Voltage Controlled Oscillator (VCO) and FET and in the primary, the signal is sent to adjust a frequency controller to provide optimum output voltage.

FIG. 31 shows an embodiment in which the opto-coupler is replaced by a Voltage Controlled Oscillator (VCO) and FET and in the primary, the signal is sent to adjust a frequency controller to provide optimum output voltage. An optional voltage regulator and switch Q2 can also be used to provide precise control at low output powers. Similarly, this communication can be implemented digitally, and also requires a high bandwidth to allow for rapid response. Since the circuit in FIG. 31 is completely wireless and does not require optical components, it may be preferable in cases where an optically transmissive window in the charger or power supply or the receiver may not be possible.

Regulated Switching Mode Power Supply with RF Feedback Regulation

In accordance with another embodiment, the information between the charger and the receiver can be exchanged through a wireless link in the two parts. The advantage with this embodiment compared to the optical case is that the two parts do not need to be optically transmissive. In addition, compared to the earlier-described versions (optical and through a transformer), the relative alignment is not as important. However, in most practical application, the charger or power supply and the receiver coil will be aligned for power transfer, so an alignment of some degree will occur and with the right geometry, can enable transformer or optical feedback alignment and regulation to be implemented.

Figure 32:
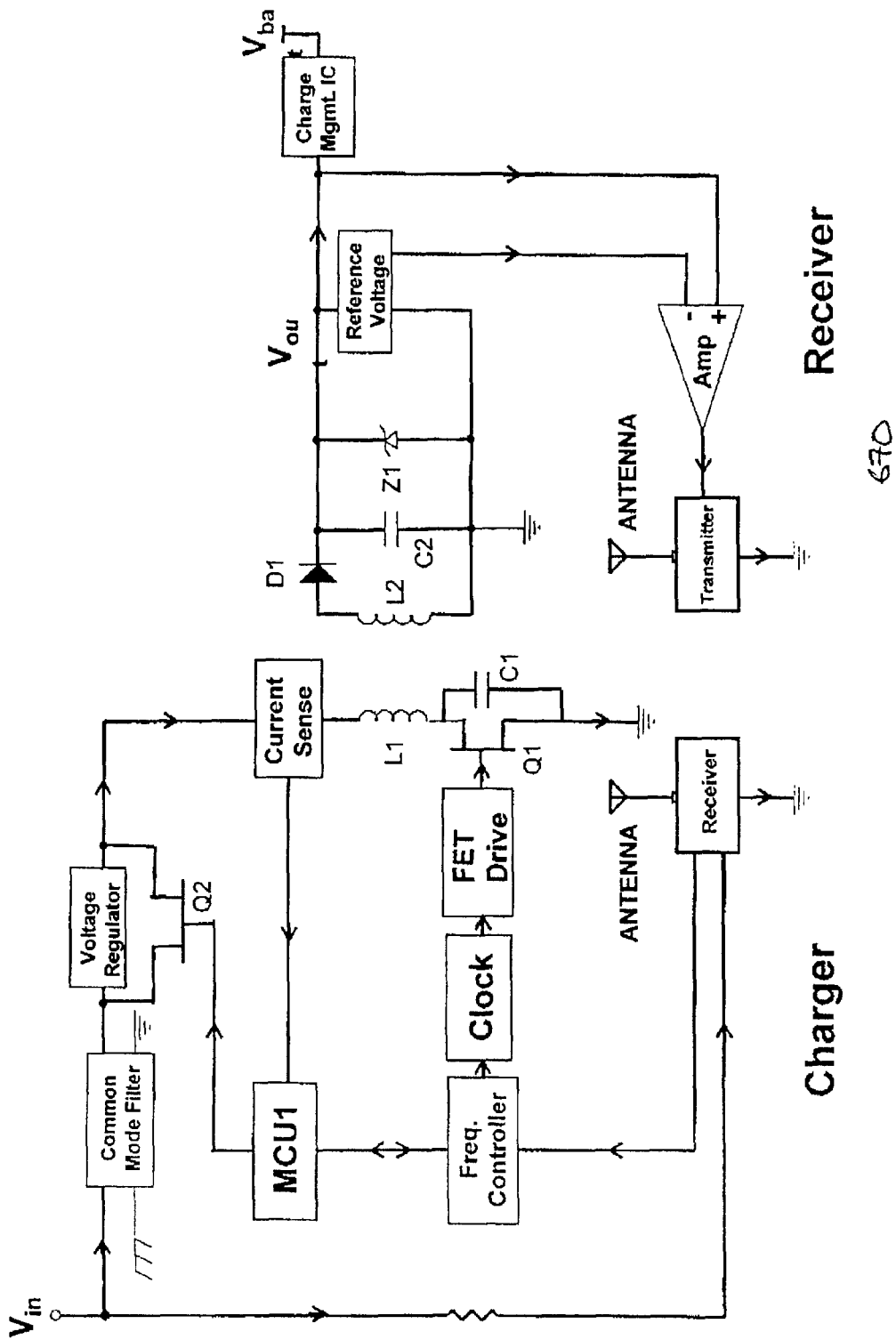
FIG. 32 shows an embodiment in which the wireless link can be analog or digital or can be integrated into the device to take advantage of existing wireless links in the device.

FIG. 32 shows an embodiment in which the wireless link can be analog or digital (requires higher bandwidth and complexity) or can be integrated into the device to take advantage of existing wireless links in the device (Bluetooth, WiFi, Wireless USB, WiMax, etc.).

Figure 33:
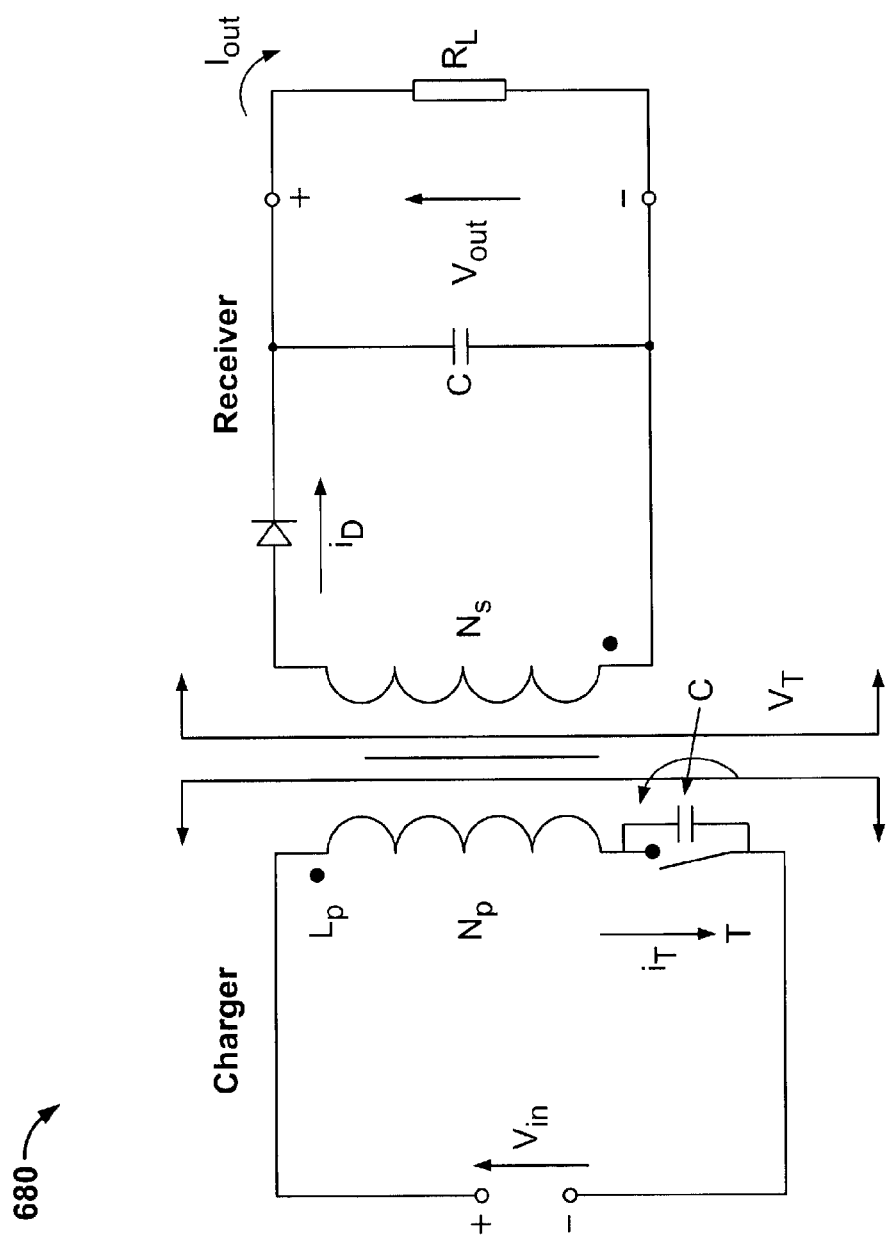
FIG. 33 shows a basic schematic for an inductive single coil charging system in accordance with an embodiment.

FIG. 33 shows a basic schematic for an inductive single coil charging system in accordance with an embodiment. As shown therein, the coil inductor in the charger pad is switched by Switch T which is typically a FET transistor. A capacitor in parallel with the FET may be used to improve performance. The receiver in the right hand side comprises a similar coil, rectifying diode, and a capacitor to provide DC output to a load $R_L$.

Figure 34:
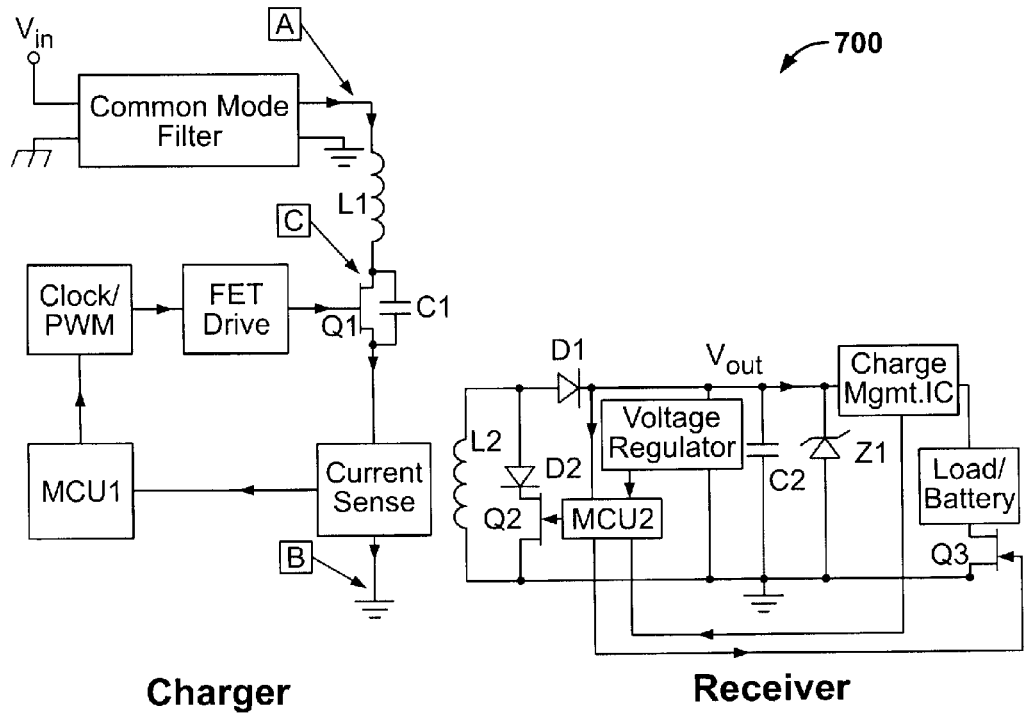
FIG. 34 shows the main components of a wireless power/charging system in accordance with an embodiment.

FIG. 34 shows the main components of a more advanced wireless power/charging system. Charge Management IC in the receiver also controls the charging of the battery to ensure appropriate charging. The MCU1 and current sense chips in the charger and MCU2 can provide bi-directional communication between the charger or power supply and the receiver for optimum charging or supply of power. The optional voltage regulator in the receiver is used to provide a constant low current voltage to MCU2 and is not regulating the power into the battery. The Receiver is integrated into or on a mobile or electronic device or a rechargeable battery. Points A, B and C are described later and can be used for placement of switching circuits. Q3 is a switch that can disconnect the battery during communication for higher signal to noise ratio and is optional.

An embodiment of the system incorporates a MicroControl Unit (MCU1) that can enable or disable the FET driver. This system also uses a Charge Management IC in the receiver which controls the charging of the battery to ensure appropriate charging profile is followed and the battery is not overcharged. Most mobile devices today already include a Charge Management IC in their power circuit between the input power jack and the rechargeable battery of the device to control charging of their internal battery. This chip can be incorporated into the receiver circuitry to enable a battery to directly receive power from an inductive source as shown in FIG. 34.

FIG. 34 also shows a Zener diode (Z1) incorporated at the receiver. This Zener is used to ensure that the output voltage from the rectifier does not exceed a pre-determined value. In some instances this may be important, since the output of the receiver is fed into a Charge Management IC that may have a finite turn-on time. At the beginning of charging (when a device is placed on a pad first), the Charge Management IC may seem like a high impedance load. Without the Zener diode, such a load may cause the voltage the input to the Charge Management Circuit to increase to high values, potentially exceeding its safe operating conditions. A fast Zener diode can clamp the voltage under this or other unusual conditions and may be incorporated into the receiver. Depending on the architecture, other methods for avoiding such conditions may be incorporated. Incorporating a Zener Diode is an effective, and inexpensive method for dealing with these potential issues.

In accordance with an embodiment, the receiver may also incorporate a voltage regulator just to provide a constant voltage (or voltage in the acceptable range for operation) to MCU2. This voltage regulator just provides the low power necessary for this and is not in the path of the main power going into the battery. Any power loss due to this regulator is small, because it is very low power and does not affect the overall system efficiency much. It is mainly used to keep the MCU active during startup or other changes so the communication with charger or power supply is maintained.

The MCU1 receives input from another sensor mechanism that provides information that it can use to decide whether a device or battery is nearby, what voltage the device or battery requires, and/or to authenticate the device or battery to be charged or powered. Several examples of the mechanisms for providing this information are:

The MCU1 periodically starts the FET driver. The current through the FET is monitored through a current sensing method. The inductance of L1 is highly dependent on the presence of objects nearby that affect its magnetic field. These objects include metallic objects or another nearby coil such as L2. Switching L1 at high frequency (100 kHz to several MHz) through a Field Effect Transistor (FET) such as Q1, the value of current being drawn is highly dependent on the L1 Value. This property can be used to sense the presence of nearby devices or batteries capable of drawing power and also to enable bi-directional communication if desired. Several methods for this are possible:
  A small resistor can be placed in series with the FET to ground contact. The voltage across this resistor can be measured by a current sensor chip such as Linear Technology Current Sense Amplifier part number LT1787.
  A Hall sensor such as Sentron CSA-1A that measures the current from a wire running under it can be placed on top of the PCB line from the FET to the ground to measure the current without any electrical connection to the circuit. The advantage of this approach is that no extra resistor in series with this portion of the circuit is necessary reducing the impedance.
  Other techniques can be used to measure the current.
  By monitoring the current and comparing it to a baseline measurement taken at power up, and periodically with no devices nearby, MCU1 can determine whether a device or battery is near the coil and drawing power. This provides a first level verification of an object capable of drawing power being nearby. However, there may be a possibility of false starts with metallic objects or wires in any electronic device or battery drawing power. A second level of verification may be desirable.

To enable a more secure verification, in accordance with an embodiment the MCU1 can periodically start the FET driver. If current is being drawn, MCU1 may activate the Q1 in a predetermined state (for example, this may be a low power state). This can provide a first level indication that a receiver may be nearby. If there is a genuine receiver nearby (versus, say, a metallic object, electronic device, or a non-approved receiver), the emitted power from L1 will power the receiver circuit. The charge control circuit in the figure or another chip in the Receiver circuit can be pre-programmed so that on power-up, it draws current in a pre-programmed manner. An example of this is the integration of the MCU2 and chip model number 10F220 Programmable IC by Microchip Inc. or another inexpensive microcontroller that upon power-up, executes a predetermined program that modulates the current being drawn in the receiver in a predetermined code (which can be encrypted). This receiver modulation can be detected as a current modulation in the current through the L1 by the charger or power supply current sensor in FIG. 34.

After the initial handshake and verification, the MCU1 and current sense chips in the charger or power supply and MCU2 can provide bi-directional communication between the charger or power supply and the receiver for optimum charging or supply of power. The system can also regulate the power and voltage received at the Charge Control Circuit to insure overvoltage conditions do not occur. As shown in FIG. 34, switch Q3 is a switch that can disconnect the battery during communication for higher signal to noise ratio and is optional.

If the handshake and verification between the charger or power supply and the receiver is not successful, the MCU1 will assume that the device drawing power is not an appropriate receiver and will terminate powering it. This process invalidates false starts due to objects being accidentally placed on the pad, and also provides protection against counterfeit or non approved receivers. An RFID, Near-Field Communication (NFC) or other wireless data transmission method reader that can detect an RFID, NFC, or other tag included with the receiver circuit and antenna (i.e. device or battery to be charged). The information on the tag can be detected to identify the voltage for the receiver required, and to authenticate the circuit to be genuine or under license.

The information on the tag can be encrypted to provide further security. Once a device containing the tag is near the charger or power supply pad, the tag reader is activated, the system reads the information on the tag memory, and compares it with a table to determine authenticity/voltage required or other info. In some embodiments, this information table can also reside on the MCU1 memory. Once the information is read and verified, the MCU1 can enable the FET driver to start driving the coil on the pad and to energize the receiver. A Hall sensor or a Reed switch can sense a magnetic field. If a small magnet is placed inside the receiver unit of the system, a Hall sensor or Reed switch can be used to sense presence of the magnet and can be used as a signal to start the FET.

Other capacitance, optical, magnetic, or weight, etc. sensors can be incorporated to sense the presence of a receiver and to begin the energy transfer process.

The methods for verification and communication between the charger or power supply and the receiver are provided above by way of example, and in accordance with various embodiments. In practice a combination or a variation on the above methods may be used. It will also be evident that different embodiments can use different verification techniques, in addition to or instead of those described above, and various combinations of such.

Efficiency Enhancements Through Lateral Offset Between Coils

Figure 35:
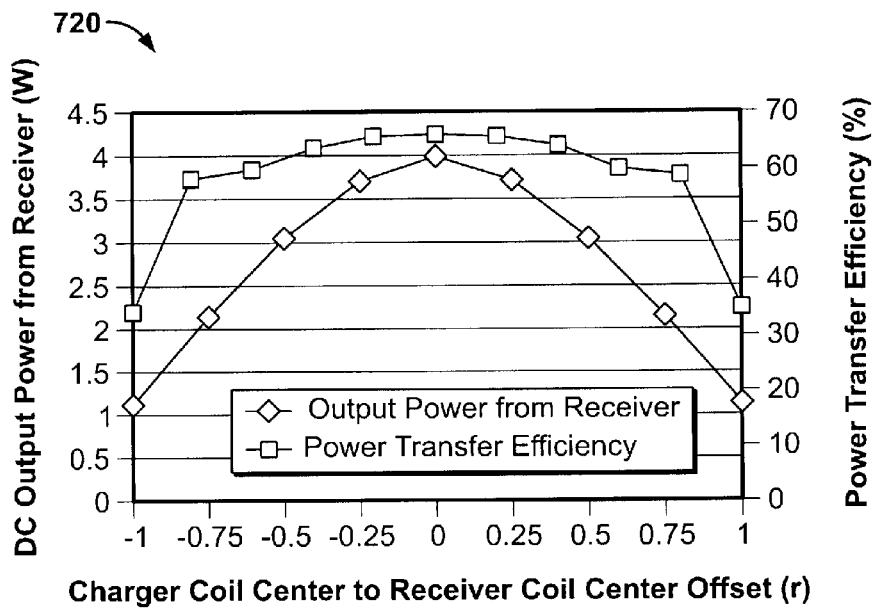
FIG. 35 shows a typical experimental curve for power transferred and Power Transfer in accordance with an embodiment.

FIG. 35 shows a typical experimental curve for power transferred and Power Transfer Efficiency through a pair of circular spiral coils as a function of lateral offset between the center of the coils. The power transferred is shown at the receiver after rectification and other electronics, and is the DC power available for charging/powering a device. Power Transfer Efficiency is defined as the DC Power out from the receiver divided by DC power into the charger or power supply circuit; so it includes any power consumed by the FET driver, the FET, rectifier diode, and other electronics. This efficiency includes all losses (electronics, coil to coil losses, rectifier, etc.) and is a more practical number for efficiency than the ratio of AC power out of a receiver coil to AC power into a charger or power supply coil commonly used. It can be seen that very efficient power transfer efficiency can be obtained with inductive methods. In accordance with the example shown, the coils can be identical and 1.25" in diameter and comprise 10 turns.

As can be seen from FIG. 35, for the coil geometries used here, at an offset between the center of coils of half the radius, the power transferred can be 75% of the maximum value. Improvements in flatness of the curve may be possible with changing the design of the coil to overlap more of the field on the outer areas of the coil or by using hybrid coils.

However, it is important to note that while the transferred power decreases with offset between the coil centers due to reduced overlap of the coil areas, the power transfer efficiency (ratio of DC power out from receiver to DC power into charger or power supply) remains relatively constant in the range of offset <3r/4. This is a more critical factor in design of an efficient system. If one assumes that a system can be designed such that the coil offset is never larger than r/2, then in a wireless charging or power transfer system, then, one can design the system such that the power transferred at this maximum possible offset is equal or greater than the maximum transferred power necessary.

For example, if FIG. 35 represents the maximum power transfer possible given the particular coil type, size, and geometry and the switching circuit (FET) and circuit design, then 3 W or more power can be transferred depending on the offset between the coils assuming that the coil offset is always smaller or equal to r/2. For a power supply application where regulated, constant power to a device is necessary, using regulation of the output power or a feedback to the charger or power supply to change the frequency or duty cycle, etc. to keep the power constant can insure that the received power to a device is independent of the offset between the coils. For example in this case, using regulation, one can ensure that up to a maximum power of 3 W can be provided to a load independent of coil offset (up to the maximum allowable offset—assumed to be r/2 here). In this case, the 3 W is sufficient for most mobile devices (mobile phones, cameras, Bluetooth headsets, etc.). Again, it is noted that the overall efficiency of the system remains high in all cases, since the offset (within the range of possible offset values) and regulation of the power (if it is performed at the charger or power supply by changing duty cycle, etc.) do not have a large impact on efficiency.

Position Independence Using Layers

From the discussion above, one can achieve the goals of high efficiency and position independence if a method is found wherein the offset between the charger or power supply and receiver coils is always kept equal or less than r/2. In the case of hexagonal spirals with side=r, the maximal diameter is 2r (similar to a circle with radius r). So for a given hexagon with side=r, the same relation holds. As described herein, several methods of achieving this are proposed.

Figure 36:
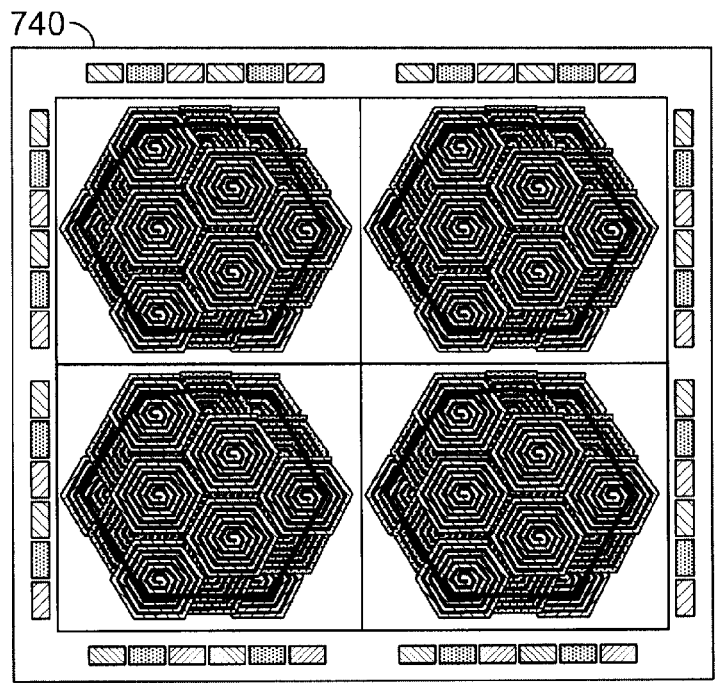
FIG. 36 shows an embodiment in which a coil mosaic is used to cover the surface area of a pad.

FIG. 36 shows an embodiment in which a coil mosaic is used to cover the surface area of the pad. The circuitry can include means of sensing the presence of a receiver coil to start the appropriate driver to provide power. The drive and sense circuits and other electronics are shown here as components in the perimeter of the coil area but can be located anywhere. The approximate Effective Area is also shown. If the center of a receiver coil is placed anywhere within the effective area, the receiver will receive the specified power with only one appropriate coil in the charger or power supply activated.

In the geometry described here, each coil is driven by its own drive circuit. A sensing mechanism senses the presence of a receiver coil on top or close to a charger or power supply coil and starts the drive circuit to power the appropriate coil. The sensing mechanism can be a current sense mechanism. Each coil drive circuit can periodically start driving the coil at an appropriate frequency and a current sense circuit can monitor the drawn current to sense when a receiver is nearby thereby affecting the inductance of the charger or power supply coil. Driving the charger or power supply coil circuit at an appropriate frequency determined by the inductances of the charger or power supply and receiver coils and the capacitance of the load, can provide very high sensitivity to this change in the inductance.

Additional verification can be obtained by exchanging a verification code through the coils or by exchange of information through a second wireless data communication link (such as RFID, NFC, WiFi, etc.) between the pad and the device(s) to be charged. The code exchange can also provide information to the charger or power supply coil regarding the necessary voltage, power, temperature, or other diagnostic information for achieving reliable charging.

The approximate Effective Area is shown in FIG. 36. Any point within the Effective Area shown has the property that a receiver coil placed with its center within this area is always within half a width or less of the center of at least one charger or power supply coil. If the system is designed such that moving the receiver coil within half the width of the center of any given activated coil provides at minimum the maximum output required (i.e. 3 W in the earlier example), the Effective Area has the property that a receiver coil with its center anywhere within this area can receive the necessary maximum output power or more with only one appropriate charger or power supply coil activated.

For the geometry shown in FIG. 36 comprising 75 hexagonal coils with side=r in 3 layers, the effective area is approximately 12 r wide and 6 mr high where mr is the minimal radius of the hexagon=r. The total area is approximately 62r. In accordance with an embodiment, the Coverage Efficiency (CE) is defined as the Effective Area in units of coil radius (for circular coils) or length of side (for Hexagonal coils) divided by the number of Coils used. CE~0.83 in this example.

To consider an example, one can take the maximum offset between the receiver and charger or power supply coil to achieve sufficient output power to be half the width of a coil (assuming symmetrical coils). Using coils with different width or radii (in the case of circular coils) or other geometries would change this value. It can be shown that a hybrid coil with a PCB coil and a wound wire coil are placed on top of each other is shown to have a more flat power transfer efficiency curve as a function of offset between the charger or power supply and receiver coil offsets. The general results and the operating principles for the embodiments discussed herein are valid regardless of what type of coil, geometry, or regulation is used to allow larger (or smaller) insensitivity to charger or power supply/receiver coil offset.

For the remaining portions of this document, embodiments are generally described which use half the width of the charger or power supply coil as the maximum allowable offset between the charger or power supply and receiver coil before the transferred power becomes lower than the desired maximum transferred power value.

The sense and control mechanism in the Configuration shown in FIG. 36 may be shared between a number of drive circuits to reduce parts count or may be integrated with each drive section. A number of other sense mechanism such as magnetic, optical, or capacitance sensors may also be used.

Figure 37:
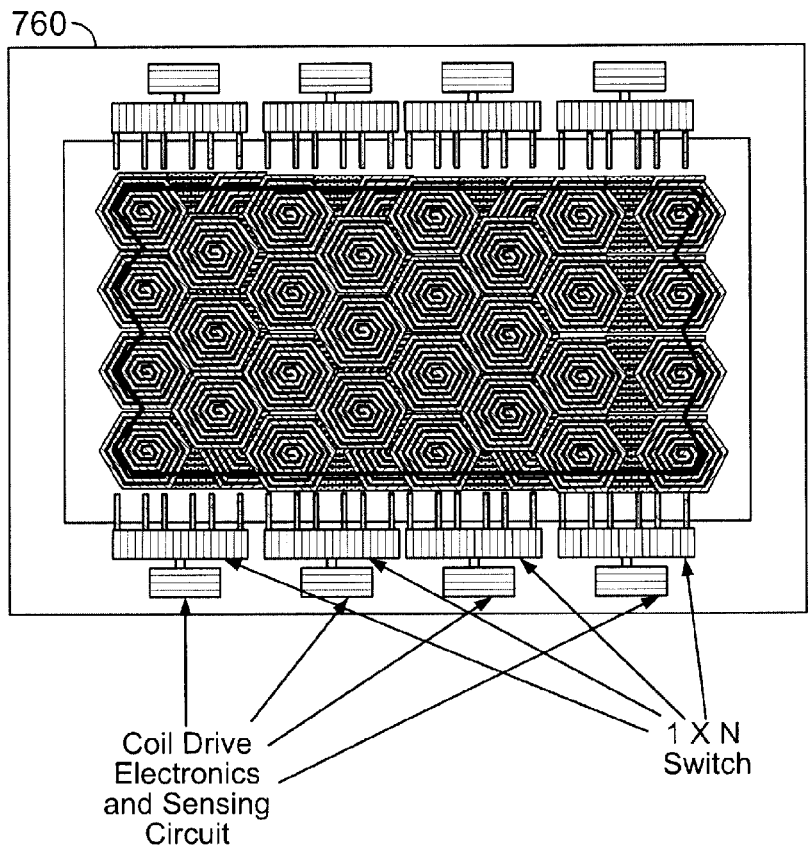
FIG. 37 shows an embodiment in which the number of drive (and sensing) circuits may be reduced by using electrical or electronic switches.

FIG. 37 shows an alternative embodiment in which the number of drive (and sensing) circuits may be reduced by using 1×N electrical or electronic switches. In this embodiment, a number (N) of coils are connected to a 1×N switch that is on the other side connected to a coil drive and sense circuitry. The switch periodically switches each of the coils in rotation to the coil drive and sense circuitry. Once an appropriate receiver coil in the vicinity of a charger or power supply coil is detected, that coil may be interrogated further to verify a chargeable device is nearby and then charging or powering of the device begins.

One drawback of this scheme is that since each drive electronics module can at most only be connected to 1 coil out of N coils in each segment, 2 devices placed on 2 different coils in that segment may not be powered or charged simultaneously. In practice, since each device to be charged will cover a certain amount of area on the surface, by appropriately segmenting the pad and choosing the size of charger or power supply and receiver coils, one can minimize the impact of this effect.

For an extreme case that N=NC (i.e. the number of coils in the pad), one can use a single drive and sense electronics module to monitor and power any coil in the pad thus greatly simplifying the architecture and potentially the cost of the charger or power supply. However, only one receiver coil, and hence only one device may be powered up or charged at any given time. The desirable characteristics of the 1×N switch are:

Low ON resistance: This would reduce wasted power in the form of heat at the switch.

High current capability: For power charging applications, depending on application and device to be charged, 0.5 A and higher, up to several Amps of current may be carried in ON state.

High reliability: Failure of a switch would render the related segment dysfunctional.

Fortunately, the switching speed of the 1×N switch is not critical for this application. For example, if it is desired for the pad to have a 1 second response time (time it takes for the pad to sense a device and begin charging), the switch must be able to disconnect and establish a new connection in under 1/N seconds (ignoring the time it takes for the sense and control circuitry to work which can be extremely fast). As an example, for N=10, this switch disconnect and connect time is under 100 msec, which is quite achievable. Even lower switching speeds are acceptable for longer response times.

In accordance with an embodiment, the 1×N switches may be implemented by electronics circuits or SPDT or DPDT IC switches, relays, MOSFETs, or Micro-Electro-Mechanical Systems (MEMS) switches. Other methods for switching may also be employed.

As an example of a an IC switch for this application, a series of Single Pole Double Throw (SPDT) switches with relatively low $R_{ds}$ of 80 mΩ that can be used in this application. An example of the SPDT is available in a Quad (four switches) pack and is capable of carrying 500 mA which is sufficient for most low power applications. If larger current carrying capability is desired, two or more of the switches may be used in parallel. This particular IC also incorporates over current, short circuit, and temperature sense circuitry which provides additional safety features for a system. A 1×N switch can be created by connecting several of such switches.

In accordance with one embodiment, the surface of a charging pad is divided into segments where within each segment, a significant Effective Area wherein the center of a receiving coil can be placed to receive power is created.

Figure 38:
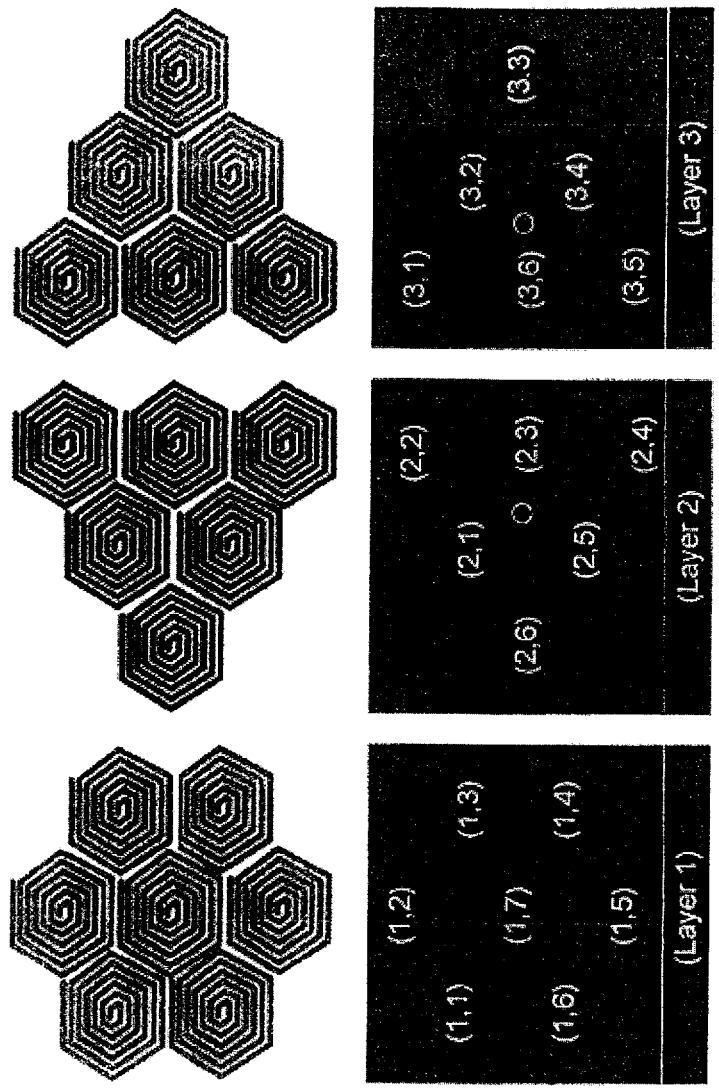
FIG. 38 shows an embodiment in which three coil layer printed circuit board (PCB) is arranged to provide a cluster for uniform power in an area using only one coil powered at any given time.

FIG. 38 shows a case where a three-coil layer PCB is arranged to provide a cluster for uniform power in an area using only one coil powered at any given time. In this case, layer 1 comprises six coils arranged around a central coil for a total of seven coils. The second and third layers comprise six coils total. In total, nineteen coils exist in the three layers of the PCB.

Figure 39:
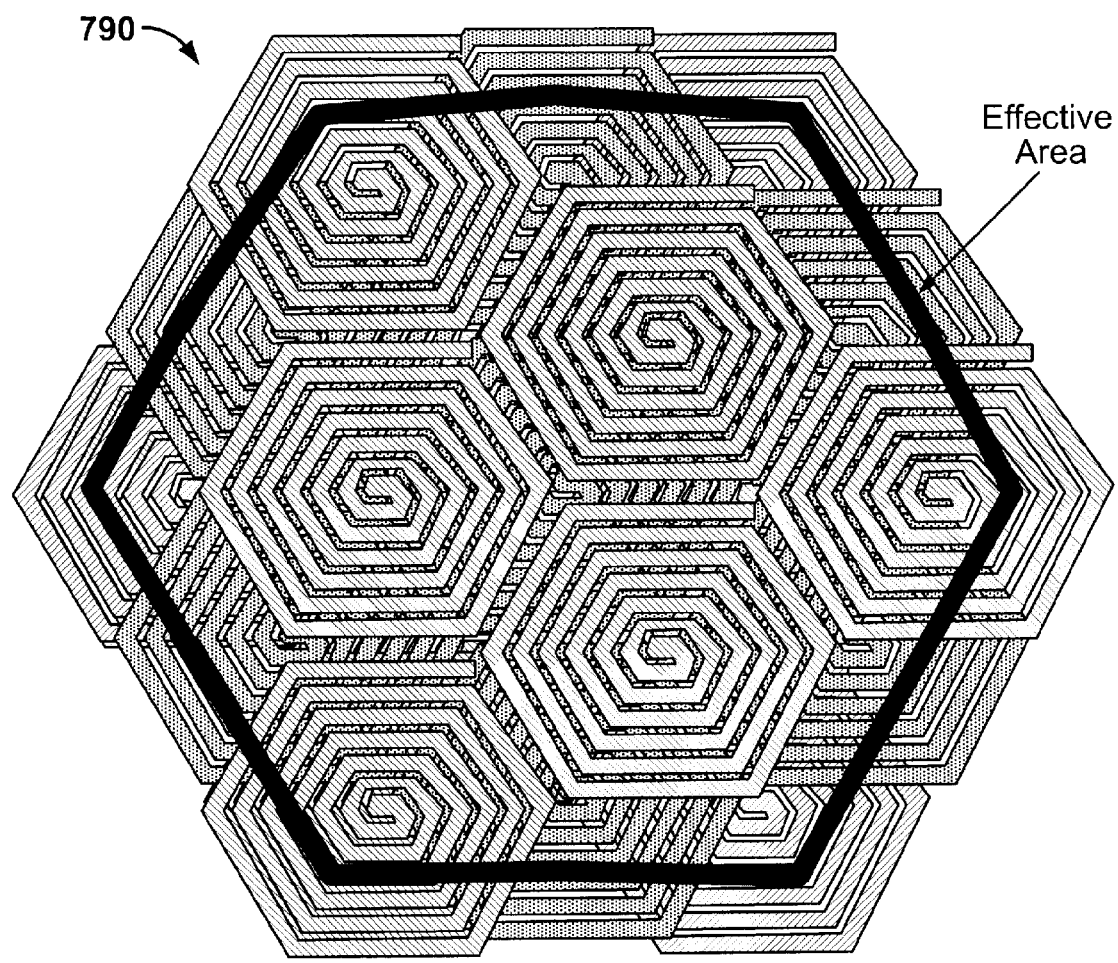
FIG. 39 shows an embodiment in which the coils are arranged such that by powering only one of the coils in the cluster, any receiver coil placed with a center within any location in the effective area can receive the specified power if the appropriate charger coil is activated.

FIG. 39 shows the coils are arranged such that by powering only one of the coils in the cluster, any receiver coil (for the receiver) placed with a center within any location in the effective area receive the specified power if the appropriate charger or power supply coil is activated. When the three layers are stacked together, seen from above, the structure is as shown in FIG. 39. As described above, any point within the Effective Area shown has the property that a receiver coil placed with its center within this area is always within half a width of the center of at least one charger or power supply coil. Therefore, it can receive the necessary minimum power or more with only one appropriate charger or power supply coil activated.

For the case shown in FIG. 38 with nineteen distinct coils, five of the quad SPDT chips mentioned above can provide the necessary Switching capability to allow a single drive and sense circuit to sense the presence or absence of a receiver coil near each coil. In accordance with an embodiment, the sequence can be:

The switches are set so that the coil 1 in Layer 1 shown as (1,1) in FIG. 38 is connected to a switching and sense circuitry similar to the left side of FIG. 34 (i.e. the charger or power supply in FIG. 34).

MCU1 gives a command to the FET driver to begin switching the coil. The duty cycle may be set very low to generate a low voltage in any potential nearby receiver coil.

If a receiver coil is nearby, it begins drawing power from the charger or power supply coil. This can be sensed as a higher than normal current draw in the current sense circuit of the charger or power supply.

Additionally, the charger or power supply and receiver coil can exchange a code to confirm that a valid device or battery with appropriate circuitry is nearby and verified.

At this point, the amount of current through the sense circuit is digitized by MCU1 and saved in its memory.

Alternately, the receiver circuit can note the amount of voltage or power being received and report back to the charger or power supply. This information can be encoded by modulating the input impedance of the receiver circuit by MCU2. This information is then sensed by the charger or power supply sense circuitry, digitized by MCU1 and saved.

The FET driver and therefore the FET are disabled.

The switches are configured to connect the drive and sense circuitry to the next coil (Coil (1,2) in this example).

Commands 2 through 8 are executed until all coils have been activated and tested.

MCU1 compares the values received for sense currents and determines which coil has the highest sense current when turned on. This is the closest charger or power supply coil to the receiver coil. If additional circuitry for confirmation of valid receiver through exchange of code is implemented, the closest coil has to also pass this test.

The appropriate coil is turned on and charging starts. An additional verification can be performed prior to start of charge.

The charging continues in open or closed loop depending on the system architecture until end of charge is achieved. This is either indicated to the charger or power supply by the MCU2 or sensed in the charger or power supply sense circuit by a change in the amount of current being drawn.

Depending on the characteristics desired and cost/performance tradeoffs, it may be decided that for each cluster, 2 or more drive and sense circuits and a smaller number of switches are used.

Figure 40:
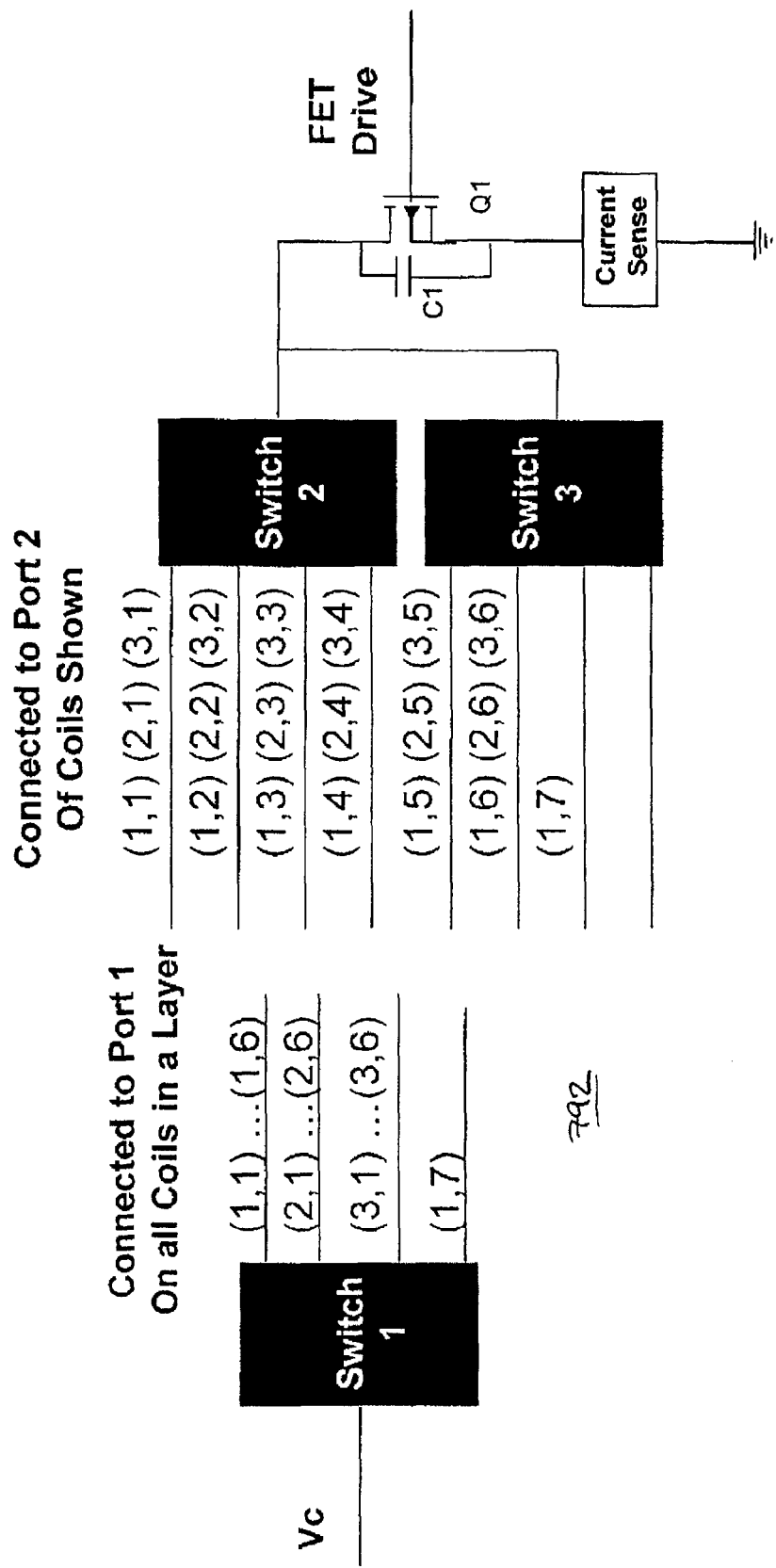
FIG. 40 shows an embodiment in which the number of switches required is reduced.

FIG. 40 shows one configuration wherein the number of switches required is reduced to three to switch to any of the 20 coils in FIG. 39. The first switch connects the Vc to one of the ports (outside or inside contact point of the spiral coil) on every coil in one of the three layers. The other ports of groups of three of coils from different layers are connected together and input into the switches 2 & 3 as shown in the figure. The outputs of Switch 2 & 3 are connected together, and connect to the FET for switching. The center coil (1,7) is connected to the poles of the switches by itself. This coil is often the most likely coil for the receiver coil to be adjacent to since it is central. Comparing FIG. 40 with FIG. 34 shows that using this scheme, any one of the coils in the system can be connected by the switches to be driven by the FET.

Depending on cost/performance trade-offs involved, it may be advantageous to cut the number of switches by schemes such as shown in FIG. 40. Such a scheme can also be used to cut down the number of switches in a larger array. For example, the array in FIG. 36 comprising 75 coils would require 19 Quad SPDT ICs to implement. However, by using one Switch to choose one of the 3 layers and 7 switches to choose one of the 25 coils in each layer, one can achieve the same results with 8 total switches.

With further cascading of switching layers, it is possible to further reduce this number. However, it must be noted that cascading of switching layers increases the Series Resistance along the current path of the charger or power supply coil which is undesirable.

In the examples given above, the switching is shown for Point A in FIG. 34 prior to the coils. However, Point B can also be used for this purpose.

The associated electronics are shown on the perimeter of the coils but can be placed in other locations too.

Figure 41:
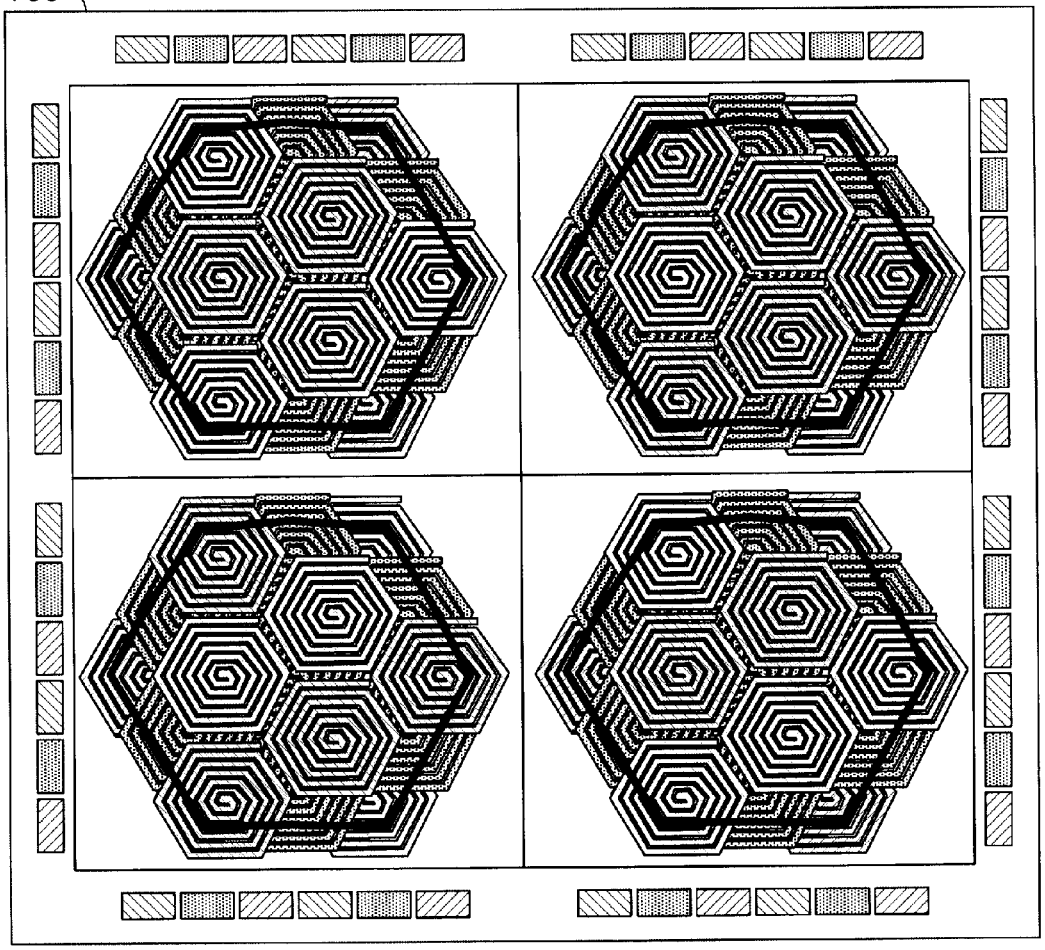
FIG. 41 shows an embodiment of a multi-charger pad that incorporates a plurality of charging clusters.

FIG. 41 shows a multi-charger or power supply pad that incorporates four of the clusters shown in FIG. 39. A device to be charged or powered would have to be placed such that the center of the receiver coil is within one of the effective areas in one of the clusters or segments. As an example, if the cluster is made of hexagons with side lengths r, a hexagonal Effective Area in the center of the cluster with a maximal diameter of 5 r is created. The Effective Area ~19r achieved with 19 coils giving a Coverage Efficiency=Effective Area (in coil radius or side length Units)/Number of Coils=1.

For a typical coil of r=0.625" side, this leads to a maximal diameter of 3.125". Such an almost circular Effective Area with a diameter of over 3" can be marked on the surface of the charger or power supply pad and allows the user to easily place the receiver coil inside (or on) a mobile device such as camera, mobile phone, batteries, game players, etc. in the right location for charging without much alignment and effort. Each of the clusters in the configuration shown in FIG. 41 can have their own coil drive and sense circuits or may share this circuitry through multiplexing with switches.

In this way, a practical system for providing a large Effective Area in each charging area (i.e. segment) while maintaining high power transfer efficiency is developed. A significant advantage is also that simultaneous charging of multiple devices can be achieved.

It should be noted that the charger or power supply coils can be designed to be larger than the receiver coils. By doing so, one can obtain an even larger effective area and insensitivity to placement of the receiver coil. The Effective Area has a maximal diameter of 3r. Other combination of coil patterns to achieve local position independence with a number of coils can be constructed.

Figure 42:
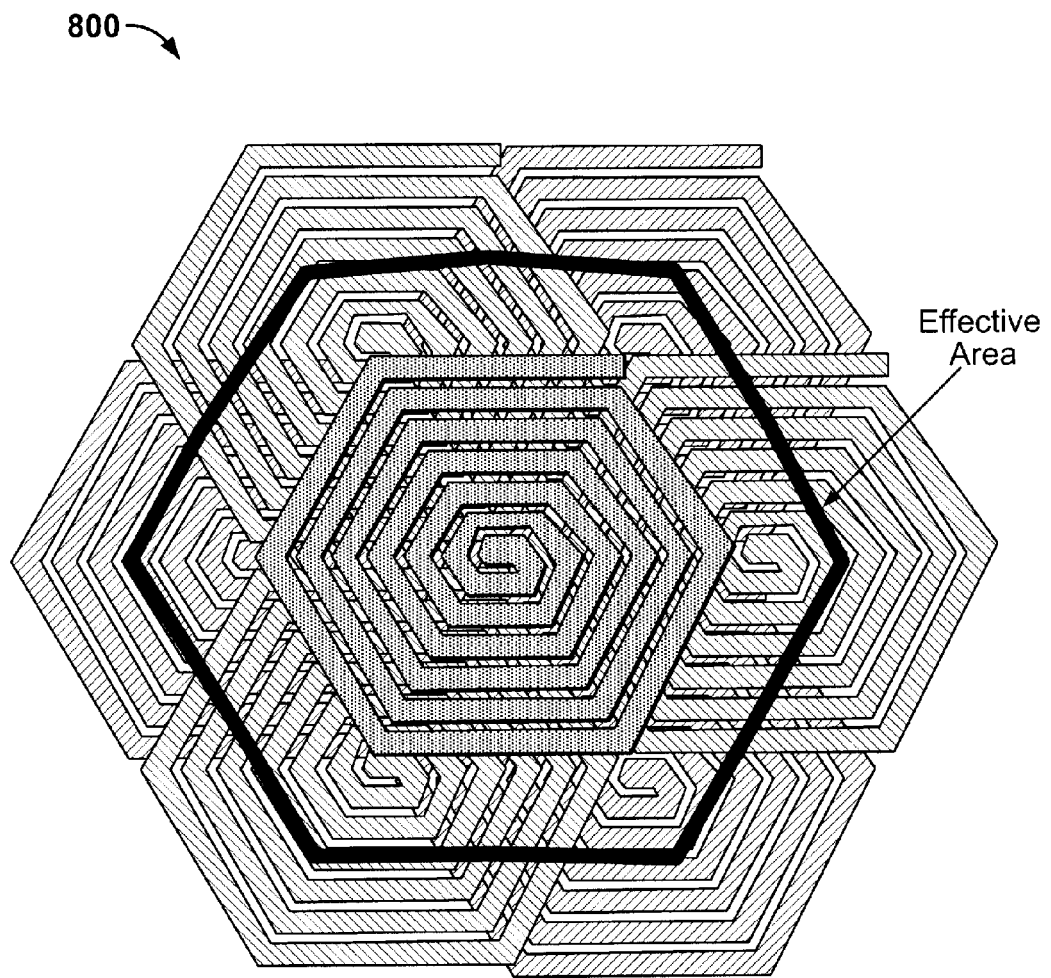
FIG. 42 shows an embodiment that uses a cluster of two layers of three coils and a central coil to create an effective area.

FIG. 42 shows a cluster of 2 layers of 3 coils and a central coil (total 7 coils) that can create an effective area of 3r. In practice, such an area may be sufficient for many applications. It will be noted that while Hexagonal coils are shown in many of these figures, a combination of Hexagons and/or circles, or other shapes can be combined to provide the best efficiency/position independence performance. Similarly, the size and shape of the receiver can be non-Hexagonal.

For example, in FIG. 42, the central and the receiver coil can instead be circular (spiral coil) and the central charger or power supply coil is the most likely charger or power supply coil for the receiver coil to be on top of. If the receiver coil is placed on any other position, a hexagonal coil is the closest coil and be powered. In accordance with other embodiments, the central coil in FIG. 16 can be larger than the receiver coil and cover most of the likely central area. The remainder of the coils would only be used if the receiver is placed in extreme outside locations.

It must be noted that the foregoing description describes the situation wherein the transmitted power drops to acceptable levels when the coil centers are offset by half the radius. In practice, this value can be different and by using a combination of coil patterns and sizes and regulation of the transmitted power, uniform power transmission across an area can be maintained.

While the use of IC switching elements has been discussed above, other switching mechanisms such as MEMS, relays, etc. can be used to achieve the results. In accordance with other embodiments, the switching may be implemented by creating a deformable layer under the coil layers to act as the switch. Each spiral coil discussed here has 2 ports with one at the outside diameter wherein the coil starts and one at the center wherein the coil terminates.

Figure 43:
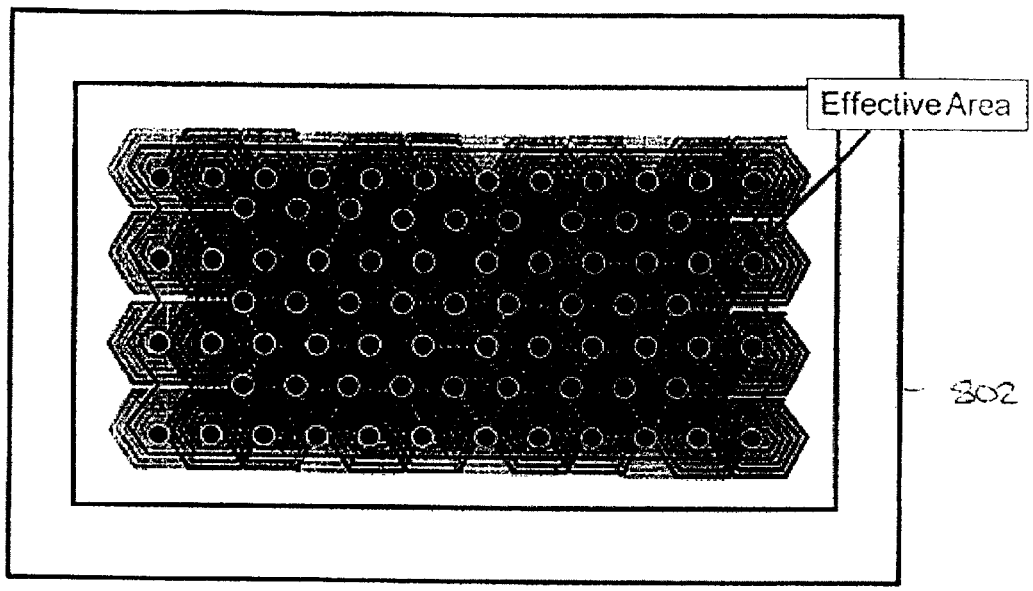
FIG. 43 shows a mosaic of hexagonal coils with the central port to each coil shown as circles.

FIG. 43 shows a mosaic of hexagonal coils with the central port to each coil shown as circles. In accordance with an embodiment, one of the ports of all of the coils in the 3 layers (in this case, the outside port) is connected to a common point, called here P1. The other port of each coil (shown as the central one here) in the mosaic pattern of FIG. 42 is brought down through vias to a common layer at the bottom of the multi-layer PCB and connected to a copper pad with a certain surface area. Such a pattern seen from above (the same side as FIG. 43) is shown in FIG. 44.

Figure 44:
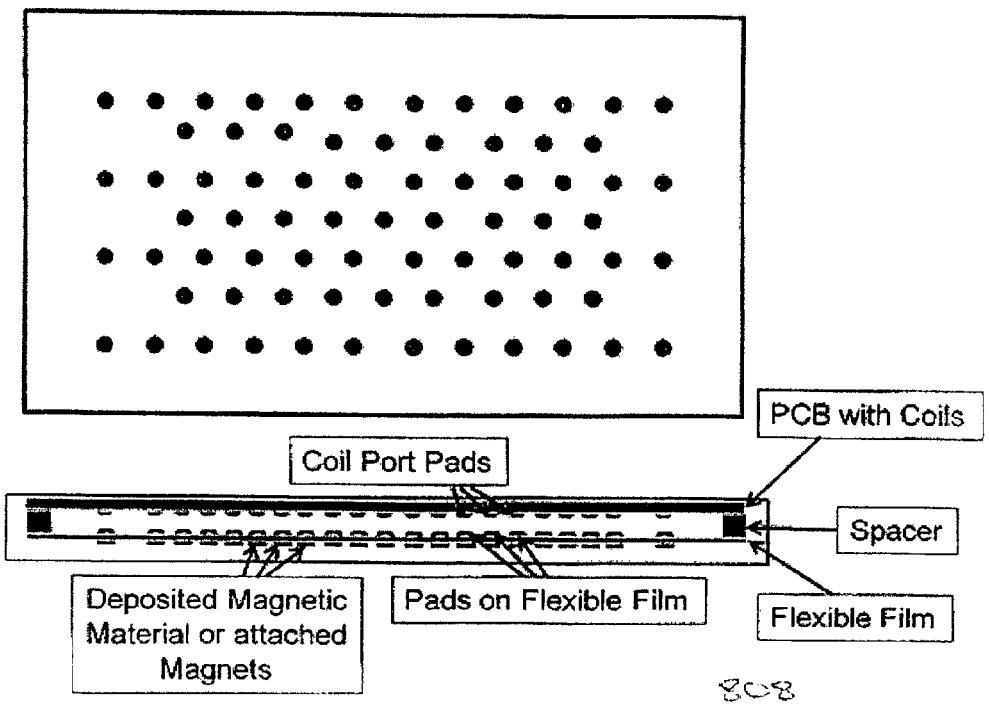
FIG. 44 shows an embodiment of a MEMS pad including the top view.

FIG. 44 shows the top view seen from the same side. The side view of the pad has integrated MEMS switch for contacting individual coil contact pads.

In an earlier U.S. patent application Ser. No. 11/669,113, the use of attracting magnets placed at the centers of an inductive charger or power supply's PCB coil and the center of the receive coil to align and center the 2 parts conveniently has been described. Such techniques were used in the charger or power supply for mobile device or battery alignment.

In accordance with a present embodiment, a planar conductive layer or conductive traces patterned with conductive pads similar to the coil port pattern shown in Top part of FIG. 44 and all connected to a common point (called P2 here) is created on a flexible material film. Examples of the material for the flexible film are mylar, polyimide, flexible PCB material such as Kapton, etc. or plastic. At the center of each of the pads, a small magnet or ferromagnetic material is attached to the other side of the film. Alternatively, a layer of ferromagnetic material is deposited and patterned to have a pattern similar to FIG. 45 top so that only material with a pattern similar to the PCB port pad remains. The flexible film is attached to the bottom of the PCB such that a small gap between the top layer of the film and the bottom of the PCB is created by a spacer. The side view of the MEMS charger or power supply pad is shown in FIG. 44.

The entire package shown in the bottom of FIG. 44 has 2 electrical connection points. One from the PCB, called P1 that is connected to one of the ports of all of the coils in the 3 layers of the PCB (in this case the edge port). The other connection is to the common pads on the flexible film. This is called P2. Looking at FIG. 34, the entire package can be treated as L1, and connect P1 to point A in this circuit and P2 to point C.

Ordinarily, none of the coil center ports are connected to the contact pads on the flexible film and therefore the circuit is not completed. If a receiver coil with a magnet attached to the back of its PCB coil and the magnet oriented with correct polarity is brought close to the pad, it attracts the magnet or patterned ferromagnetic layer at the center of the nearest charger or power supply coil and at the bottom of the flexible film towards itself. This causes the top conductive layer on the flexible film to make contact with the center port of the appropriate coil and close the circuit. In this way, current can flow only through the appropriate coil and then activate it.

In accordance with an embodiment, to avoid oxidation of the contact pads at the bottom of the PCB and the flexible film contacts, these surfaces can be protected by deposition of additional layers such as gold or other material on top of the copper. Such processes are often used in PCB manufacture to protect exposed contacts. In addition, the PCB pad package can be hermetically sealed to avoid dust contamination on the contacts. Additionally, the volume inside can be filled with an inert gas such as nitrogen.

By optimizing the surface area of the contact pad and the flexible film contact areas and material composition, low contact resistance can be obtained. Other parameters to optimize are the area of the magnet or magnetic material and the type of material used.

The configuration above is provided by way of example. In accordance with other embodiments, it is possible to connect the components in a different manner, or to place in an external drive circuit in a different configuration to achieve the desired result. A 3 layer board has also been used to demonstrate this approach. Simpler constructions with 1 or 2 layers or configurations wherein the coils in the different layers have different functions or sizes and provide different power levels can also be implemented. The advantages of this approach are:

1—High efficiency: Only the appropriate coil for high coil overlap is activated.

2—Position Independence: The receiver coil can be placed anywhere with its center in the Effective Area and achieve specified power transfer.

3—Low cost: The pad does not use any IC switching elements for connecting to the appropriate coil.

As described above, in accordance with an embodiment the entire package in FIG. 44 is connected between points A and C in the circuit of FIG. 34. One example of the operation of the system is described in more detail here:

MCU1 gives a command to the FET driver periodically to begin switching the coil. The duty cycle may be set very low to generate a low voltage in any potential nearby receiver coil.

Ordinarily, none of the coils is connected to point C in FIG. 34. Therefore, no current is sensed in the current sense circuit.

If a receiver coil is placed on the pad, it will cause the appropriate charger or power supply coil center port to contact the pad on the flexible film and therefore the appropriate coil is contacted to points A and C in FIG. 34.

The receiver coil begins drawing power from the charger or power supply coil. This can be sensed as a higher than normal current draw in the current sense circuit of the charger or power supply.

Additionally, the charger or power supply and receiver coil can exchange a code to confirm that a valid device or battery with appropriate circuitry is nearby and verified.

Once MCU1 determines that an appropriate receiver coil is on the pad and ready to draw power, the FET is turned on and charging starts. An additional verification can be performed.

The charging continues in open or closed loop depending on the system architecture until end of charge is achieved. This is either indicated to the charger or power supply by the MCU2 or sensed in the charger or power supply sense circuit by a change in the amount of current being drawn.

The description provided above describes what happens when the activation of the MEMS switch occurs through magnetic attraction. In accordance with some embodiments, the switch can be designed such that it closes at the appropriate location due to static attraction, pressure, temperature change, or other mechanism.

In the MEMS system described above, a disk or other magnet in the receiver coil attracts a magnet or patterned ferromagnetic layer attached or deposited under the flexible film to close the contact beneath the appropriate charger or power supply coil to the FET. However, in other embodiments a ferromagnetic layer can also be used in the middle of the receiver coil (on the front of the PCB, its back or separate layer from the coil layer) and use either permanent magnets or deposit or sputter, etc. a patterned ferromagnetic layer that is permanently magnetized behind the flexible layer film. In this way, the charger or power supply pad would contain multiple magnetic points corresponding to the centers of the coils. When a ferromagnetic material is brought close to the pad, the appropriate coil is activated. To avoid false starts with metallic objects placed on the pad, secondary verification techniques, as described above, can be used, including in some embodiments an exchange of code between the charger or power supply and receiver coil.

Examples of metals that can be used are Ni, Fe, Co, or various commonly used alloys. These can be deposited on a flexible film in a variety of ways such as sputtering, evaporation, e-beam, plating, etc.

The system shown in FIG. 44 is mostly designed to operate with a single FET and allow charging of a single device somewhere on the pad. If 2 devices are placed on the pad and 2 coils are connected to the pad, the power transferred may not reach the full specified power and it may not be clear which device is sending or receiving the control signals during charging.

In accordance with an embodiment, to overcome these issues, a segmented pad where clusters of charger or power supply coils are attached to individual drive and sense circuits and are independent of each other can be used.

The X-Y area is divided into segments (in this case 4 shown). One coil in each section can be driven by an appropriate FET and sense Circuit for that segment. Top: The pattern for contact pads at the bottom layer of the PCB. Each pad is connected to the central port of a coil in one of the 3 layers above. The top view is shown here. Bottom: The side view of the pad with integrated MEMS switch for contacting individual coil contact pads. Spacers at the edges and the walls of the segment areas keep the flexible film at a pre-determined distance from the bottom layer of the PCB.

Figure 45:
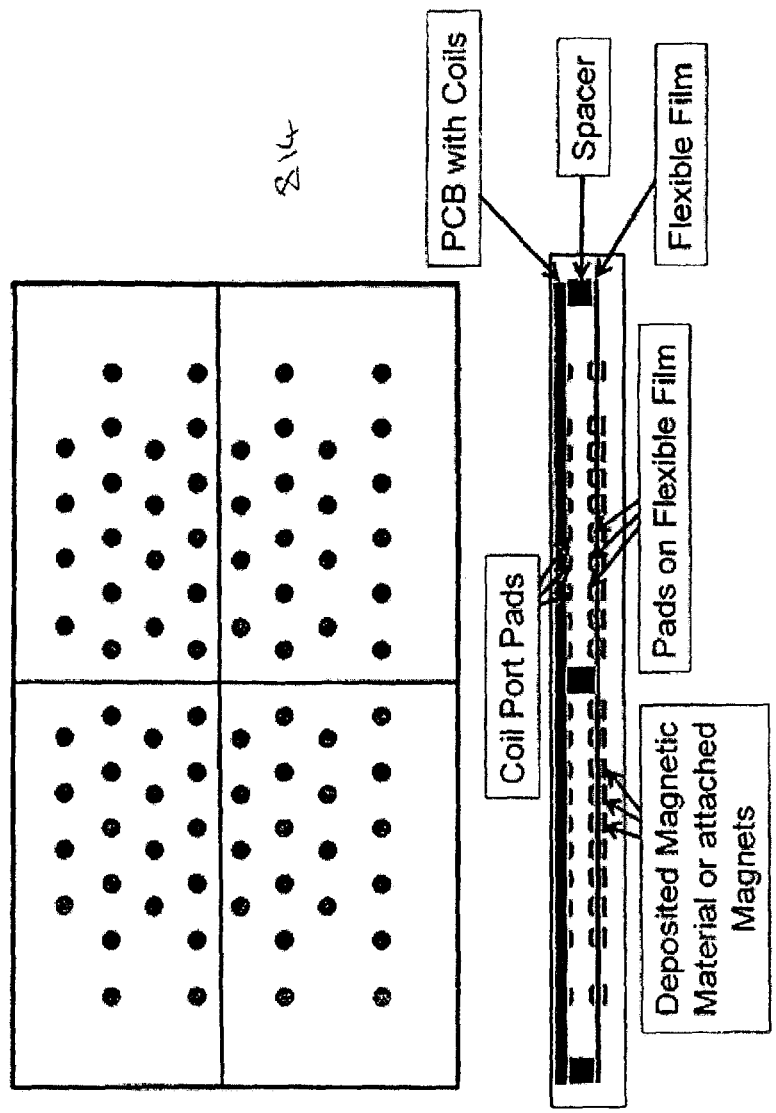
FIG. 45 shows an embodiment of a MEMS pad including a segmented MEMS charger pad.

FIG. 45 shows the architecture of the segmented MEMS charger or power supply pad in accordance with an embodiment. Each segment comprising a number of coils is connected to points A and C of a different driver and sense circuit. Thus, devices placed inside each segment can be driven with their own driver and are independent. In this way, several (in this case 4) devices can be charged or powered simultaneously.

In FIG. 45, additional spacers are placed at the boundaries of the segments. These spacers may help with keeping the flexible film/PCB gap constant and operation of the flexible film uniform along the X and Y direction. Such spacers interspersed in the X-Y plane between the PCB and flexible film layer may be used regardless of whether the pad is segmented electrically or not.

In accordance with some embodiments, the MEMS switching method described here can also be applied to the cluster geometry shown in FIG. 41 or any other geometry.

Conductive Multi-Charger or Power Supply Surface

Figure 46:
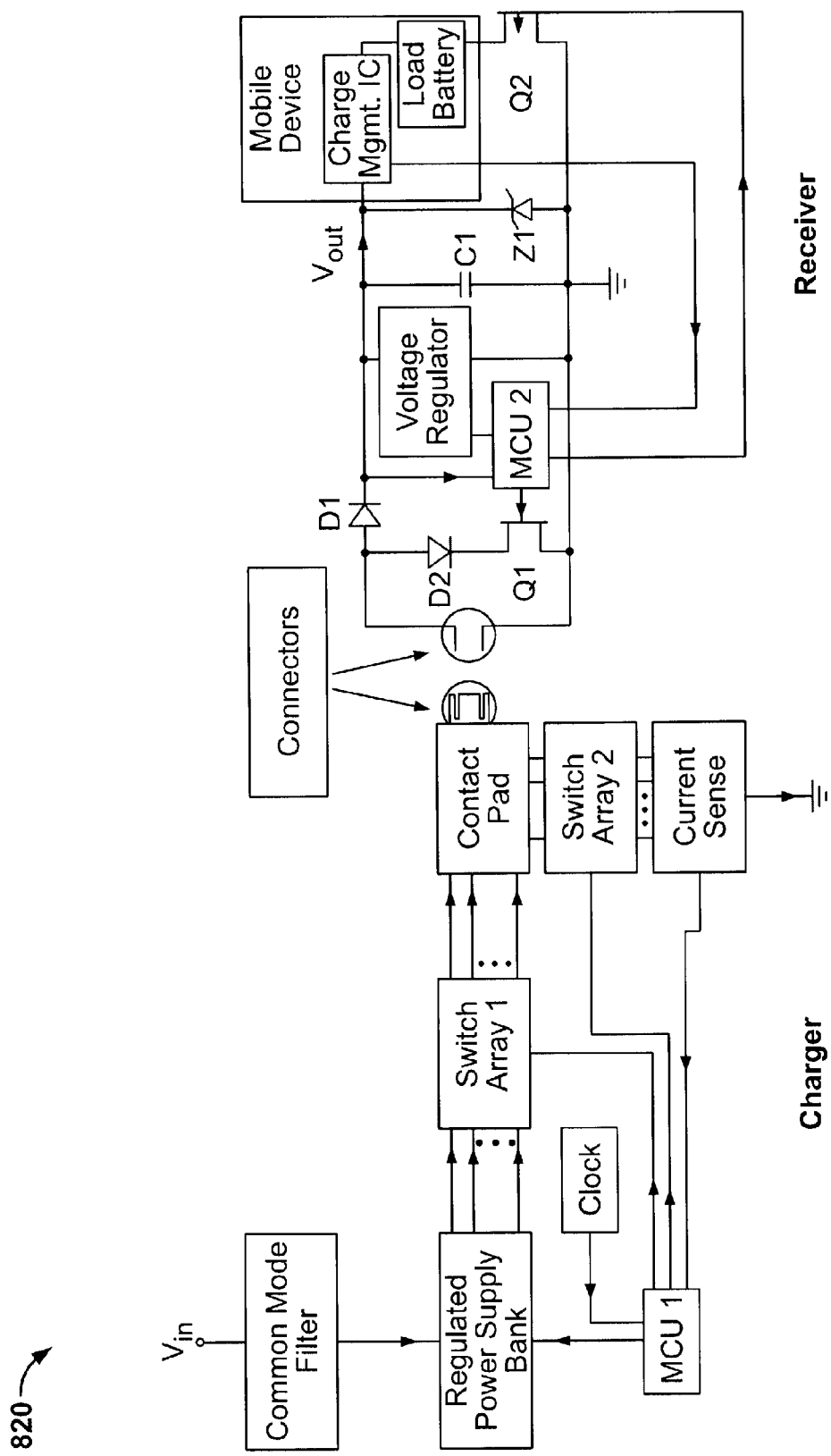
FIG. 46 shows an embodiment in which one or more regulated power supplies are connected to the charger pad.

As discussed above, in accordance with some embodiments, another method for charging or powering multiple devices on a common charger or power supply surface is to incorporate a number of connector points or strips into the pad. The user can place a device with an appropriate connector on a pad or similar object and receive power through matching contacts on the pad. FIG. 46 shows a general diagram for this approach is shown in. In this approach, one or more regulated power supplies are connected to the charger or power supply pad. The pad comprises an array of contacts or strips of exposed connector.

Figure 47:
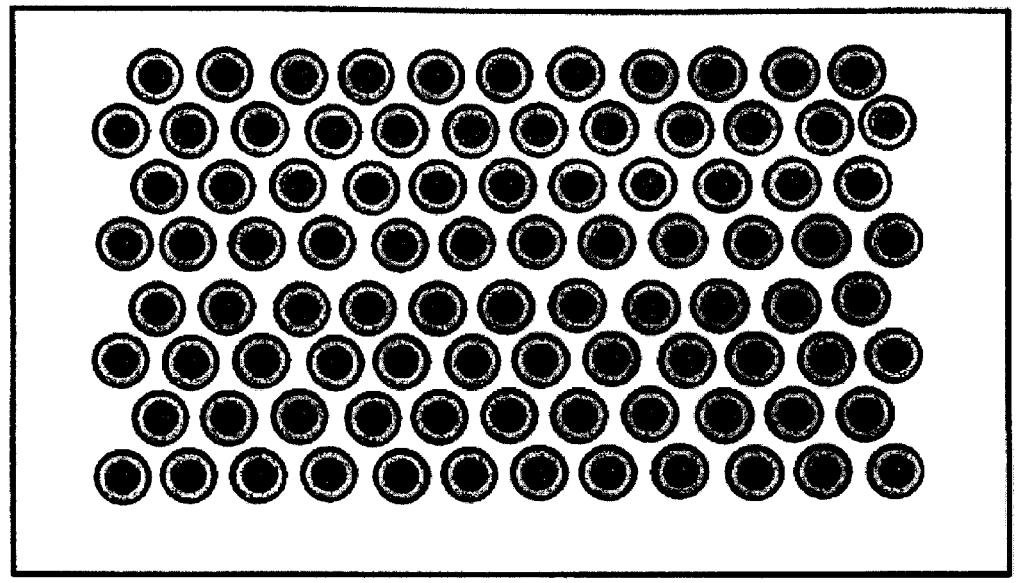
FIG. 47 shows an array of contacts on the surface of a pad in accordance with an embodiment.

FIG. 47 shows an array of contacts on the surface of a pad. In FIG. 47, each position comprises a Voltage and Ground contact. In this picture, the connector is shown as a recessed circle similar to a washer where one contact is in the middle and the other contact is in the body or outside of the circle. Other connector geometries are possible.

A device with an appropriate mating connector at its bottom or in a plug-in unit for after-market applications can be placed on the pad and the connectors on the device make appropriate contacts to the pad contacts if placed on one of the contact points. In accordance with an embodiment, the connectors on the surface of the charger or power supply pad are connected to a number of switches which are connected to regulated power supplies and sense circuits as shown through switch arrays as shown in FIG. 46. MCU1 periodically turns ON one of the regulated power supplies. The switches are set such that a connection is made to the 2 contacts of a contact point in the pad. The sense circuit detects any possible flow of current. If a current flow is detected, the system may verify the presence of a valid receiver through exchange of information through the contact with a MCU2 in the receiver. If no current is being drawn or the verification process fails, the MCU1 reconnects the supply to the next contact position. By rastering the entire pad periodically, contact to several devices on the pad for charging or power can be established. A diode D1 can be used for protection against reverse voltage, a Capacitor (C1) to filter any potential noise on the regulated power supply output, and MCU2 to enable communication between the Charger or power supply and the Receiver are shown. The receiver may also incorporate a voltage regulator to provide a constant voltage (or voltage in the acceptable range for operation) to MCU2. This voltage regulator just provides the low power necessary for this, and is not in the path of the main power going into the battery. Any power loss due to this regulator is small because it is very low power and does not affect the overall system efficiency much. It is mainly used to keep the MCU active during startup or other changes so the communication with charger or power supply is maintained. However, these components are optional and may not be present depending on the architecture used. The description provided herein does not depend on use of these components for operation.

If the ground (through a sense circuit) contact for all positions is connected together, then Switch Array 2 can be eliminated. Care must be taken to interpret the received signals in interpreting the current sense values since it is the sum of currents from all devices being charged.

The switching arrangements discussed above for the Inductive cases can be modified and used for this type of conductive switching as well. In addition, the MEMS based approach shown above are applicable to this application.

Figure 48:
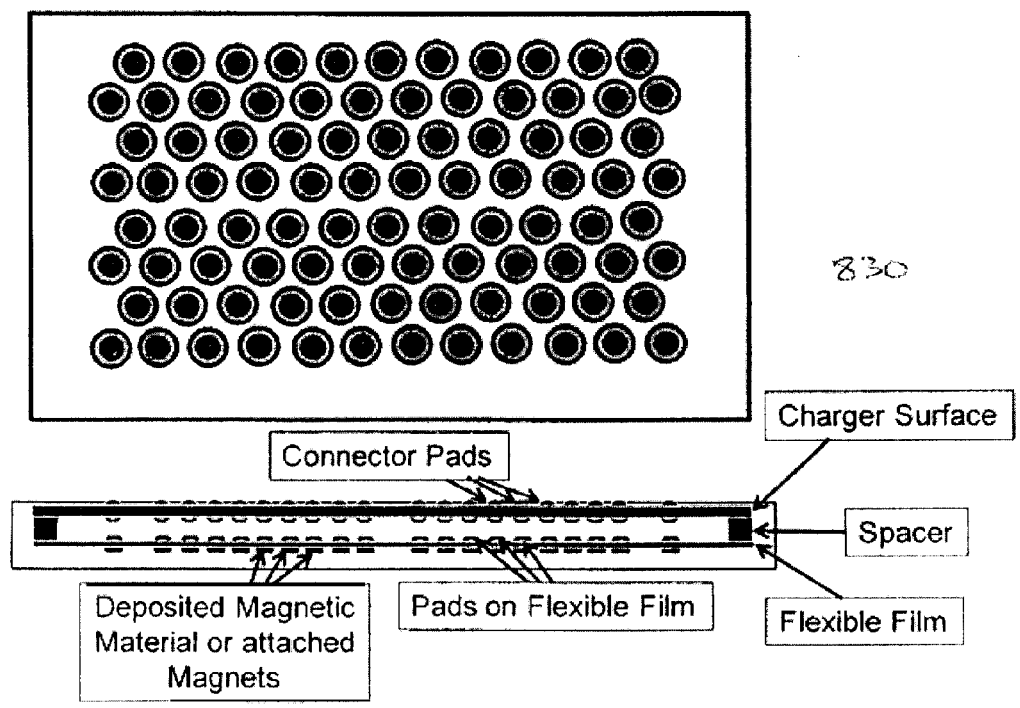
FIG. 48 shows the side view of a MEMS conductive charger pad in accordance with an embodiment.

An embodiment for a universal charging pad using conduction is shown in FIG. 48. In this case, one of the contact points for each position (e.g. Ground contact) is connected together throughout the pad and connected to the appropriate location (Ground through the sense circuit in this case). The other contacts are brought through the charger or power supply surface to the bottom of the surface and contact pads are formed.

Top: The pattern for contact pads at the layer below the connectors. One of the contact points for each position (e.g. Ground contact) is connected together throughout the pad and connected to the appropriate location (through Sense circuit to Ground in this case). Bottom: Side view of the pad with integrated MEMS switch for contacting individual contacts to the power supply. Spacers at the edges keep the flexible film at a pre-determined distance from the bottom layer of the PCB.

In accordance with an embodiment, a planar conductive layer or conductive traces patterned with conductive pads similar to the charger or power supply surface contact pattern shown in Top part of FIG. 48 and all connected to a common point (called P2 here) is created on a flexible material film. Examples of the material for the flexible film are mylar, polyimide, flexible PCB material such as Kapton, etc. or plastic. At the center of each of the pads, a small magnet or ferromagnetic material is attached to the other side of the film. Alternatively, a layer of ferromagnetic material is deposited and patterned to have a pattern similar to the Top in FIG. 47 so that it only material with a pattern similar to the charger or power supply surface pad pattern remains. The flexible film is attached to the bottom of the charger or power supply surface such that a small gap between the top layer of the film and the bottom of the charger or power supply surface is created by a spacer.

FIG. 48 shows the side view of the MEMS conductive charger or power supply pad. Using the MEMS conductive charger or power supply pad eliminates the need for switching arrays.

Figure 49:
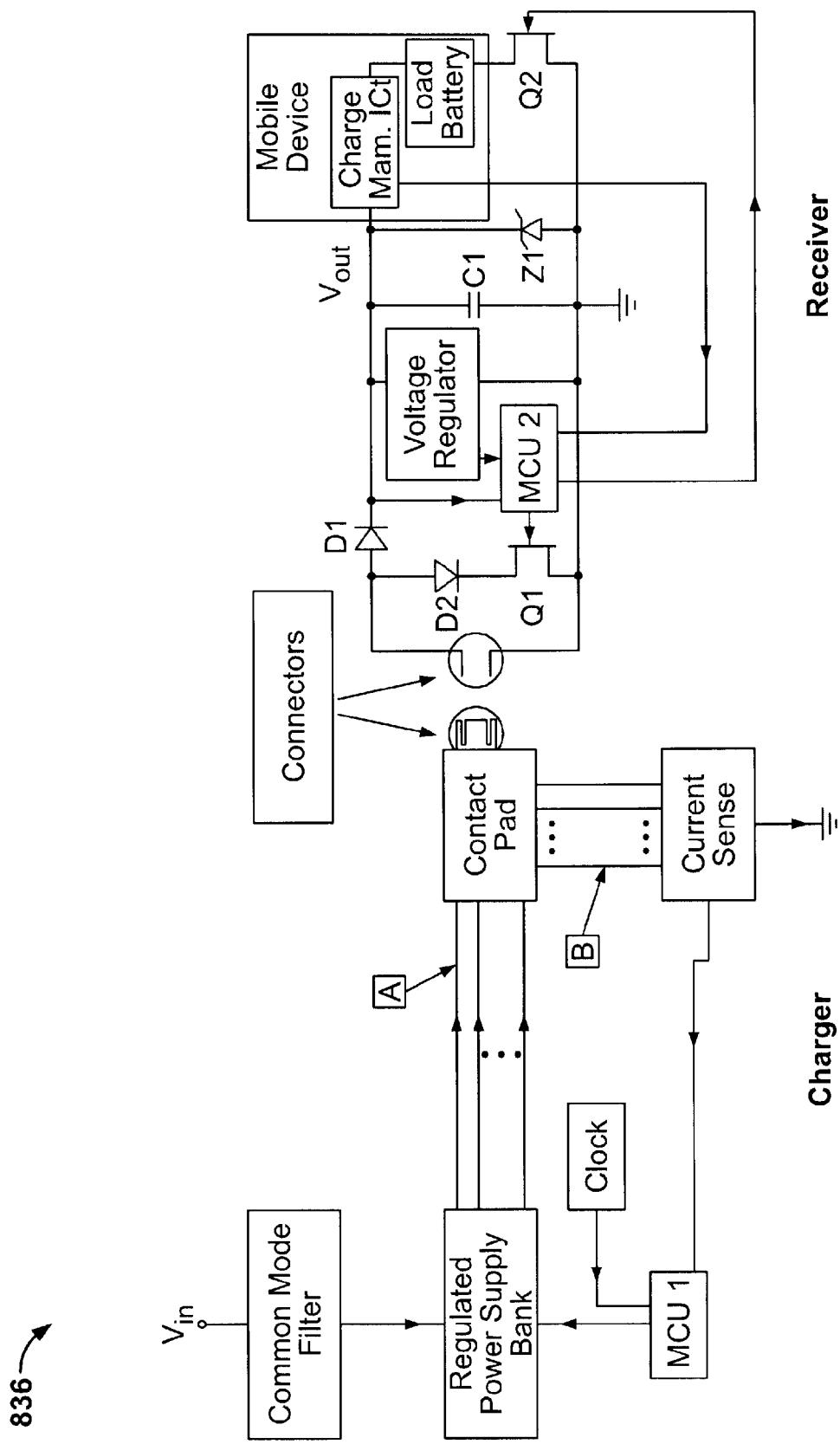
FIG. 49 shows an embodiment wherein several regulated power supplies provide power to the pad, to allows charging of several devices simultaneously.

In accordance with an embodiment, the entire package shown in the bottom of FIG. 48 has two electrical connection points. One from the top surface, called P1 that is connected to one of the connector points of all of the connector positions on the charger or power supply surface (Ground in this case). The other connection is to the common pads on the flexible film. This is called P2, and is connected to the other position in the circuit. For example, for the geometry discussed here, P1 can be connected to Point B in FIGS. 49 and P2 connected to Point A. FIG. 49 is a generalized block diagram of a charger or power supply pad with multiple regulated power supplies.

The case discussed here and the pad in FIG. 48 enable connection of one regulated supply to one or more devices placed on the pad. However in the case of multiple devices on the pad, the voltage characteristics of the device would have to be identical to the first one and the sum of powers being drawn from the supply not exceed the maximum rating of the power supply. A more generalized approach wherein different voltages/power can be supplied to different devices is discussed in further detail below.

Ordinarily, none of the connectors are connected to the contact pads on the flexible film and therefore the circuit is not completed. In accordance with an embodiment, if a receiver with a magnet attached to the back or perimeter of the connector and the magnet oriented with correct polarity is brought close to the charging surface, it attracts the magnet or patterned ferromagnetic layer at the center of the nearest contact pad and at the bottom of the flexible film towards itself. This causes the top conductive layer on the flexible film to make contact with the contact pad for the appropriate connector at the bottom of the charger or power supply surface and close the circuit. In this way, current can flow only through the appropriate connector into the receiver circuit and the device to be charged.

As described above, to avoid oxidation of the contact pads at the bottom of the charger or power supply surface and the flexible film contacts, these surfaces can be protected by deposition of additional layers such as gold on top of the Copper. Such processes are common to protect exposed contacts. In addition, the pad package can be hermetically sealed to avoid dust contamination on the contacts. Additionally, the volume inside can be filled with an inert gas such as nitrogen.

By optimizing the surface area of the contact pad and the flexible film contact areas and material composition, low contact resistance can be obtained. Other parameters to optimize are the area of the magnet or magnetic material and the type of material used.

Top: The pattern for contact pads at the layer below the connectors. One of the contact points for each position (e.g. Ground contact) is connected together throughout the pad to form contact point P1. Bottom: Side view of the pad with integrated MEMS switch for contacting individual contacts to the power supply. Spacers at the edges and the walls of the segment areas keep the flexible film at a pre-determined distance from the bottom layer of the PCB. The contact pads in each segment of the flexible film are connected together to form contact P2 for each segment.

FIG. 49 shows another embodiment where several regulated power supplies provide power to the pad. This allows charging of several devices simultaneously.

Figure 50:
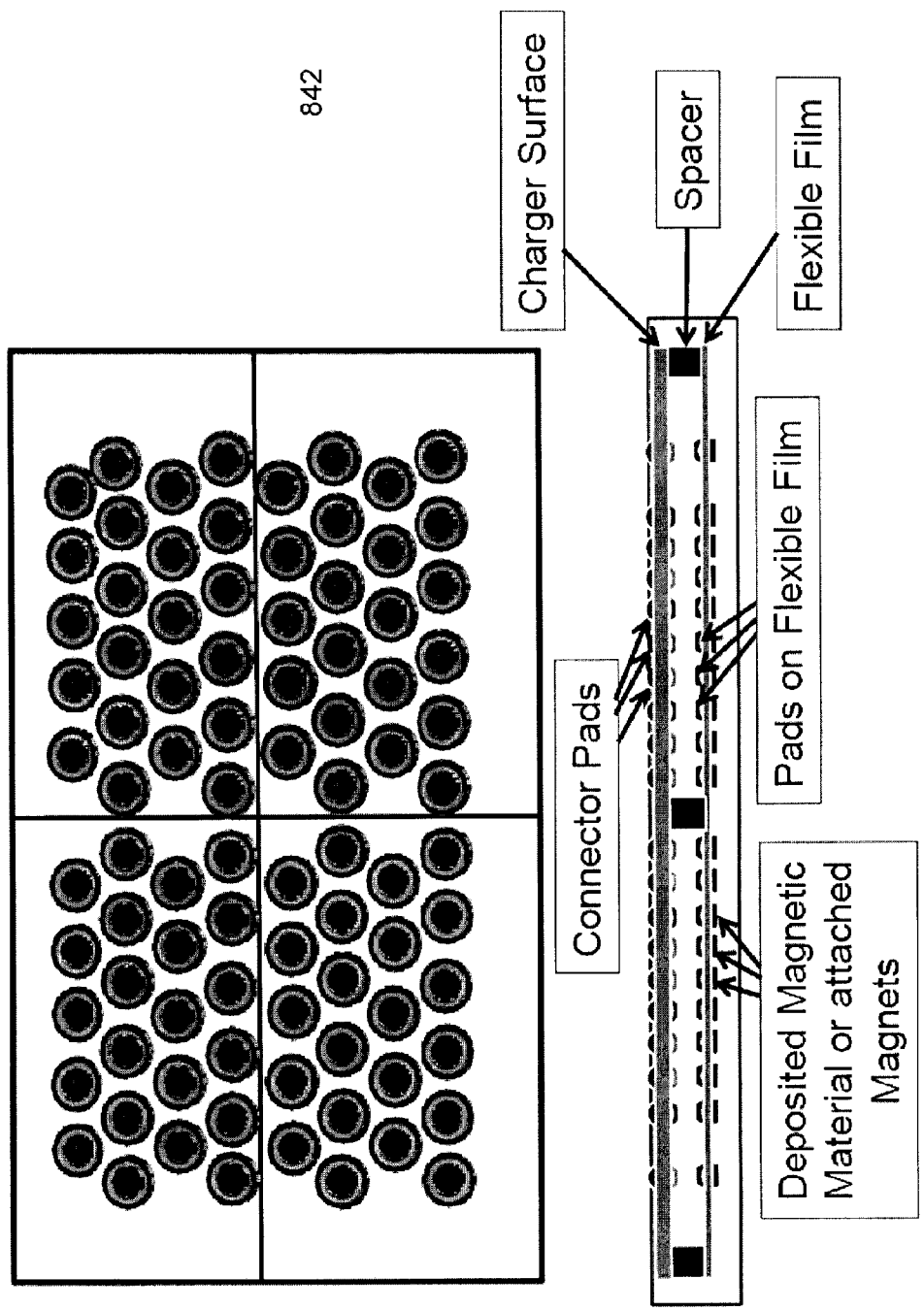
FIG. 50 shows an alternative embodiment of a pad using a segmented surface.

FIG. 50 shows an alternative embodiment using a segmented surface. The operation of this is similar to previously described except that the top and bottom contact points for each segment P1 and P2 are connected to the appropriate positions in B and A in FIG. 49 so that each regulated power supply is connected to one of the segments in the charger or power supply surface when the circuit is closed. In this way, a device placed on each of the segments can be powered by the regulated power supply at its required voltage and power level.

Electromagnetic Shielding

Electromagnetic Interference (EMI) is an important aspect of performance of any electronic device. Any device to be sold commercially requires adherence to regulation in different countries or regions in terms of radiated power from it.

For an inductive charger or power supply comprising a number of coils and electronics switches and control circuitry, the main sources of noise include:

Any potential radiated noise from switching FETS, drivers, etc. or sense and control circuitry. This noise can be at higher frequency than the fundamental drive frequency of the coils and can be emitted away from the charger or power supply because of the frequency. This noise can be minimized by optimizing the drive circuit to avoid sharp edges in the drive waveform and associated noise.

Noise from copper traces with ac signals. This noise can also be at higher frequency and emit away from the charger or power supply. The length of these paths must be minimized.

EM emission from the switched coil. For coils described here and driven in the 100's of kHz up to several MHz, the wavelength of the Electromagnetic (EM) field generated can be in the hundreds of meters. Given the small length of the coils windings (often 1 m or less), the coils used are not efficient far-field transmitters of the EM field and the generated EM field is in general highly contained near the coil surface. The magnetic flux pattern from a PCB coil is highly contained in the area of a coil and does not emit efficiently away from the coil.

Care must be taken when designing the current paths, and in some embodiments shielding of the FETs or other ICs or electronics components may be necessary. In addition, switching the coils with waveforms that have higher frequency components, gives rise to noise at higher frequencies. In any of the above geometries described, incorporation of conductive layers and/or ferromagnetic layers in the system can shield the outside environment from any potential radiative fields. The conductive layers may be incorporated in the PCB to eliminate the need for additional separate shielding layers.

In the examples provided above, while the 3 coil layers can be incorporated into PCB layers, the electronics components can be placed on the lower most surface of the PCB to allow a flat surface on the top and allow receiver coils to get as close as possible to the charger or power supply coils. One possible arrangement for the location of the electronics components at the bottom surface of the total PCB stack is shown. In this case, in some or all of the layers above, the PCB layers can incorporate Copper sections in the areas shown in black in this figure. By appropriately grounding these sections and providing additional conductive and/or magnetic layers below the electronics components, the EMI can be significantly reduced.

In accordance with an embodiment, another method for minimizing the effect of the copper traces in the PCB is to sandwich them between layers of conductors in the PCB. In a multi-layer PCB, the copper trances and connections to all the components and coils can be for example, be in a middle layer and the necessary connections to the ICs or other layers be made through vias. Given that the magnetic flux is highly contained within the coil area, the layer containing the coil or another layer below or above can contain a substantially continuous layer of copper covering everything except the area of the flux generated by the PCB (very close to the outside ring of the coil). By having two or more conductive PCB layers for shielding sandwiching the signal and current paths, most of the noise generated can be shielded very close to the source. Since the noise from the PCB is minimal and does not radiate, the remaining source of noise, the electronics, FETS, etc. can be shielded by covering the section with these devices with a metallic cover or shield.

Similar types of judicious incorporation of grounded Copper layers in the PCB layers in any of the designs above can significantly reduce any potential EMI issues without requiring additional shielding layers.

Figure 51:
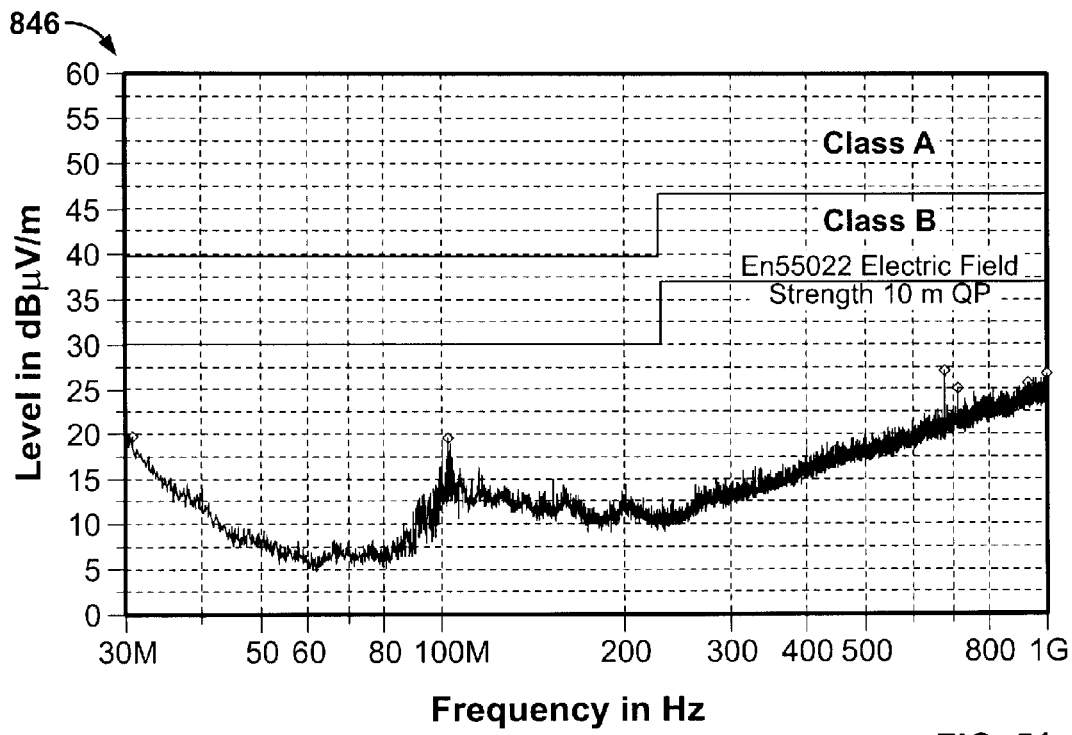
FIG. 51 shows an industry standard means that is used for measuring emissions from a product.

FIG. 51 shows a standard used within the European Union for measuring emissions from a product. In this case, the emissions from a product are measured at 10 m distance. This test (EN 55022) looks for emissions from 30 MHz to 1 GHz. Limits for Class A and Class B certification are shown in the Figure.

FIG. 51 shows a typical scan of emissions from an inductive multi-charger or power supply pad. As discussed above, the radiation at the fundamental operating frequency (100's of kHz to several MHz), can be self-contained within the coil area. However, noise at higher frequencies (such as the test range of 30 MHz to 1 GHz) must be reduced to avoid interference with other nearby electronic devices.

Metallic and/or Ferromagnetic layers are often included in electronic devices to reduce their EM emission. An example of such layers is described in U.S. Pat. Nos. 6,888,438, and 6,501,364. In these instances, PCB coils are formed on two sides of a PCB, and ferromagnetic and copper layers are placed on each side of the PCB to limit emissions from a package containing such a transformer.

Frequency Selective Electromagnetic Shielding

In accordance with some embodiments of the inductive universal charger or power supply pad described herein, the inclusion of metallic and/or Ferromagnetic layers at areas that are potential sources of emission such as FETs, etc. may be beneficial. However, a method that would wholly cover the charger or power supply pad package to eliminate potential for escaping EM fields may provide benefits.

Given that the inductive charger or power supply pad operates by generating an oscillating magnetic field, such an approach does not seem feasible as it would block such a field from being sensed by the receiver coil.

In accordance with an embodiment, a method is described herein that allows the inductive pad to emit EM waves efficiently for operation while simultaneously providing shielding to high frequency EM fields. Such operation is achieved by taking advantage of the skin effect in conductors.

The skin effect is the tendency of an alternating electric current (AC) to distribute itself within a conductor so that the current density near the surface of the conductor is greater than inside the material. That is, the electric current tends to flow at the "skin" of the conductor.

The skin effect causes the effective resistance of a conductor to increase with the frequency of the current and has practical consequences in the design of radio-frequency and microwave circuits.

The current density J in an infinitely thick plane conductor decreases exponentially with depth δ from the surface, as shown below:

$$J = J_S e^{-\delta/d}$$

where d is a constant called the "skin depth". This is defined as the depth below the surface of the conductor at which the current density decays to 1/e (about 0.37) of the current density at the surface. It is given by:

$$d = \sqrt{\frac{2\rho}{\omega\mu}}$$

Where:
$\rho$=resistivity of conductor
$\omega$=angular frequency of current=$2\pi \times$frequency
$\mu$=absolute magnetic permeability of conductor=$\mu_0 \times \mu_r$, where $\mu_0$ is the permeability of free space and $\mu_r$ is the relative permeability of the conductor.

It is important to note that d decreases rapidly with frequency. The magnetic and electric field similarly get attenuated traveling through a sheet of a conductor. Using the values for conductivity of copper ($5.8 \times 10^7$ Siemens/m), the absorption going through a single layer of copper with various thickness can be calculated.

Figure 52:
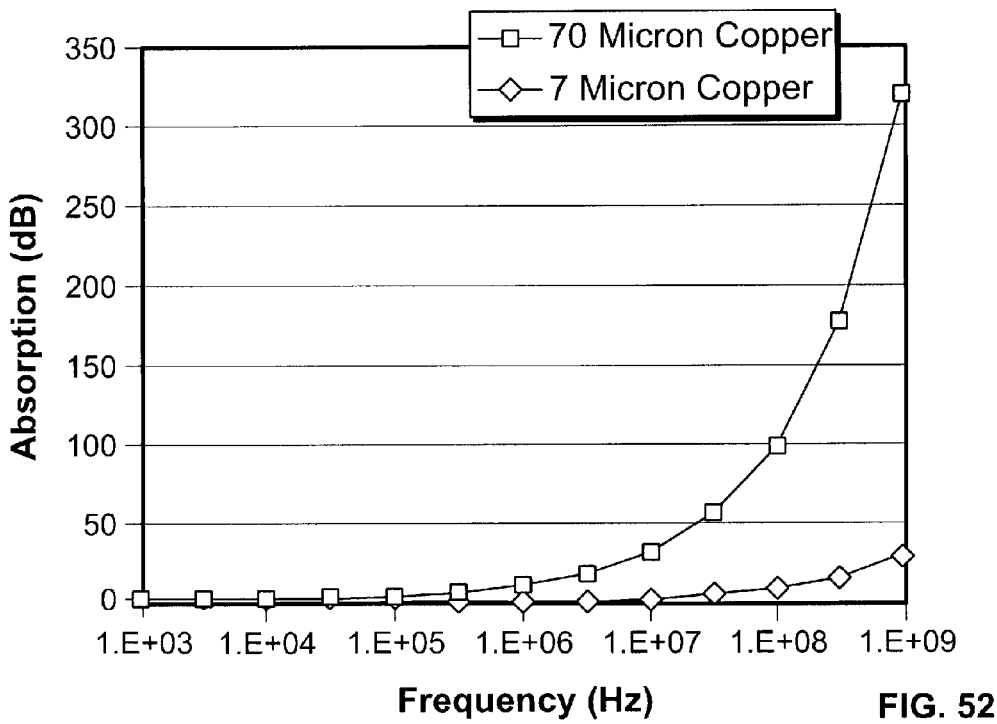
FIG. 52 shows an embodiment which illustrates absorption through a copper layer.

FIG. 52 shows the absorption through a copper layer of 70 µm and 7 µm. While the 70 µm layer provides very high attenuation in the region of interest (30 MHz to 1 GHz), the attenuation is excessive in most cases and is only needed in extraordinarily noisy circumstances.

As described herein, the transmitted power is considered through a very thin conductive layer.

Figure 53:
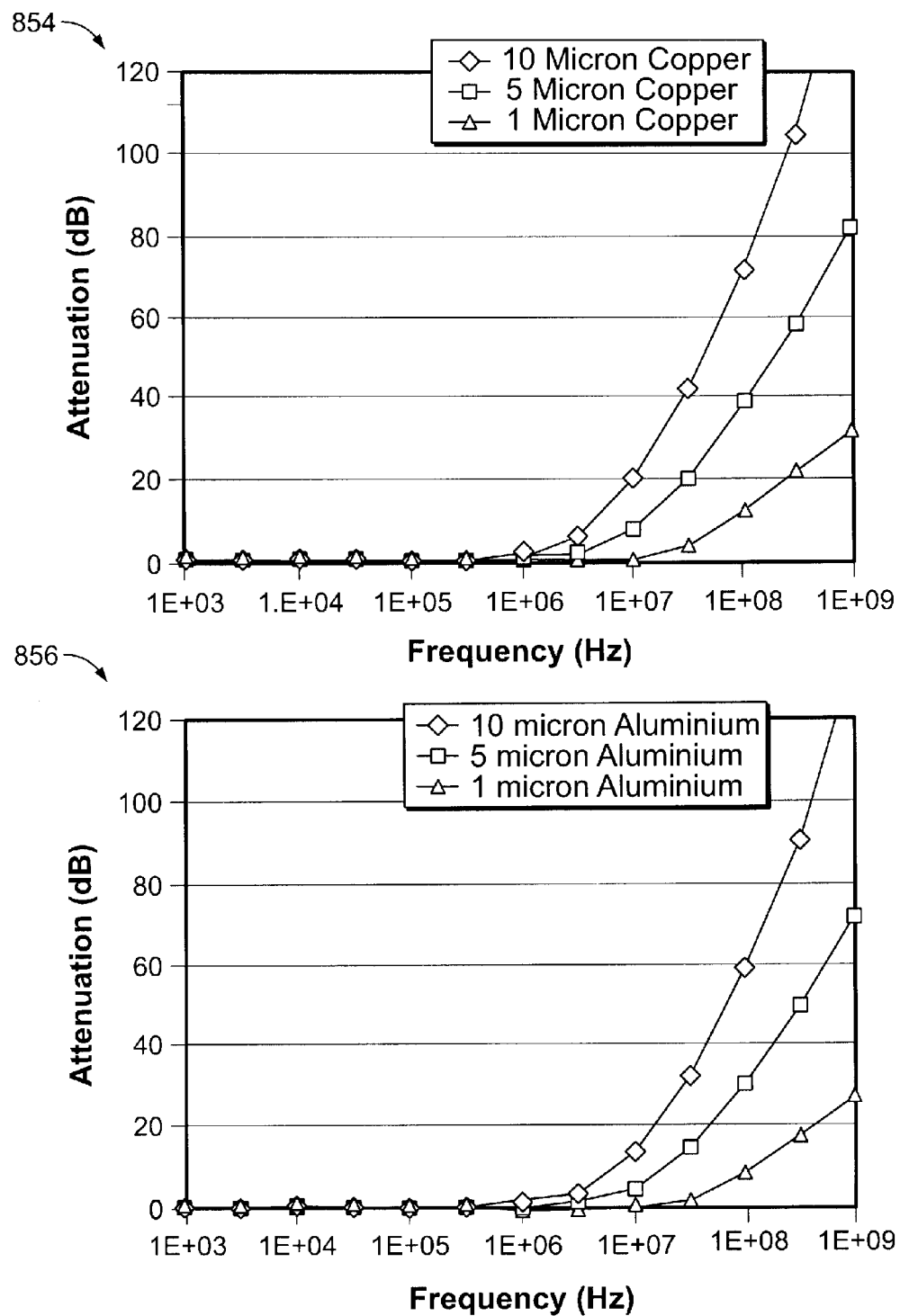
FIG. 53 shows attenuation values for Copper and Aluminum layers for several thicknesses.

FIG. 53 shows how the attenuation values are shown for Copper and Aluminum (conductivity of $3.76 \times 10^7$ for 99.99% Al) layers for several thicknesses.

For these calculations, the placement of the layer with respect to the source of the EM field needs to be included. In these calculations, the source is assumed to be 0.5 mm under the layer. This is similar to placing the layer essentially directly on the source of the field.

It will be noted that, for very thin layers of Copper and Aluminum, down to 1 micron thickness, very high attenuation values at frequencies over 1 MHz are obtained. The attenuation of 1 µm layers of Copper and Aluminum at $10^9$ Hz are respectively 32 dB and 28 dB and are comparable. However, at 1 MHz or below, the attenuation in either material for such a thin layer is minimal. In accordance with some embodiments, this behavior or characteristic can be exploited.

Figure 54:
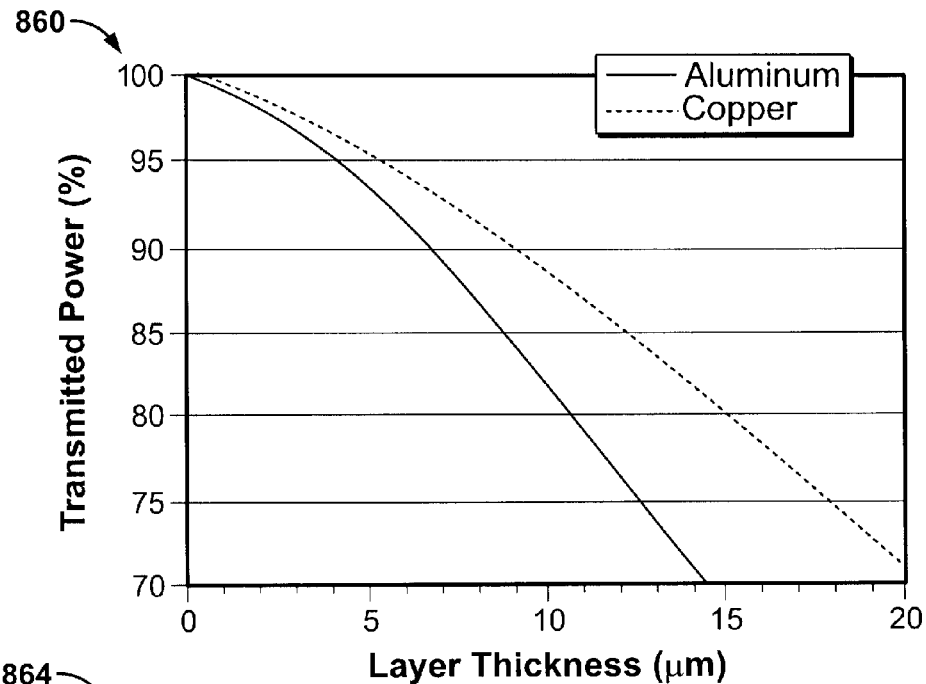
FIG. 54 shows transmitted power through Copper and Aluminum layers of varying thickness for an incident field at 1 MHz.

FIG. 54 shows Transmitted EM Power through Copper and Aluminum layers of varying thickness for an incident EM field at 1 MHz which is a typical operating frequency for the type of inductive universal charger or power supply described herein. Below 5 µm thickness, the transmitted power exceeds 95%. Aluminum in particular (due to its lower conductivity), has a wide range of thicknesses that allows a 1 MHz radiation to transmit through without much attenuation.

As discussed above, in some embodiments of the inductive charger or power supply device described herein, the generated EM field at the operating frequency of the charger or power supply (typically ~1 MHz), is generated by an inefficient PCB coil antenna and is mostly confined to the area immediately near the coil (to be picked up by the receiver coil). However, any noise generated by driving the coil at this fundamental frequency (due to nonlinearities at the components, non-sinusoidal signal, or at the FET or the FET driver) or any noise generated at any other location in the charger or power supply device current paths or components or the receiver (including noise generated at the receiver rectifier), can have components that are much higher in frequency. It is desirable to suppress such noise to the extent possible.

In accordance with an embodiment, a very thin layer of a conductor (such as Copper or Al, organic conductors, nanotech materials, nanotubes, or other material), covering all or part of the charger or power supply and/or receiver circuit can be used to allow the desired low frequency components (Several MHz or below) to travel through without attenuation while severely reducing the higher frequency noise. In accordance with some embodiments, the entire inside or outside surface of the charger or power supply and/or receiver package circuitry or part of it is covered to achieve this frequency selective shielding without dramatically affecting the fundamental operation of the device.

In one embodiment, the entire inside or outside of the package for the inductive charger or power supply and for the receiver for such a charger or power supply is covered by a thin layer of a conductor (15 µm thick or less or preferably less than 5 µm thick). The conductor can be metallic as discussed above, metal alloys, organic, nanotech materials, nanotubes, etc. At high frequencies, such a layer reduces the emitted EM power considerably (greater than 20 dB or even 30 dB) while allowing most (>90%) of the fundamental operating frequency power to transmit through the layer. The conductive layer can be directly deposited on the parts. To avoid shorting of any electronics or connectors, contacts, a dielectric layer, paint or other material must be first deposited. Alternatively, the conductive parts can be masked off so as not to contact the EM shielding conductive layer.

The deposition of the conductive material can be done in a variety of manners (sputtering, evaporation, electroplating, coating through dipping, Langmuir Blodgett, painting, etc.) for different materials. Recently, an inexpensive method (Ecoplate) for conformally coating any material with metallic or metal alloy layers at room temperature has been developed. In this process, a spray of molten metal at controlled temperature and velocity instantaneously cools on incidence with a substrate and forms a conformal layer covering the entire or part of a part. The EM conductive shield can also be deposited onto a substrate such as a polymer (e.g. mylar, polyimide, polyurethane, plastics, etc.), rubber, etc. and the conductive layer coated polymer be applied to the inside or outside of the part. Anti-static bags are an example of a metalized polymer material. Aluminum is commonly used for this application.

In another embodiment, the PCB boards, electronics components, and the coils in the charger or power supply and/or the receiver are covered by a nonconductive layer (such as a dielectric, paint, etc.) and then covered completely or locally by a conductive layer of appropriate thickness either directly deposited on the board and the electronics or indirectly with a polymer or similar backing (as described above).

The optimum thickness of the conductive material is highly dependent on its conductivity. By choosing the material composition and thickness, one can obtain the desired combination of EM noise suppression and transmission of fundamental frequency.

It is also possible to combine conductive layer materials and thicknesses to construct a more tailored frequency response. Such an approach is commonly taken in the optical domain to fabricate wavelength dependent filters.

In those embodiments wherein the conductive layer covers the charger or power supply and/or receiver coil, it may be desirable to generate an EM field with a charger or power supply coil and then, after passing the emitted field through such a conductive layer, turn it back to DC power through the receiver coil and rectification. Since the conductive layer is a frequency dependent filter, in this process, this removes or weaken any higher frequency signals and enables the receiver to receive a cleaner, and depending on the design, more sinusoidal signal. Such high frequency noise is often related to not-only EMI disturbance and lack of signal to noise ratio in the electronic device to be charged. In addition, the higher frequency noise causes non-optimum operation of the receiver and possibly heating of the receiver or other components. By removing the generated noise, electrical and thermal/environmental performance of the charger or power supply and receiver system may be improved.

Such a physical filtering of an electrical system is analogous to an optical signal being filtered in the wavelength domain (by an optical filter, grating, etc.) before reaching a receiver. The SNR and efficiency of the system is improved in this way.

Use of Magnets for Alignment of the Coils

Figure 55:
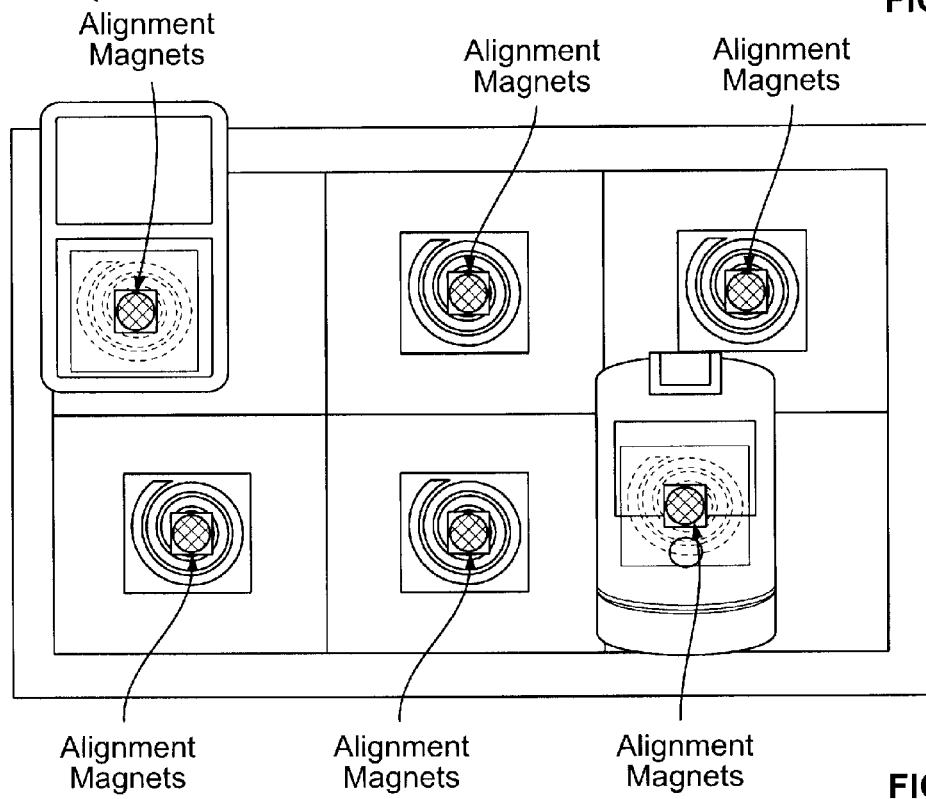
FIG. 55 shows an embodiment which allows for obtaining local alignment independence between coils in the charger and the receiver.

FIG. 55 shows a method for obtaining local alignment independence between the coils in the charger or power supply and the receiver are shown therein. In accordance with an embodiment, by using small magnets behind (on the side opposite to the side facing the surface of the charger or power supply) the center of each coil in the charger or power supply, and behind (on the side opposite to the side facing the surface of the charger or power supply) the coil in the receiver, such that the magnets attract each other, a charger or power supply system can be provided wherein the user can easily find the location where the charger or power supply coil is located, without providing any physical features and/or marking on the surface of the charger or power supply. This may be advantageous in enabling charger or power supplies which can be used with any device to be charged without need for special alignment or size features. This allows charging of any size and shape device and/or battery. In this geometry, shown in FIG. 55, the magnets can be thin flat or other shape magnets placed at the center of the coil and allow the device or battery to be charged to be rotated around the charger or power supply coil with no effect.

As described above, by enabling the coil in the charger or power supply to move laterally (and somewhat vertically) in the plane of the charger or power supply surface, automatic alignment of the charger or power supply and device and/or battery coil can be achieved when a device and/or battery is laterally brought close to the center of the charger or power supply coil.

If magnets used for this application are electrically conductive, then some of the field generated by the coil will generate currents in the magnet and heat the magnet, decreasing the efficiency of the system and generating unwanted heat. This effect especially becomes important as the field strength of the coil is increased for higher powers.

In accordance with some embodiments, methods for dealing with this problem can be included, such as:
- Since the currents are created by eddy currents generated in the magnets, use of non-conductive and/or low conductivity magnetic material can improve this condition.
- The magnet can be constructed of thin flat magnet material with laminate in between the layers to decrease the current flow and loss of power.

Figure 56:
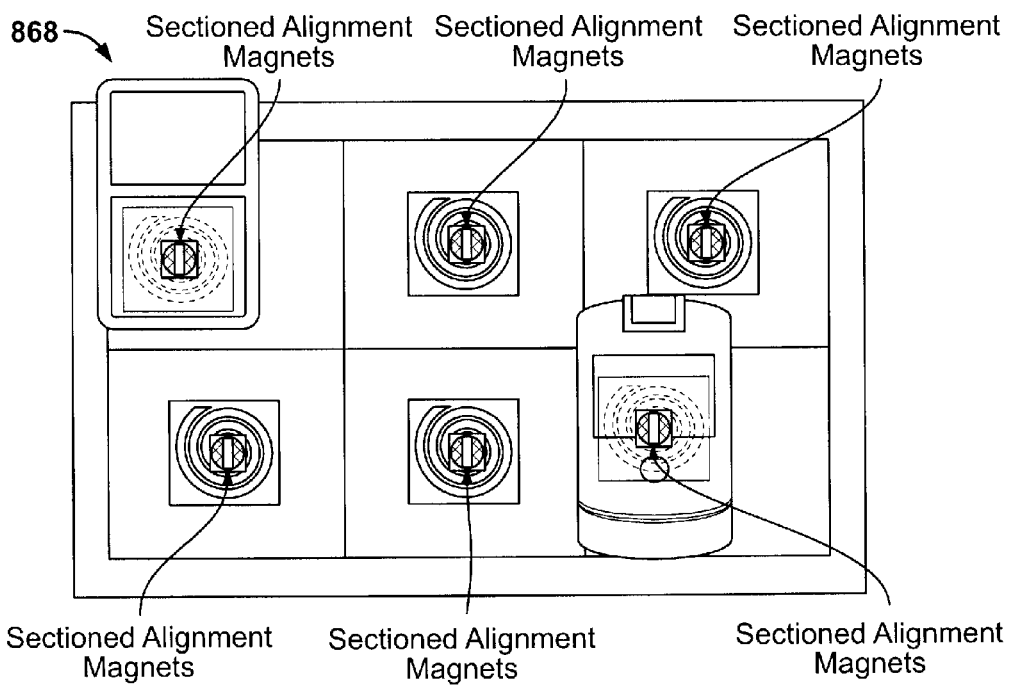
FIG. 56 show an embodiment in which coil magnets can divided into sections.

FIG. 56 show an embodiment in which the magnets can be broken or divided into sections, such as semi-circles with a gap or non-conductive material in-between to avoid current circulation. By having each set of magnets behind a coil to be made of two or more sections, the electrons are disrupted from circulating and generating strong eddy currents leading to heating and power loss. In this figure, each set of magnets behind a coil are made of semi-circular magnets. The poles of the magnet are aligned with the South or North pole facing the surface of the charger or power supply. The magnet in the device or battery have the opposite polarity so that the magnets of the charger or power supply and the device and/or battery attract. By having each set of magnets behind a coil to be made of two or more sections, the electrons are disrupted from circulating and generating strong eddy currents leading to heating and power loss. In FIG. 56, each set of magnets behind a coil are made of two semi-circular magnets.

Figure 57:
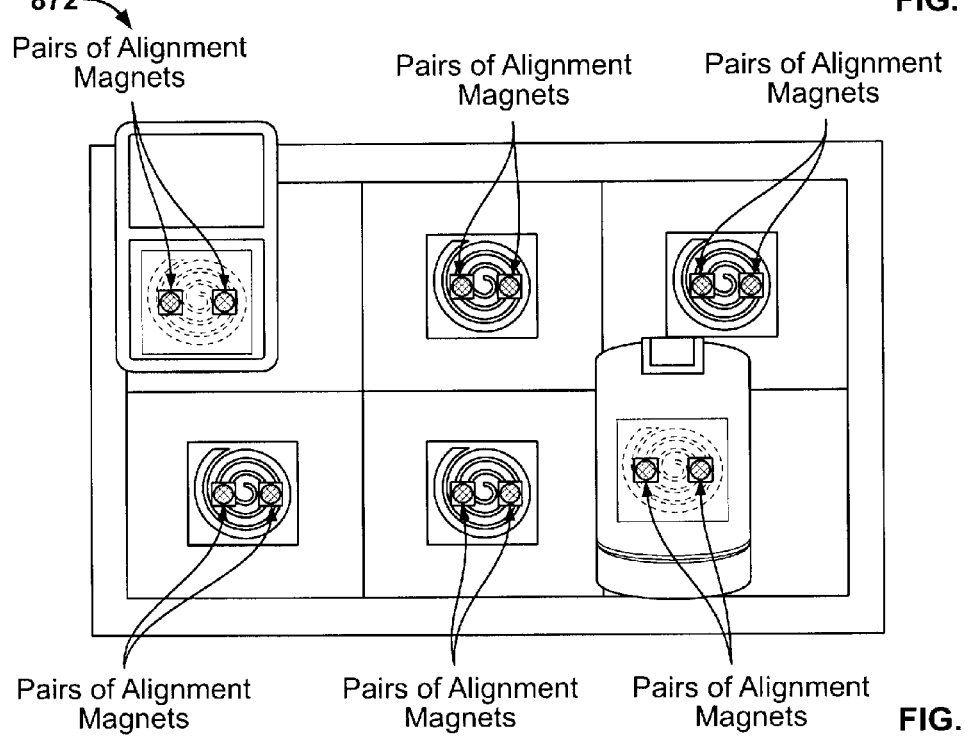
FIG. 57 shows an embodiment in which one or more alignment magnets can be used behind each coil.

FIG. 57 shows an embodiment in which one or more alignment magnets can be used behind each coil. However, in accordance with an embodiment the magnets are placed such that each magnet does not cover an area extending beyond the center of the coil. In other words, the surface of the magnet does not cover the center of the coil and thereby does not allow circular currents to be set up in the magnet as effectively. In this way, the eddy currents set up are much weaker and much smaller power dissipation in the magnets occurs. Alignment magnets at center of charger or power supply and device and/or battery coils for alignment of the two coils are attached to the back of the coils in such a way that the area of the magnet does not extend beyond the center of the coil. In this way, the eddy currents created are much weaker and much less power is lost to the magnets. In this figure, two magnets are shown per back of each coil (four total for a pair of charger or power supply and receiver magnets). However, any number of magnets from one to many can be used.

Additional Applications—Charger/Power Supply with Self-Powered Operation

Figure 58:
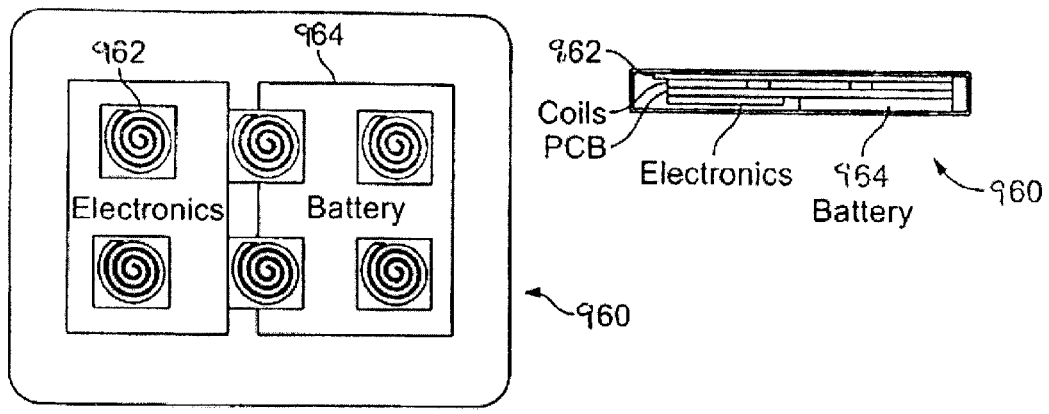
FIG. 58 shows an illustration of a device for inductive power charging that includes an internal battery for self-powered operation, in accordance with an embodiment.

FIG. 58 shows an illustration of a device for inductive power charging that includes an internal battery for self-powered operation, in accordance with an embodiment. As shown in FIG. 58, an inductive charging unit such as an inductive pad 360 includes a rechargeable battery 364. The unit is normally operated with, or is occasionally coupled to, power input from an electrical outlet, or from a dc source such as a standard automobile 12 volt dc outlet, or from an outlet in an airplane or an external dc source, or from another power source such as the USB outlet from a computer or other device. Alternatively, the power can come from a mechanical source such as a windmill, or a human-powered crank handle. The unit can include coils 362 that are energized to transfer power to receiver coils in mobile electronics devices such as mobile phones, MP3 players, radios, cd players, PDAs, and notebook computers. At the same time, the input power charges the rechargeable battery inside the unit itself. When the external power source to the unit is disconnected, or when no input power is provided, the unit automatically switches its operation from its charged internal battery. Alternatively, the unit's operation can be switch-operated by user. In this way, users can continue to charge their devices by placement on the unit without any outside power source. This use can continue until the external power is restored or until the internal battery is completely discharged.

The ability of the unit to continue charging depends on the capacity of the battery included. Thus, for example, with a 1500 mAH internal battery, the unit is able to charge a mobile phone with a 1000 mAH battery completely if the losses due to conversion efficiency, operation of the circuitry in the unit, and other losses are up to 500 mAH.

In other embodiments of an embodiment, the unit can be powered by other power sources such as a fuel cell that generates power from methanol or other sources. The unit can also be connected to the electric grid through an outlet or to an external DC power source such as power from an outlet in a car or airplane or be itself charged or powered inductively by another unit. However, when not connected to outside power, the unit can be powered by its internal power generator from the fuel cell and can charge devices placed on it inductively.

Figure 59:
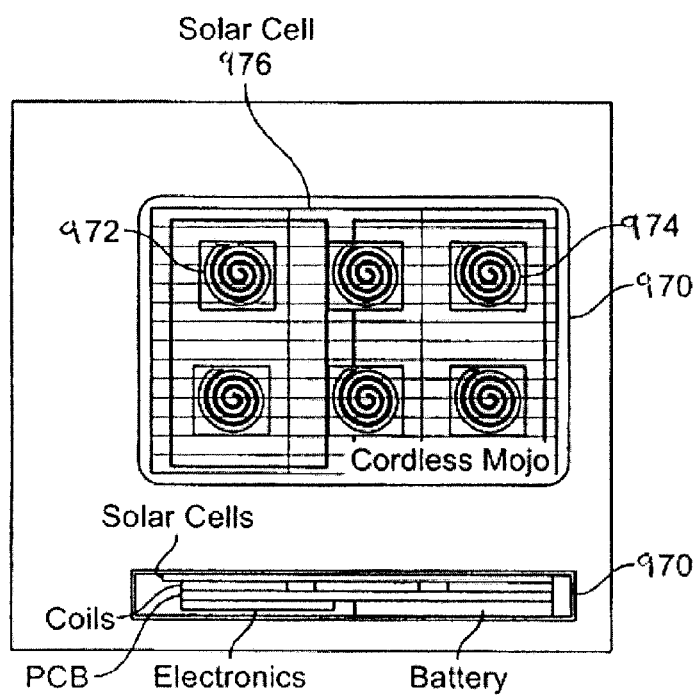
FIG. 59 shows an illustration of an inductive charger unit with a solar cell power source for self powered operation, in accordance with an embodiment.

FIG. 59 shows an illustration of an alternate embodiment of an inductive charger or power supply unit or pad 370 with a solar cell power source for self powered operation, in accordance with an embodiment. As shown in FIG. 20, the surface of the unit can be covered by a solar panel or solar cell 376. In normal operation, the unit can be powered-up or charged by connection to an electric outlet or external DC source. But without external electric power, the panel generates electric power that is used to power the charger or power supply which in turn can charge devices placed on it through the inductors in the unit. In some embodiments the unit can also include a rechargeable battery 374 that can be charged when the unit is either connected to external electric power or charged by the solar cells on the surface of the unit. This battery can then operate the unit when the unit is either not connected to external electric power or the solar cell is not generating enough power to run the unit such as during operation at night.

Figure 60:
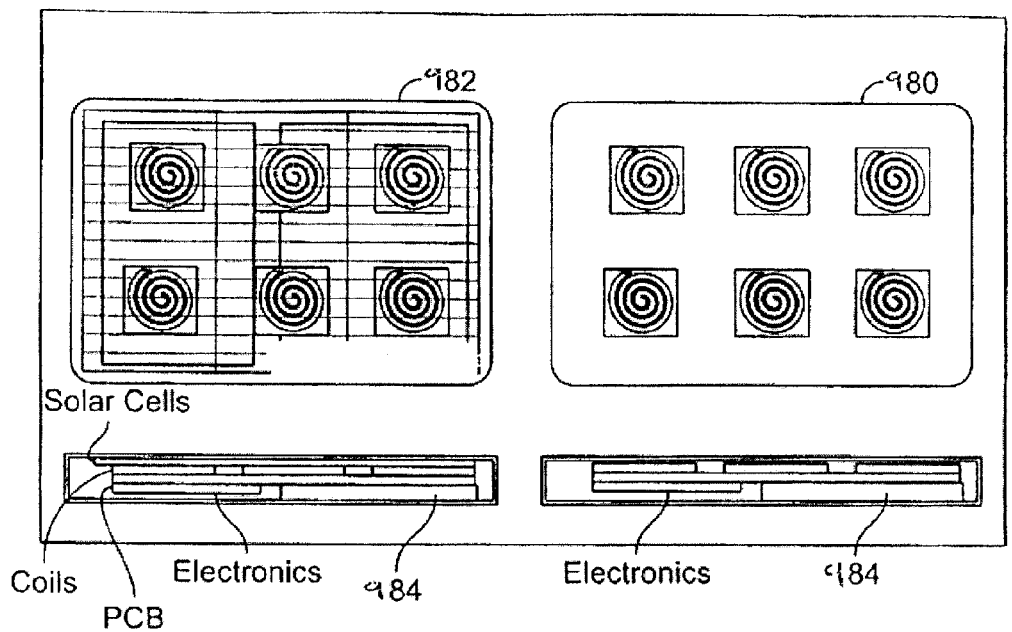
FIG. 60 shows an illustration of an inductive charger unit with an incorporated communications and/or storage unit, in accordance with an embodiment.

FIG. 60 shows an illustration of an inductive charger or power supply unit with an incorporated communications and/or storage unit, in accordance with an embodiment. As shown in FIG. 21, in accordance with some embodiments the charger or power supply, including for example the regular charger or power supply 380, and the solar-cell powered charger or power supply 382, can further comprise an optional communications and/or storage unit, for storage of data and transmission of data to and from a mobile device being charged. Examples of components that can be incorporated include Bluetooth, Near-field Communications (NFC), WiFi, WiMax, wireless USB, and proprietary communications capabilities, including means of connecting to the Internet.

Additional Applications—Inductive Charger Applications and Kiosk

The technology described herein may also be used for other applications. In some applications, it may be desirable to build the inductive (as described above) or wire free charger or power supply into a case for an electronic device, a briefcase, or other carrier such as a box, holder, or container in a car or other wise. An example can be a brief case, hand bag, or back pack where the bottom part or the outside surface has an integrated charger or power supply. Any device enabled to receive power from such a charger or power supply (device containing coils and the appropriate electronics to receive power or with appropriate contacts for wire free charging) can be placed on or inside such a briefcase and be charged. The charging circuitry can be powered by plugging the briefcase, handbag, or back pack into an outlet power or having internal batteries that can be charged through power from a wall plug or by themselves being inductively charged when the briefcase, handbag, or backpack is placed on an another inductive or wire free charger or power supply. Uses can be applied to any bag, container, or object that can be used to essentially charge or power another device. This first object can itself be charged or powered through an outlet directly by wires or wirelessly through an inductive or wire free charging system. As an alternative, the first object (the charger or power supply) can be powered by solar cells, Fuel cells, mechanical methods (hand cranks, pendulums, etc.).

In all of the above case, it is possible for the functions of the inductor or wire free charger or power supply and the power source for the charger or power supply (battery, fuel cell, solar cell, etc.) to be separated. Furthermore, in some cases, the charger or power supply part can be separated from a portable power source to operate it (such as a rechargeable battery) which is in turn powered or charged by another source (power outlet, fuel cell, solar cell, mechanical source, etc.). The three parts can be in the same enclosure or area or separate from each other.

An additional example may be an after market inductive or wire free charger or power supply for a car where the inductive or wire free charger or power supply or pad including a solar cell on the pad or in another area and connected to the pad by wires is used to charge mobile devices. Such a device placed on the dashboard or tray between seats or a special compartment can be used to charge a number of devices such as phones, MP3 players, cameras, etc. Devices such as GPS navigation systems, radar detectors, etc. can also be powered from such a device. In another application, mugs, cups, or other containers with a receiver circuitry and means of heating or cooling the contents can be used in combination with the inductive charger or power supply to keep the contents hot or cold. A dial or buttons on the cup or container can set the temperature. The charging device or pad can also contain rechargeable batteries that allow the device or pad to store energy and operate in the absence of any external power if necessary.

Other applications of this technology include clothing, jackets, vests, etc. that have an integrated inductive charger or power supply such that a user can power or charge a device by simply placing it on or near a pocket or an area where wireless inductive power is available. The jacket or clothing can in turn be powered by solar cells, Fuel cells, batteries, or other forms of energy. It can also be powered by batteries that are recharged through solar cells sown onto the clothing or be recharged by placing or hanging the clothing item on a rack or location where it is recharged wirelessly or inductively. By using inductive charging, the user does not have to plug in devices into individual wires and connectors at the appropriate jacket pocket.

In some cases, it may be desirable to build the charger or power supply or the secondary part (receiver for a charger or power supply) into the protective case of another device. For example, many products exist today that are after-market or optional items such as a skin or case for a music player, phone, PDA, or notebook computer. In one implementation, the case or skin can contain the electronics and the coil necessary to allow the device to be charged or charge other devices or both. The charger or power supply can be powered by the device it is attached to or can receive power from a separate source such as a solar cell, fuel cell, etc. that is integrated with the charger or power supply or in another location and electrically connected to the charger or power supply. For example, in a briefcase, while the charger or power supply is inside the briefcase and can charge devices inside, the surface of the briefcase can have solar cells that power the charger or power supply inside. The briefcase can also contain rechargeable batteries that store power generated by the solar cells and use them when necessary to charge devices inside. Similarly, the charger or power supply can be built on the outside or inside surface of the case and charge devices placed on or near the surface.

It is also possible to provide a charger or power supply with modular components that allow other capabilities to be added later or simultaneously as an option. In one embodiment, an inductive charging pad that contains a rechargeable battery can have a separate top surface module or all around cover or skin that contains a solar cell array and simultaneously electrically connect to the charger or power supply pad to enable the battery internal to the unit to be charged without any external power input. It is also possible to have the cover or the outside skin to provide other capabilities such as communications, or simply provide a different look or texture so that the pad fits in with the user's taste or décor.

Figure 61:
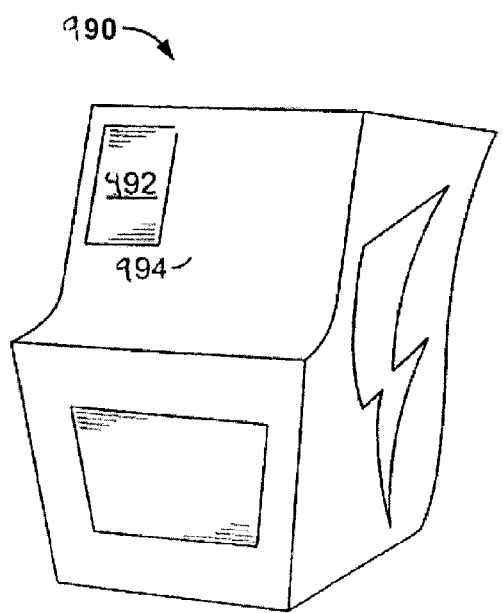
FIG. 61 shows an illustration of a kiosk that incorporates an inductive charger unit in accordance with an embodiment.

FIG. 61 shows an illustration of a kiosk that incorporates an inductive charger or power supply unit in accordance with an embodiment. As shown in FIG. 61, the kiosk 390 includes a control screen 392 and an inductive charging pad 394, to allow individuals to walk-up and purchase an occasional charge for their mobile device. Currently, the usage model of typical mobile user consists of charging their most essential device (phone, MP3 player, Bluetooth headset, etc.) during the night or at the office or car. In cases where the user is outside their environment for a long time such as traveling, this may not be possible. A variety of public mobile device charging stations have appeared that allow the user to charge their device in a public setting by paying a fee. An inductive or wire free public charging station or kiosk would allow the user to place their mobile device that is 'enabled' (i.e. has the appropriate receiver or components to allow it to receive power from the charger or power supply) on or in the wire free or inductive charger or power supply station and charge the device. The customer can pay for the service or receive the service for free depending on the service providers' approach. The payment can be cash, credit card, debit card, or other methods.

In accordance with an embodiment, a single pad with multiple stations can charge multiplicity of devices simultaneously. The user may be asked to pay for the service before charging a device or the service may be for free. Alternatively, each charging station can be in a compartment and the device is secured by a door that can only be opened through a code given to the device owner when charging starts or payment occurs. The door can also be secured by a combination lock or physical key.

Alternatively, the charging station or kiosk can be open and not physically secure but when the user pays for the service, a code is issued. The user proceeds to place their device to be charged but when the charging ends or the user wants to pick up the device, the code must be entered first. If no code is entered, an alarm is sounded or the device is deactivated or some other warning occurs. In this way, a thief or the wrong user can not remove the device without attracting attention that may act as a deterrent. A combination of the above techniques may be used in implementing a public charging kiosk.

Since a typical charging process can take up to 30 minutes or more, it is possible to also synchronize data, download songs, movies, etc. into the device during this time. Many of current mobile devices have Bluetooth or WiFi capability. Other communication protocols such as WiMax can increase the data rate further. By combining the charging and information transfer process, the service provider can charge for additional services. In addition, if a camera is being charged and has wireless capability, it can download the pictures or movies to a designated website or online storage area or be emailed to a designated email address while charging. In this way, a traveler can simultaneously charge a camera while downloading the contents of its memory to a location with larger memory. This would enable the traveler to free up limited memory space in their camera or other mobile device. Such a service would enable devices that have limited or short range wireless communication capabilities (such as mobile phones, MP3 players, cameras, etc.) to be able to connect to the internet and send or receive data indirectly. It is important to recognize that without the charging capability, a device conducting such downloading or synchronization through an intermediate device (Bluetooth to internet gateway for example) often run out of power due to the length of time this takes. In this manner the charging capability of the kiosk enables a more effective operation.

Additional Applications—Inductive Charger Applications and Kiosk

With increased functionality in mobile devices, there is an ever-increasing focus on maximizing the battery life. Currently, the rate of increase of power usage continues to outpace new and improved battery technologies. Given the desire to minimize mobile device size, the battery power limitation has required some mobile device manufacturers to begin shipping mobile devices with several batteries and a desktop charger to keep all of those batteries regularly charged. The user is sometimes expected to change the batteries for the device during the day while using the device. Such a situation is not ideal and puts the burden on the user to carry multiple batteries, and to keep those batteries charged.

Methods for extending the battery life in mobile devices, but which do not greatly increase the size and weight of the mobile device, are extremely useful for new power hungry enhanced multi-media mobile devices. By way of example, one solution that has been proposed is described in U.S. Pat. No. 6,184,654. However, such a technique and geometry is incompatible with the variety of mobile devices and connectors in use today, and requires the user to plug the device into a connector inside the holster while fastening it to hold it securely.

Described herein is a system and method for extending the battery life of mobile devices by integrating a wireless charger into the case, carrier, or holster for the device. The system and method has the advantage of keeping the size and weight of the mobile device low while enabling the user to automatically recharge the device when placed in the case thereby dramatically increasing the device run time.

In one embodiment, the case recharges the mobile device inductively, and can itself be recharged by an inductive base charger. Various embodiments including additional integrated functionality such as data storage and communication in the case are also described herein.

Figure 62:
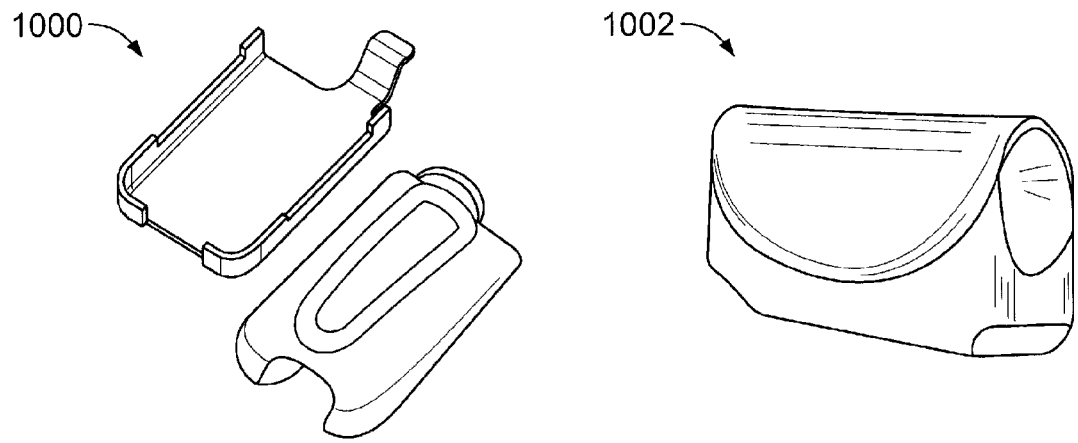
FIG. 62 illustrates some common regular (non-charger) mobile phone holders types, in accordance with an embodiment.

FIG. 62 illustrates some common regular (non-charger) mobile phone holders types, including a belt holder 1000 and case 1002.

Powering Mobile Devices and Inductive Charging Case

Mobile devices continue to converge and to combine multiple functions and protocols into ever-smaller packages. While mobile TV, radio, high resolution cameras, GPS, etc. are becoming standard in many mobile phones, the power usage of the devices continues to rise. One solution that has been applied to several devices is the use of external battery packs.

Figure 63:
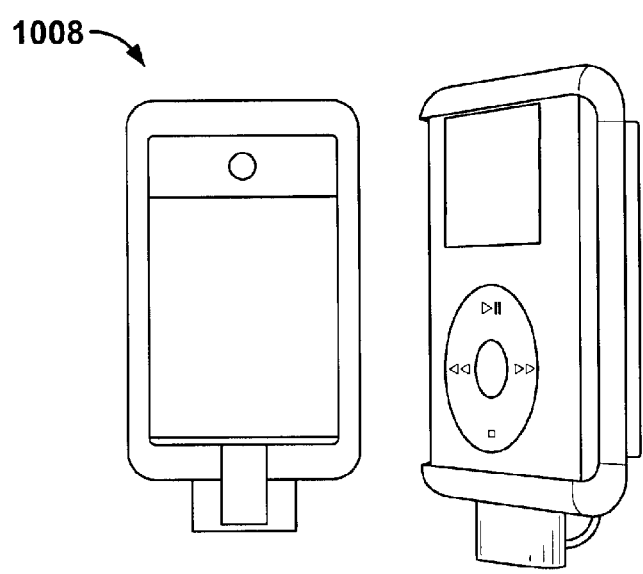
FIG. 63 illustrates various products for a music player that includes an external rechargeable battery pack, in accordance with an embodiment.

FIG. 63 illustrates various products for a music player, (e.g. an iPod or MP3 player) that include an external rechargeable battery pack.

As shown in, the external battery pack provides extra running power for the device when it is plugged into the music device and clipped to its back, by providing power through the battery pack's internal higher capacity batteries. However, this battery pack is expected to remain connected to the device at all times and increases the size and weight of the device considerably. This is very undesirable from the customer perspective and inhibits mobility/use and adoption.

In accordance with embodiments of an embodiment, the battery power of the mobile device is extended by providing a holster, case, pouch, bag, wallet, or an equivalent holding, carrying, or storage device (which for convenience are herein, referred to as a "case") for the mobile device (e.g. mobile phone, Bluetooth headset, camera, laptop, PDA, MP3 player, game player, etc.). The case can incorporate one or more rechargeable batteries, and one or more inductive charger or power supplies. A mobile device can be 'enabled' to receive power inductively by providing a receiver (such as a coil, etc.), and circuitry integrated by the manufacturer, or by a battery with a built-in receiver, or by a plug-in unit to receive power, etc. A suitably enabled device can thus receive power when placed in the case. In accordance with some embodiments, the case can also include means of recognition of the device automatically by, for example, RFID, Felica, detection of coil from change in the case's coil's induction, or by verification using proprietary techniques, etc. In some embodiments, the system or coil can be enabled to turn on automatically as necessary and to begin charging the device. Alternatively, the case and/or coils can turn on when a device is placed in it by sensing the presence of a device through a magnetic, mechanical, or other form of switch. Alternatively, the case can include a mechanical or sensory switch that must be manually activated by a user to begin charging the device.

In accordance with some embodiments, the case can accommodate more than one device. For example, the case can include a location for a Bluetooth headset and a mobile phone. Either or both of these devices can be inductively charged by the case when placed inside the case. This enables the user to have a simple way to carry both parts or devices together, and to extend the battery capacity of both without needing them to be any larger, thus providing great advantages for the consumer.

In accordance with an embodiment, the batteries inside the inductive charger case can themselves be charged by either a regular charger/power supply, or through another inductive charger or power supply. For example, a desktop inductive charger can charge the inductive charger case, and simultaneously charge the mobile devices (mobile phone, Bluetooth headset, camera, etc.) or battery. Alternatively, the desktop charger or power supply or base can be designed so that it can also charge the mobile device directly when the device is placed on it (without any case present). As described above, the inductive case can also be designed so that it will charge its internal batteries, and the devices inside, when it is connected to a regular power supply/charger.

Some embodiments of the case can include data storage, communication or other capabilities (for example, GPS, WiFi, etc.).

Figure 64:
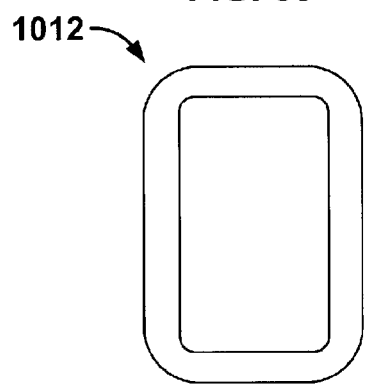
FIG. 64 illustrates a multi-function device that includes a hard drive, rechargeable battery, and wireless connectivity, in accordance with an embodiment.

FIG. 64 illustrates a multi-function device that includes a hard drive, rechargeable battery, Bluetooth, and WiFi connectivity.

Typical multi-function devices such as that shown in FIG. 64 are of the size of a credit card and about 10 mm in thickness. The multifunction device allows a mobile phone user to store the majority of their digital data (pictures, movies, music, etc.), and to have that data available wirelessly on their mobile devices. The mobile phone and multifunction device can also connect wirelessly to a computer or laptop, for download or upload of information.

In accordance with an embodiment, a multifunction device such as that shown in FIG. 3 can be integrated into the case, and can have a wireless charger or power supply built into it. Once a mobile device is placed into the case or on the modified multifunction device, it can establish communication, and/or can be charged simultaneously. Since a typical multifunction device already has internal rechargeable batteries, the same batteries can be used to power the charger for the mobile device. The multifunction device case can also be charged wirelessly (using an inductive charger or power supply pad or similar device), or through conventional means.

In other embodiments, the wireless charger or power supply case can be integrated into a compartment in a briefcase, handbag, backpack, carrier, clothing, automobile, airplane, or other transport vehicle, etc. Some of these are applications are described in further detail in copending U.S. patent application titled "INDUCTIVE POWER SOURCE AND CHARGING SYSTEM"; application Ser. No. 11/669,113, incorporated herein by reference.

Figure 65:
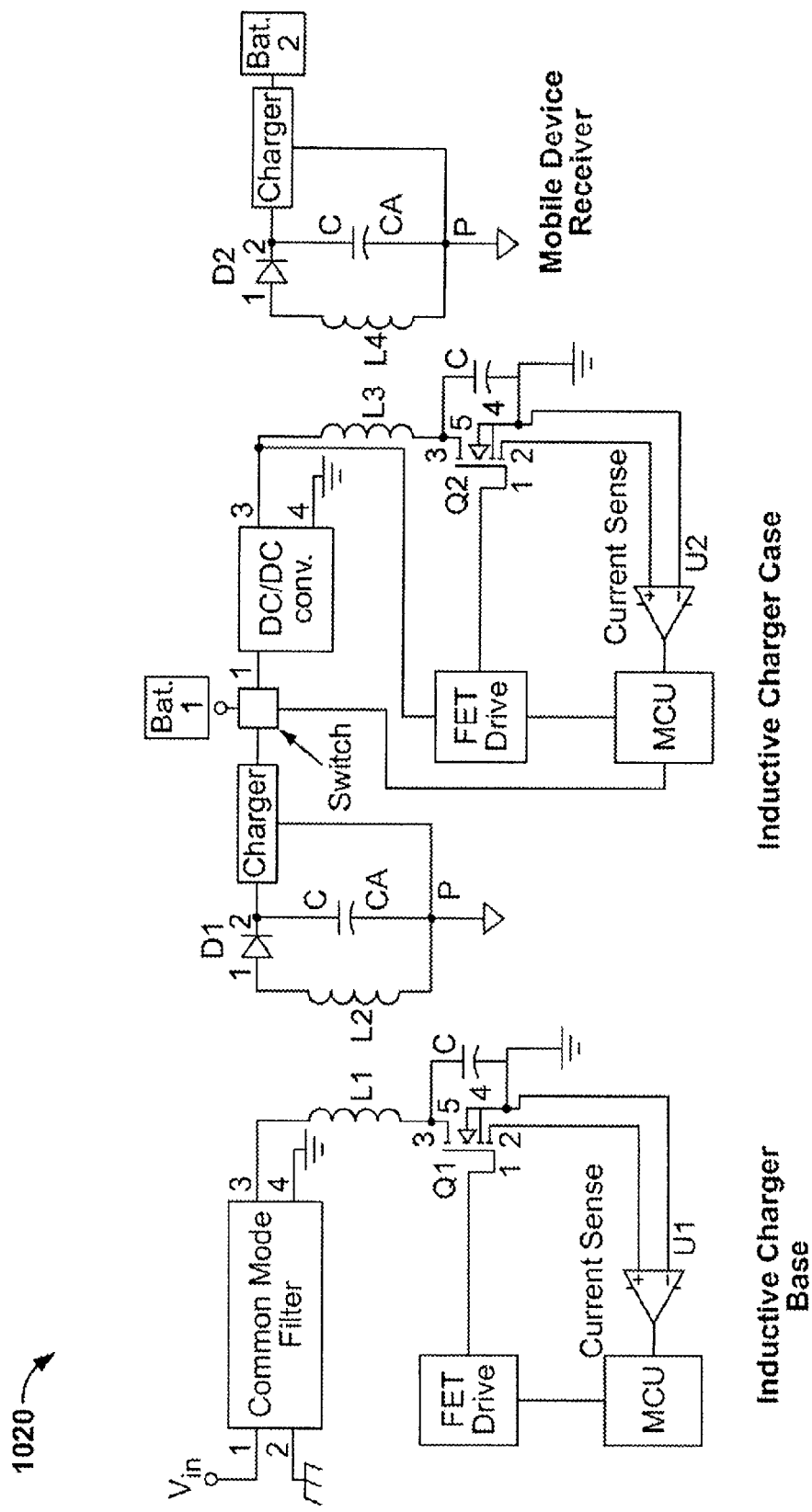
FIG. 65 illustrates a system for use with a charger case to inductively power or charge a mobile device, in accordance with an embodiment.

FIG. 65 illustrates a system for use with a charger or power supply case to inductively power or charge a mobile device. As shown therein, an inductive charger or power supply base or pad charges a case, holster, or other small, portable charger that in turn can charge or power a mobile device or battery placed in proximity to it. The second part (charger case) can be a stand-alone device or be integrated into another device, as in the case of the multifunction device example described above. In other embodiments, the charger or power supply case can be charged or powered through a conventional, wired charger or power supply. In accordance with an embodiment, the system comprises:

Inductive Charger or Power Supply Base: In accordance with an embodiment, this part can be a stand-alone charger or power supply or desktop charger or power supply that comprises a Field Effect Transistor (FET) that periodically turns the current through a coil on and off. In one embodiment, for a typical 9 turn PCB coil with 1" diameter, a drive frequency of 1-2 MHz is ideal, and the power transfer efficiency is increased when a capacitor of appropriate value is placed in parallel with the FET. When the circuit is driven at a resonant frequency, the amount of current through the FET can vary greatly by proximity of another coil (L2) to L1. To allow the system to operate automatically, a current sensing system can be used to sense the secondary (L2) being in close proximity to the primary (L1). In other embodiments, a separate circuit for positive identification of a device to be charged being in proximity can be integrated. These can include wireless identification systems such as RFID, Felica, Bluetooth, WiFi, WiMax, etc. In another embodiment, the system of the charger or power supply case can be designed so that a chip in the charger or power supply case (near L2) senses an input voltage and modulates the current through L2 in a pre-programmed manner. This results in a modulation in the current in L1 that can be sensed with the current sensor and positively identifies the charger or power supply case and initiates power transfer and operation if the pattern matches a pre-stored pattern for verification. In some embodiments, the inductive charger or power supply base can have the shape of a formed piece that the inductive case would fit into, or a pad for placement of the inductive case and/or mobile devices or both.

Inductive case: In accordance with an embodiment, the case has means for receipt of power inductively (from the charger or power supply base) and charging another device (or number of devices) inductively. Alternatively, it may be possible for the case to be designed so that it operates by being charged or powered directly by a wired power supply/charger. The case has a receiver part that is connected to a battery charger circuit that charges one or more internal batteries and simultaneously, can also operate the circuitry in the charger or power supply case to charge a nearby mobile device or battery. The case has charger or power supply circuitry similar to the charger or power supply base that can be powered by its internal battery or the power from the charger or power supply base. The case can in turn recognize a nearby mobile device automatically or through mechanical or other means as described earlier and commence charging when a mobile device is placed in or near the case/holster. In another embodiment, the charger or power supply case may contain two or more charger or power supply sections so that several devices in the case (e.g. mobile phone and a headset) can be charged simultaneously. As described earlier, the circuitry/functions described here can be integrated into a device that also extends the functionality to storage, WiFi or Bluetooth connectivity, etc. In one embodiment, the batteries in the charger or power supply case are identical to the batteries used in the mobile device and are removable. In this case, the user may exchange the batteries between the charger or power supply case and the mobile device (such as a mobile phone) in an emergency to allow quick use of the mobile device without waiting for the charging of the mobile device to occur. This can provide an additional desirable feature for the user.

Mobile Device Receiver: In accordance with an embodiment, the mobile receiver part comprises a coil and circuitry that can be either integrated into a mobile device by the manufacturer (i.e. an OEM), integrated into a battery that can be swapped with the original battery to enable a mobile device to receive power inductively, or provided as a plug in unit that plugs into the existing power jack of a device and has the coil and the circuitry to enable the device to receive power inductively. Alternatively, the receiver can be built into a jacket or skin for a device that plugs into the device and allows the device to become 'enabled'. Variations of these are described in further detail in copending U.S. patent application titled "INDUCTIVE POWER SOURCE AND CHARGING SYSTEM"; application Ser. No. 11/669,113. The above-referenced patent application also describes the use of attracting magnets placed at the center of an inductive charger or power supply's PCB coil, and the center of the receive coil, to align and center the two parts conveniently. Such techniques can be used in the base to case coil alignment, or the case to mobile device alignment or both. In addition, the alignment can be achieved through visual or mechanical marks, indentation, or mechanical design of the parts to enable easy alignment.

Heat Reduction and Dissipation

In order to generate the magnetic field for an inductive charger and/or power supply, a coil made of wires or printed on PCB is typically used. Such a coil can be in a simple way, modeled by an inductive and resistive element in series. The resistance of the coil can be estimated by using the dimensions of the wire or PCB trace, its length, and the resistivity of the material used (such as copper). At higher frequencies, the resistance increases due to the skin effect whereby the electrical current travels near the surface of the wire or trace rather than throughout its cross section, thereby decreasing the wire's or trace's effective cross section. In order to obtain reasonable inductive values, several turns of wire or PCB trace are necessary.

For example, in a PCB spiral coil of 1.25" diameter, about 10 turns are necessary for a 1 micro Henry inductance value. To design a high efficiency inductive power transfer coil, the resistivity of the coil must be minimized while the resulting induction is kept at desired levels. It must be noted that any heat generated at the coil will increase the resistivity of the coil material in turn leading to higher heat generation and temperature increase. To avoid this positive feedback for heat generation, the main methods for reduction of temperature at the inductive coil include reduction of heat generated and dispersal of heat away from the coil.

In addition, electronic devices generally need to satisfy regulatory and safety requirements which include the requirement not to interfere with the operation of nearby devices. For an inductive charger and/or power supply that creates a time varying magnetic field to transfer energy to a receiver, care must be taken to keep the level of interference to below allowed limits.

In general, the magnetic created by a small coil (~1" diameter) of several turns when it is driven by an electrical voltage at around 1 MHz, does not radiate more than several mm beyond the coil and is confined to the near field. To reduce the effect of such radiation (for example, as provided in Near Field Power™ radiation devices) at higher frequencies, which are of bigger concern for most devices, the driving voltage of the circuit must be made to have weaker higher harmonics.

Another concern for generation of Electromagnetic Interference (EMI) is the electronic circuitry and switching Field Effect Transistor (FET) incorporated in the circuit. Such components can be additional noise sources. Described herein are some ways of reducing the effect of above EMI sources.

Another important factor in efficient operation of an inductive charger/power supply is the alignment of the charger/power supply coil and the receiver coil in the device to be charged/powered. Various methods of alignment of the coils using magnets have been described in prior applications. In addition, also described are the use of moving coils and other methods by which several coils or clusters of coils can be used to provide position tolerance between the coils for efficient power transfer.

In accordance with an embodiment, to reduce the temperature increase at the inductive coil, several methods can be used.

In accordance with an embodiment, the coil can be optimized by using the minimum number of turns necessary thereby decreasing the length and resistance of the coil. The diameter, thickness, or width of the wire or PCB trace can be optimized to provide optimum resistance.

For coils such as PCB coils discussed above, the magnetic field created is strong inside the coil, and drops very rapidly as the radial distance to the center of the coil exceeds the radius of the coil. This dependence can be verified using electromagnetic modeling (such as described in Xun Liu; Hui, S. Y., Optimal Design of a Hybrid Winding Structure for Planar Contactless Battery Charging Platform, IEEE Transactions on Power Electronics, Volume 23, Issue 1, January 2008 Page(s):455-463), and also by experimental means. The heat generated at the coil can be dispersed away from the coil by use of high heat conductivity PCB substrates or material for the coils. Since the magnetic field is minimal in the area outside the coil, use of high conductivity metal layers will not have a large effect on the field and will not create undesirable eddy currents. Therefore, the surface of the area surrounding the coil can be designed to have metal or other material that have high heat conductivity and remove the generated heat rapidly.

Figure 66:
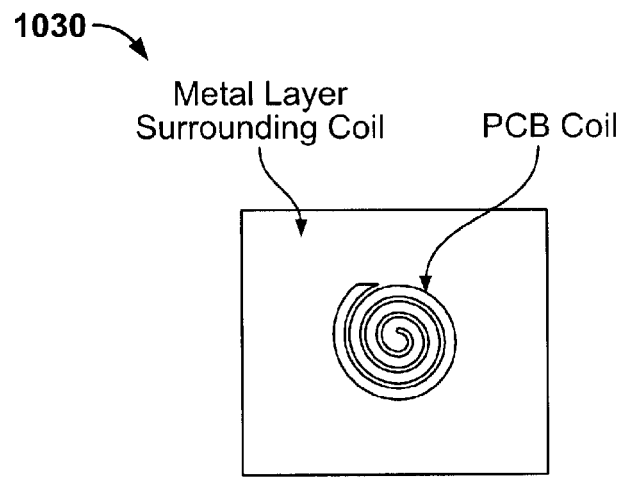
FIG. 66 shows a pad using multiple receiver/energizer coils in accordance with an embodiment.

FIG. 66 is an illustration that shows a geometry for an arrangement 1030 in which the area surrounding a PCB coil is designed to have metal on the top, bottom or another layer of the PCB. As shown in FIG. 66, the area surrounding a PCB coil is designed to have metal on the top, bottom or another layer of the PCB. The metal pattern can be incorporated at the same layer as the coil or a separate PCB layer. This metal layer can be continuous or have a gap in one area to avoid generation of eddy currents due to circulating electrons due to magnetic fields generated by the coil. In a typical PCB, the coil and the metal layer are made of copper. In this manner, any heat generated at the coil is dispersed laterally rapidly and thus does not result in large temperature increase. In accordance with an embodiment, such a PCB can be itself the top layer of an inductive charger in which case, any heat carried away by the metal layer can be additionally evaporated to the surrounding environment. Alternatively, the heat can be further dispersed by removal to another area or surface or use of elements such as fins or slits. Similarly, the receiver coil and the circuitry for receiving power that is integrated into a device, battery, outside carrier of an electronics device, etc. can have a similar geometry to enable dispersal of heat generated.

In accordance with an embodiment, for typical applications with a PCB, the metal layer can be made from copper material similar to that of the PCB coil itself, and it is desired to have sufficient thickness to provide a low thermal conductivity path for the heat. For example, a copper layer of several microns or even 10s of micrometers can be used.

Any such high thermal conductivity or metal layer may begin at the edge of the PCB coil or with a gap to the PCB coil. Since the layer is not covering the PCB coil, it may not cause eddy current loss in the layer. In those instances that eddy currents are generated, a gap in the metal layer as shown in FIG. 66 can be used to reduce the effect of circulating currents, and reduce the resultant heating and power draw. In accordance with an embodiment a metal layer can be used on top of the coil (with a thin non-conducting layer or dielectric in between) if its thickness is small. For example, in previous applications as referenced above, the use of a thin layer of metal (several micrometers) on top of a PCB coil was described to act as an EMI shield for high frequencies while transmitting low (around 1 MHz and below) frequencies of the inductive charger. Such a layer may also be used in addition to the metal layer surrounding the coil to facilitate heat dispersal.

Figure 67:
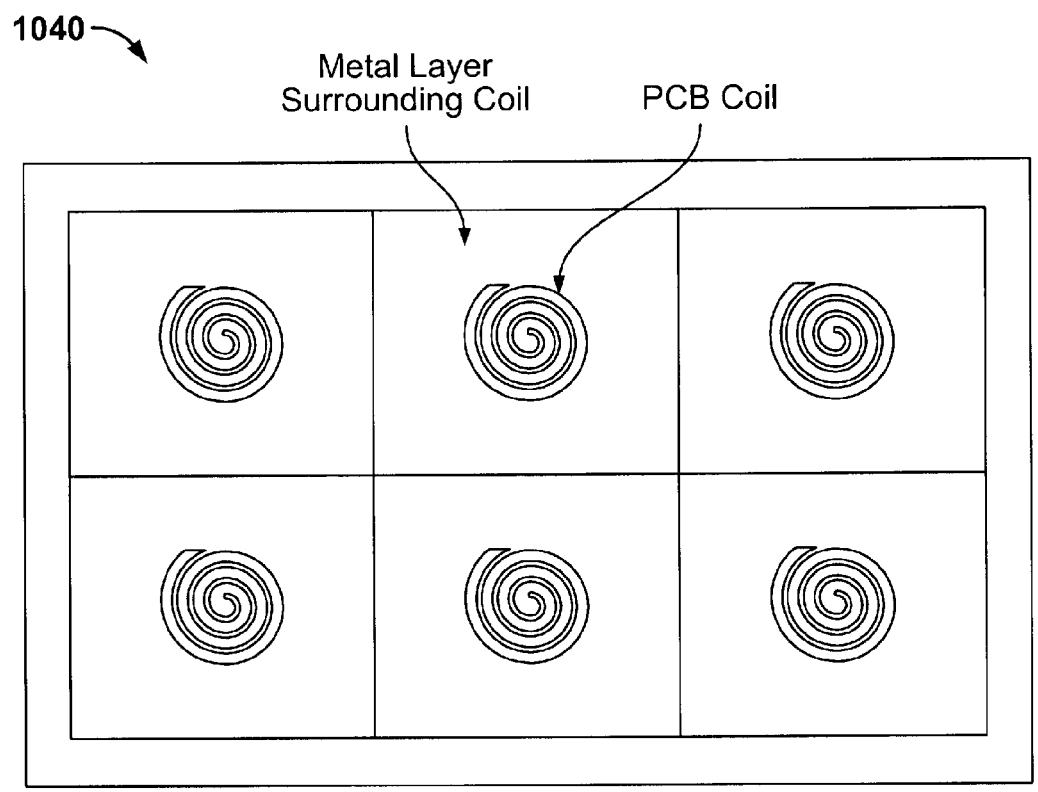
FIG. 67 shows, in a multi-charger or power supply where multiple coils are used, such a high heat conductivity layer may be repeated around each coil or cover all areas between the multiple coils, in accordance with an embodiment.

FIG. 67 is an illustration that shows, in a multi-charger or power supply where multiple coils are used, such a high heat conductivity layer 1040 may be repeated around each coil or cover all areas between the multiple coils.

Figure 68:
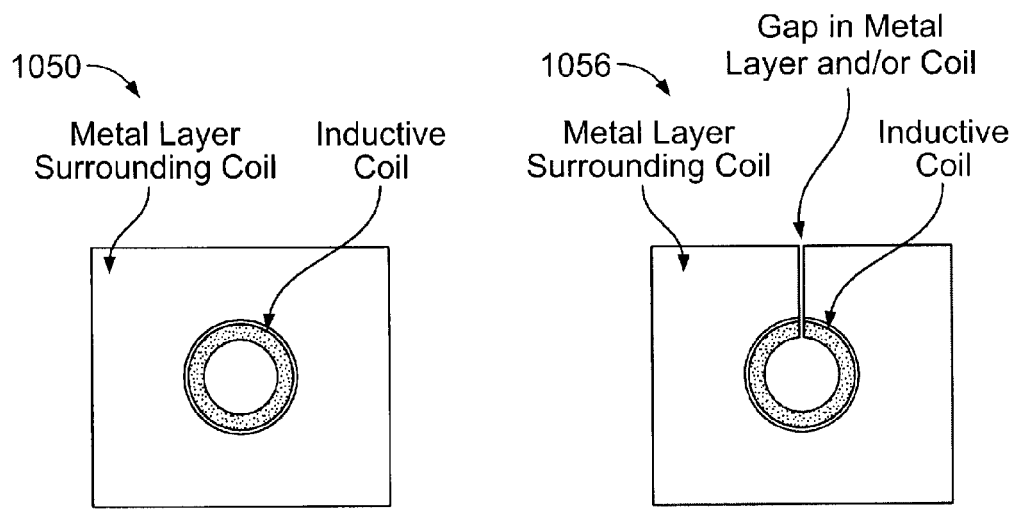
FIG. 68 shows a similar method that may be used for heat removal from wound coils of other shape and type.

FIG. 68 is an illustration that shows a similar method may be used for heat removal from wound coils of other shape and type 1050, 1056. In accordance with the geometry of this embodiment, to facilitate heat removal from a coil that may be a wound coil around a core, the coil may be attached to a high heat conductivity layer or a metal layer. In the case of a metal layer, such a layer can be designed to be in the area surrounding the outside of the coil to avoid interference with the field generated inside the coil. Similarly, to avoid eddy currents, the metal layer or the core of the wound coil or both can have a gap or discontinuous portion to reduce circulating currents.

Figure 69:
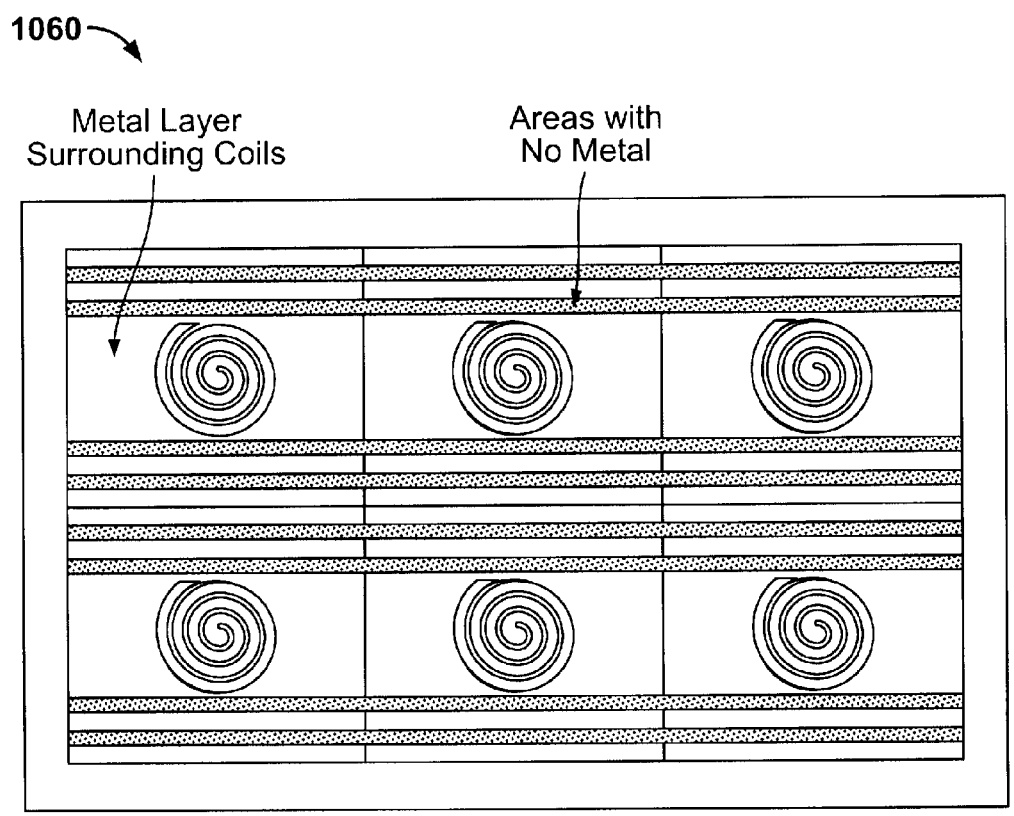
FIG. 69 shows an embodiment in which the layer can be patterned to provide heat conductivity channels rather than a continuous layer.

In above examples, a metal or high heat conductivity layer has been shown. FIG. 69 shows an illustration of an embodiment 1060 in which the layer can be patterned to provide heat conductivity channels rather than a continuous layer if needed.

In accordance with any of the above geometries, additional means of heat removal such as use of fins, fans, additional surfaces, heat pipes, thermal grease, thermally conductive epoxies, etc. can be incorporated to facilitate heat removal. In addition, it is possible to incorporate heat conducting layers, such as ceramics or polymers can be incorporated below or above the main PCB to help in heat removal.

In the above discussion, round shape coils are generally shown. It will be evident that the techniques described herein are applicable to coils of other shape or multiple coils in a cluster or separated to power or charge separate devices. In many instances, the increase of the temperature at the center of a PCB coil is largest. To remove this heat, in accordance with an embodiment the surface of the charger or a layer behind the coil that contains high heat conductivity material can be used to disperse the generated heat laterally. An example of such a layer is ceramic material. High alumina ceramics can provide high heat conductivity and low electrical conductivity, which characteristics are important for this application.

Reduction of EMI from Inductive Charger and/or Power Supply

An advantage of the metal layers discussed above is that any EMI generated inside the inductive charger or power supply will be greatly shielded from the outside and will be attenuated outside the charger or power supply device by the metal layer.

Additionally, in the above geometries, the metal layer on the top layer can be made to contact electrically to other metal layers on the side and/or bottom of the charger and/or power supply, thereby forming a box or other enclosed shape where only the coil is not covered by metal. Such an enclosure will greatly attenuate EMI from the switching electronics or other parts in the charger. To reduce the effect of the potential eddy currents generated in the metal box due to the magnetic field, in some embodiments it is useful to eliminate use of metal directly below the coil area where magnetic fields may exist. In addition, to avoid generation of eddy currents in the walls of the metal box or similar outside surface, the wall can be cut in one or more location so that a continuous metal circuit or ring is not formed, and does not allow the electrons to circle unimpeded. This gap can be filled with a non-conductive material to provide rigidity.

In the geometries shown above, it is possible to use a PCB whereby the coil is formed in one area and the electronics is on the same PCB. In accordance with an embodiment, to provide shielding and heat dissipation discussed above, the metal layer around the coil may be in a layer on top (closer to the outside surface) of the PCB. For example, the coil may be formed on the top layer of the PCB along with the heat dissipation and/or EMI shield layer and the PCB electronic components may be on the bottom layer of the PCB. Alternatively, the metal layer can be in a separate layer in the middle or even the bottom layer with the PCB electronic components. However, the EMI shielding effects from the electronics components will be reduced if the metal layer surrounds the electronics area and does not provide an electrical barrier directly above it.

Figure 70:
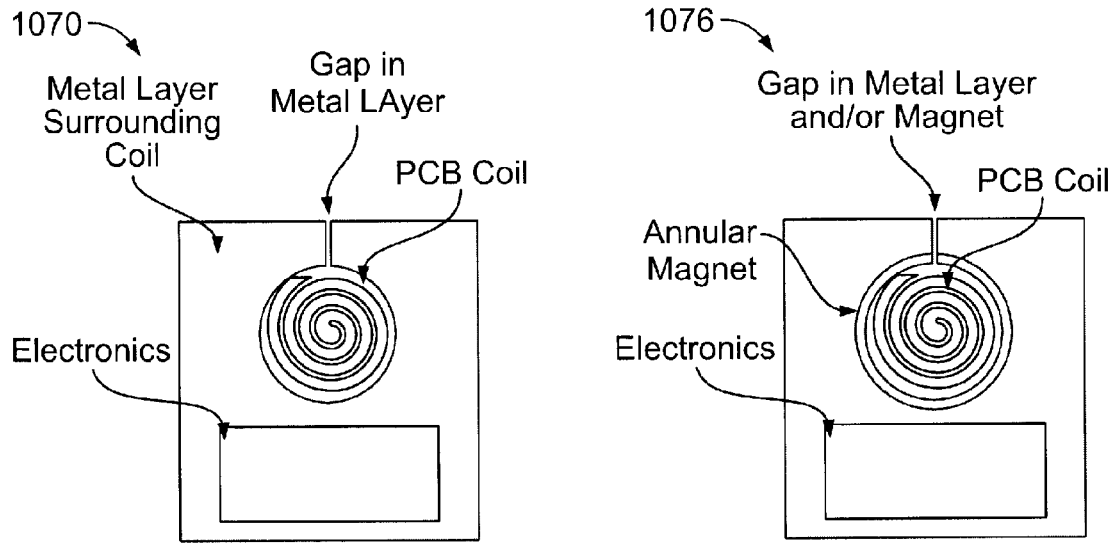
FIG. 70 shows an illustration of the electronics for the PCB coil inductive charger and/or power supply or the inductive receiver as fabricated on the same PCB as the coil, in accordance with an embodiment.

FIG. 70 shows an illustration of the electronics for the PCB coil inductive charger and/or power supply or the inductive receiver as fabricated on the same PCB as the coil in accordance with various embodiments 1070, 1076. The electronics in this case may be at the bottom layer, while the coil and the metal layer surrounding the coil are on the top layer and shield any electronic noise generated by the electronics from the outside.

Any of the shapes and geometries discussed above are equally appropriate for incorporation into the charger and/or power supply coil or the receiver coil and for dispersal of heat and reduction of EMI from a device to be charged/powered inductively as well as the coil in the charger/power supply itself.

Magnetic Alignment of Coils

In accordance with an embodiment, to enable efficient power transfer in an inductive charger and/or power supply, the coils in the charger and/or power supply and the receiver must generally be aligned with on another.

Figure 71:
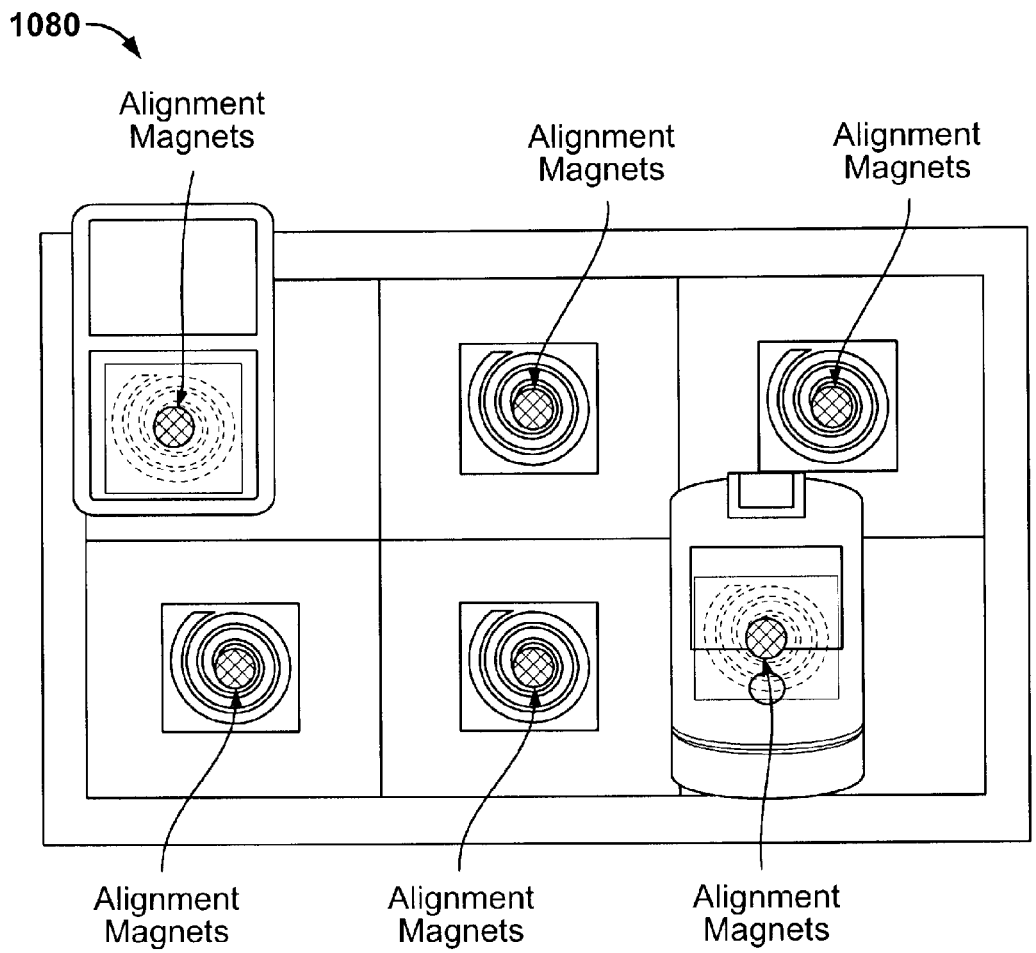
FIG. 71 shows an embodiment in which magnets placed at the center of a stationary coil or a moving, floating charger and/or power supply coil and the receiver coil can provide a method for alignment of the coils and to achieve this result.

FIG. 71 shows an embodiment 1080 in which magnets placed at the center of a stationary coil or a moving, floating charger and/or power supply coil and the receiver coil can provide a method for alignment of the coils and to achieve this result.

A problem with this method is that, since the magnetic material is composed of electrically conductive material, eddy currents can be generated when the coils are operated to generate a time-varying magnetic field. This can cause lost power, and can also cause heating in the magnets which is not beneficial.

Figure 72:
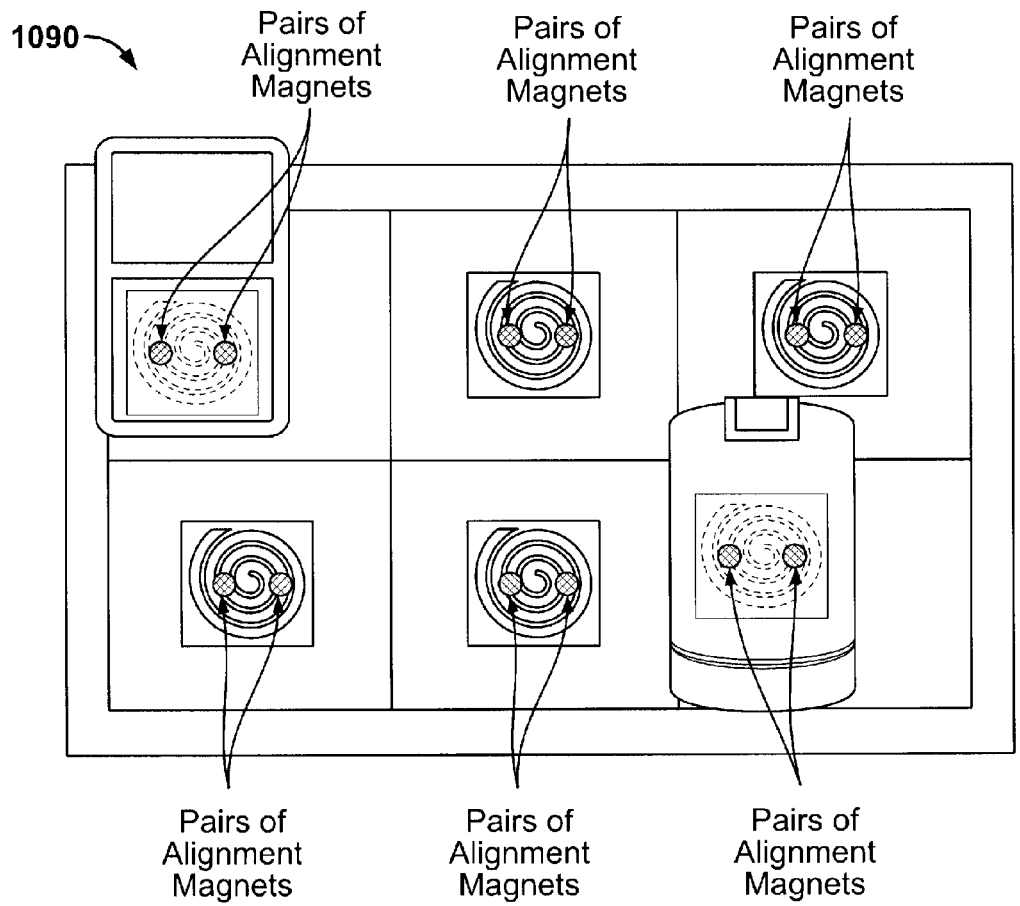
FIG. 72 shows an embodiment in which two or more magnets that do not cross the center of the coil are used.

To address this problem, FIG. 72 illustrates an embodiment 1090 in which two or more magnets that do not cross the center of the coil are used. This geometry reduces the eddy currents created greatly. In accordance with an embodiment, the system can use an alternative magnet geometry that provides a simple and inexpensive method for alignment of coils. In addition, this method provides for a considerable amount of alignment tolerance when placing a device on the charger and/or power supply.

To provide alignment magnets that will not draw current due to eddy currents created in them when a magnetic field is applied, in accordance with an embodiment the magnets are placed outside the PCB coil area.

Figure 73:
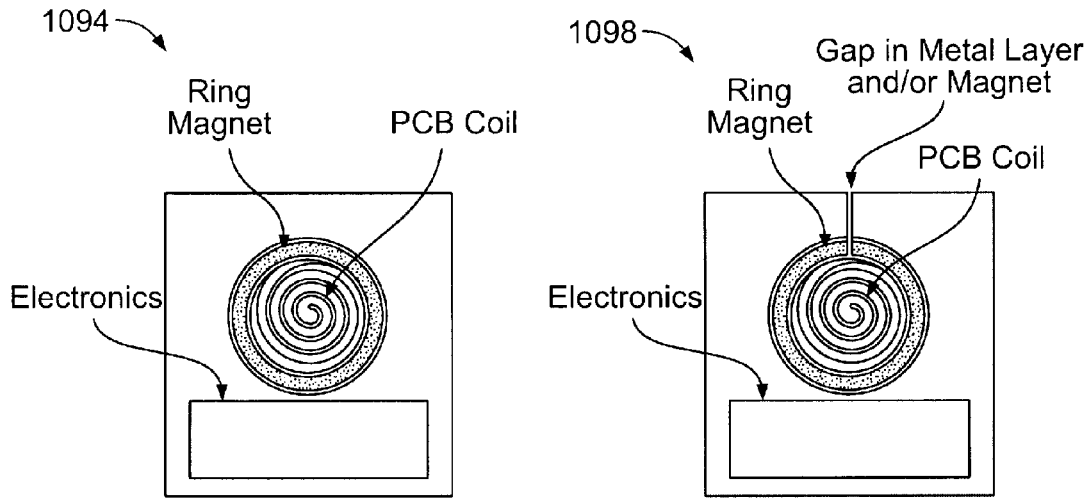
FIG. 73 is an illustration that shows how the magnets may be placed outside the PCB coil area, in accordance with an embodiment.

FIG. 73 is an illustration of two embodiments 1094, 1098 that shows how the magnets may be placed outside the PCB coil area. The magnet shown in FIG. 73 comprises a ring that surrounds the coil or overlaps each coil such that little effect on eddy current generation or loss is created. If any eddy current effects are observed, then in accordance with an embodiment gaps can be inserted in the magnet ring by cutting after manufacture or by inserting this separation during manufacture. In this manner the eddy currents can be significantly reduced or eliminated. The magnet in the case shown is magnetized perpendicular to the surface of the ring. By attaching one magnet to around the charger and/or power supply coil and another magnet with opposing polarity to the receiver coil, the two coils can easily be aligned with minimal effort by the user.

In addition, the use of a ring has the advantage of allowing circularly symmetric operation so that the two coils can be rotated with respect to each other with no effect on charger/power supply operation or efficiency.

A typical geometry for the charger/power supply can comprise the PCB shown in FIG. 8 such that the coil can be fabricated on the top surface of the PCB, and the magnetic ring is attached to the bottom side of the PCB where the electronics may be located. A similar receiver can have a magnet attached with opposing polarity so that when the receiver is brought close to the charger/power supply, the two magnets can attract and pull the coils into alignment. With this geometry, the magnetic field of the coils create attraction and alignment as long as the coils have any overlap.

For example for coils of 1.25" outside diameter and using ring magnets of 1.25" inner diameter, as long as the centers of the coils are less than 1.25" away laterally, the coils can be brought into alignment when the two magnets are vertically (distance in the axis perpendicular to the plane of the coil) brought close enough to allow the magnetic fields to sense each other. Thus in this case, if the user brings the center of the receiver coil to be within a circle of 1.25" radius of the center of the charger/power supply coil, the coils can attract and provide automatic alignment of the parts.

For most applications, this amount of alignment tolerance is sufficient. By using marks to outline the location for the coil on the surface, this degree of tolerance allows the user to place a device or battery incorporating the receiver coil very easily into the right location.

Examples of magnets that can be used include those manufactured from various magnetic material such as Neodymium Iron Boron, Samarium Cobalt, AlNiCo, ceramics, bonded magnetic material, etc. The magnetic strength can be designed to provide alignment or secure attachment without being too strong or difficult for separation.

Alternatively, the coils can be manufactured on the lower surface close to the magnet and the electronics or can be manufactured on another layer in between. Various geometries are possible. In any case, the magnets can be used to align the two coils for optimum operation.

In above description, ring shaped magnets are described. However, in many cases, size and spacing requirements may require use of a different geometry.

Figure 74:
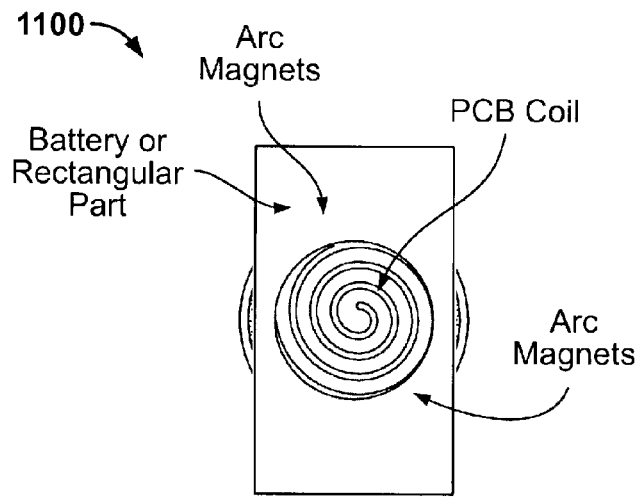
FIG. 74 shows an embodiment in which magnetic arc-shaped parts around a circular coil are used.

FIG. 74 shows an embodiment 1100 in which magnetic arc shaped parts around a circular coil are used. This case may be combined with the matching magnet on the other coil having the same shape or a ring shape similar to FIG. 73. For example, in a mobile battery application where the battery with an integrated inductive receiver is charged by placement on an inductive charger pad, the size of the coil determines the received power and may require the width of the battery to be equal or similar to the receiver coil. To allow attachment of alignment magnets, two arcs as shown in FIG. 9 can be attached to the coil. In this case, the magnets can be placed in between the battery and the coil PCB to allow the coil to be on the top surface and therefore closest to the charger coil. The matching magnet in the charger can be a ring or a similar set of arcs or another shape or size to facilitate alignment. If a ring is used behind the charger coil, then central symmetry between the two parts is retained and the parts can be rotated with respect to each other while keeping alignment for optimum operation.

Figure 75:
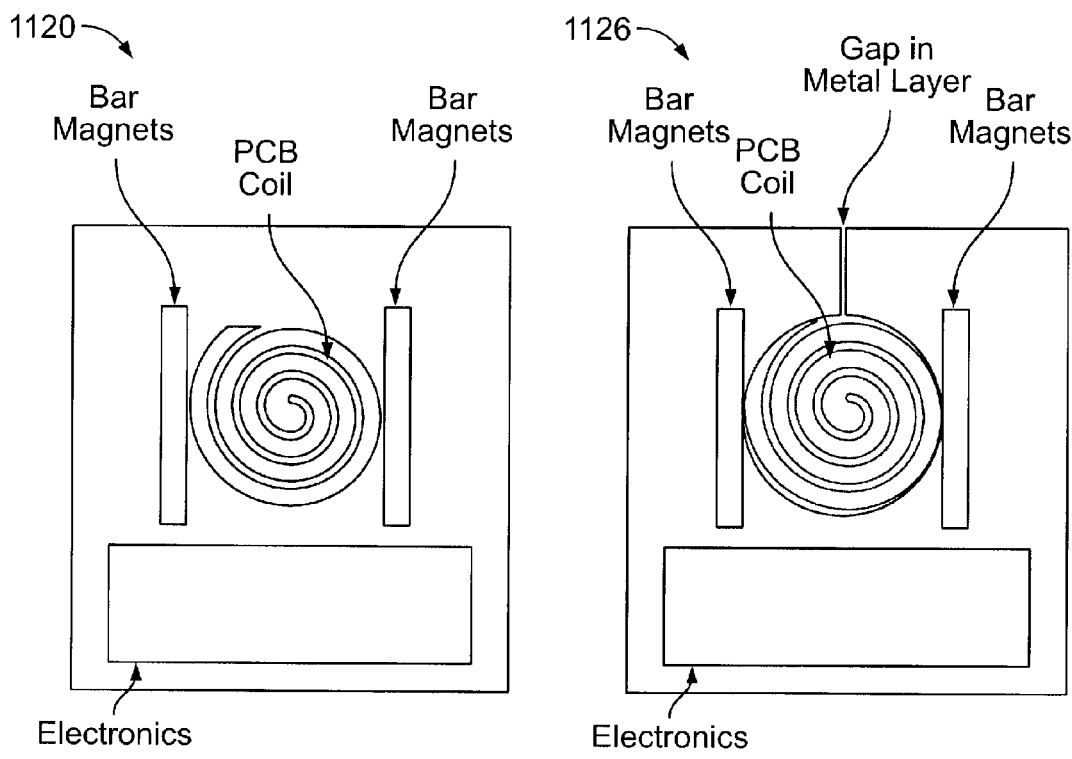
FIG. 75 illustrates the use of bar magnets on or around the coil, in accordance with an embodiment.

Other geometries are possible. For example, FIG. 75 illustrates embodiments 1120, 1126 in which the use of bar magnets on or around the coil is shown. Such a geometry does not have the symmetry offered by a ring magnet. However, this may be useful if only one dimension of alignment insensitivity is desired.

In any of the above geometries, use of two magnets with opposing polarity to attract each other is described. However, in accordance with some embodiments it is preferable for one of the parts to be non-magnetized. This may be advantageous in cases where it is not desirable for the mobile device to attract metallic parts when not being charged or powered by the inductive charger/power supply. An example may be a mobile phone where it is not desirable for the phone to attract metallic objects during normal use. In this case, the charger and/or power supply can contain a magnetized part and the other matching part in the mobile device/battery, can be made of appropriate magnetic material but not magnetized. For example, the charger/power supply may contain a magnetized ring as described above and a mobile phone can have a matching ring or arc made of magnetic material but not magnetized.

In addition, it is possible for the charger and/or power supply magnet to be activated electrically and be normally non-magnetized. For example, a wire winding or PCB trace is placed around the perimeter of the power transfer coil and powered to create a DC magnetic field for alignment of the two coils for power transfer/charging. In this way, neither of the two alignment parts need to be normally magnetized and therefore eliminate any concerns regarding unintended attraction of metallic objects or effects on magnetically sensitive parts such as credit cards, etc. The generated magnetic field can be further strengthened by using a non-magnetized magnetic material on or near the alignment trace area.

As an example, a circular path around the main charger/power supply PCB coil can be powered by a DC current periodically or when a user desires to charge or power a mobile device. This can be done by the user or can also be activated automatically by a sensor that senses the approach of an appropriate device to be charged or powered through RF, optical, magnetic, or other methods. Once the magnetic field (such as a ring pattern as described above), is generated it will attract and align a magnetic metal part or magnet of appropriate shape in the mobile device or battery into the correct alignment and placement and help the user place the mobile device in the correct position. Once the device is placed in the right location, the DC magnetic field may no longer be necessary and can be shut down or reduced to save power. Thus only for a very brief period this alignment magnet may be needed. During other times, neither the charger and/or power supply or the mobile device can be designed to have any magnetic field around them or contain weaker magnets.

The use of magnets as described above is especially useful for cases where movement between the power supply and/or charger and the device or battery to be charged or powered may occur. As an example, in an automobile environment, it is desirable to keep a mobile device such as a phone from moving during charging. Thus the use of the magnets described above, in addition to the above benefits, can enable use in moving environments. In addition, in some cases, it may be beneficial to have the charger and/or power supply in a position that is not horizontal. For example, a charger can be installed vertically. In this case, the magnets can be designed to be strong enough to hold the mobile device or battery in place vertically during the charging or powering process.

In any of the above geometries, if any additional eddy currents are generated as a result of the presence of the magnets, the effect can be minimized by fabricating the coil from low electrical conductivity materials or ceramics, layering the magnet into thin sheets to increase resistivity, using bonded material in an epoxy matrix, roughing the surface, cutting gaps in the material to reduce, circular motion of electrons, or other common techniques to increase the resistivity. The magnet can also be manufactured from segments that are not electrically connected to prevent electrons to be able to travel around a circular path. For example, the ring magnet can be manufactured, formed or attached to the coils from two or four ring arcs that are not electrically in contact or attached to each other, using a non-conducting epoxy to form a full ring, or parts of a ring.

In addition, the coils shown above are generally circular. However, the methods and discussion above can be applied to coils of any shape and size as well as an array or cluster of coils and can provide in performance of any size and type of coil.

The foregoing description of an embodiment has been provided for the purposes of illustration and description. It is not intended to be exhaustive or to limit an embodiment to the precise forms disclosed. The embodiments were chosen and described in order to best explain the principles of an embodiment and its practical application, thereby enabling others skilled in the art to understand an embodiment for various embodiments and with various modifications that are suited to the particular use contemplated. It is intended that the scope of an embodiment be defined by the following claims and their equivalence.

Some aspects of an embodiment may be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, an embodiment includes a computer program product which is a storage medium (media)

having instructions stored thereon/in which can be used to program a computer to perform any of the processes of an embodiment. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of an embodiment has been provided for the purposes of illustration and description. It is not intended to be exhaustive or to limit an embodiment to the precise forms disclosed. Many modifications and variations will be apparent to the practitioner skilled in the art. Particularly, while the embodiments of the systems and methods described above are described in the context of charging pads, it will be evident that the system and methods may be used with other types of charger or power supplies. Similarly, while the embodiments described above are described in the context of charging mobile devices, other types of devices can be used. The embodiments were chosen and described in order to best explain the principles of an embodiment and its practical application, thereby enabling others skilled in the art to understand an embodiment for various embodiments and with various modifications that are suited to the particular use contemplated. It is intended that the scope of an embodiment be defined by the following claims and their equivalence.

What is claimed is:

1. A system for inductive powering and charging of portable devices or batteries, comprising:
    a base unit, including one or more primary coils which are capable of generating an inductive field for use in powering or charging one or multiple portable devices or batteries simultaneously, wherein each primary coil is positioned within the base unit so that an electrical current can be passed through the primary coil to generate an inductive field;
    a receiver unit, including a receiver coil which is coupled to or incorporated into a portable device or battery, or a skin, case, or battery door associated therewith, wherein the receiver coil receives energy inductively from the one or more primary coils and uses it to charge or power the portable device or battery; and
    components within the base unit for allowing a degree of position independence of the portable device, battery, skin, case, or battery door with respect to the base unit, including selectively activating an appropriate number of the one or more primary coils, including
        verifying a presence of the receiver unit placed close to the base unit,
        activating the appropriate number of primary coils to be used with the receiver unit and its portable device, battery, skin, case, or battery door, and
        communicating information for use in managing power transfer to the portable device or battery.

2. The system of claim 1, wherein the base unit includes a plurality of primary coils, and wherein activating the appropriate number of the plurality of primary coils includes controlling the on/off operation of the primary coils in the vicinity of the receiver unit and its portable device, battery, skin, case, or battery door.

3. The system of claim 1, wherein the base unit and/or the receiver unit both include microcontrollers, wherein the microcontroller in the base unit and/or the receiver unit provides communication between the base unit and the receiver unit for use in controlling charging.

4. The system of claim 1, wherein the base unit performs an additional verification step prior to activating charging, to verify the identity or permissions of the receiver unit or the portable device, battery, skin, case, or battery door.

5. The system of claim 1, wherein, within the base unit, a plurality of primary coils are integrated into a pad-like charger or power supply and wherein the coils are used to form a coil mosaic and an effective area of charging or power.

6. The system of claim 1, wherein the base unit includes a plurality of primary coils, and wherein each one or a group of the plurality of coils are driven by an individual drive circuit to provide power to each coil and to selectively activate one or more coils.

7. The system of claim 1, wherein each of the one or more primary coils or a group of them includes a switch component, and wherein the base unit includes a microcontroller that periodically switches alternating voltage to one or more primary coils, monitors the current therein, and uses the current to sense the proximity of a receiver unit to a particular coil or a region thereof, and activate charging in that particular coil, or a selection of coils in that region.

8. The system of claim 1, wherein a plurality of layers of primary coils are layered upon one another to create an effective area of charging or power, and so that powering any one or a selection of the primary coils allows a receiver unit within the effective area to be charged.

9. A mobile device capable of being inductively powered or charged comprising:
    a battery; and
    a receiver unit, for one of inductively powering the mobile device or charging the battery in the mobile device,
        wherein the receiver unit is one of attached to or incorporated into the battery or the mobile device or a skin, case, or battery door associated therewith, and includes a receiver coil which receives energy inductively from one or more primary coils in a base unit and uses it to charge or power the mobile device or battery, and
        wherein the base unit allows a degree of position independence of the mobile device, battery, skin, case, or battery door with respect to the base unit, including selectively activating an appropriate number of its one or more primary coils, including verifying a presence of the receiver unit placed close to the base unit, activating the appropriate number of primary coils to be used with the receiver unit and its mobile device, battery, skin, case, or battery door; and
    wherein the receiver unit communicates with the base unit to communicate information for use in managing power transfer to the mobile device or battery.

10. The mobile device of claim 9, wherein the information communicated between the receiver unit with the base unit includes information about the presence of the mobile device adjacent to the base unit and/or wherein the base unit stores charging or power requirements for mobile devices which can be charged or powered by the base unit.

11. A system for use with a mobile device or battery for charging or powering the mobile device or battery inductively, comprising:
    a base unit, including one or more primary coils which are capable of generating an inductive field for use in powering or charging one or multiple mobile devices or batteries simultaneously, wherein each primary coil is positioned within the base unit so that an electrical current can be passed through the primary coil to generate an inductive field;

components within the base unit for allowing a degree of position independence of a mobile device or battery, or skin, case, or battery door associated therewith, with respect to the base unit, including selectively activating an appropriate number of the one or more primary coils, including verifying a presence of a receiver unit placed close to the base unit, activating the appropriate number of primary coils to be used with the receiver unit and its mobile device, battery, skin, case, or battery door, and communicating information for use in managing power transfer to the mobile device or battery; and wherein the inductive field is used to generate a current in receiver unit, to charge or power the mobile device or battery.

12. The system of claim 11, wherein one or more of the primary coils are manufactured on printed circuit boards and are manufactured to have a low resistance.

13. The system of claim 11, further comprising a battery coupled to and powering the base unit, and wherein the battery can be occasionally charged by an external power supply to maintain a charge sufficient to power the base unit for a period of time.

14. The system of claim 11, further comprising one or more of a solar cell coupled to a battery in the base unit, for charging the battery in the base unit;

a data storage component for storage of data, for subsequent transmission of data to or from the mobile device; and/or a cover surface of the base unit that includes a decorative or non-slip surface.

15. The system of claim 11, wherein the base unit includes a plurality of modular chargers or power supplies that can be interconnected to form the base unit.

16. The system of claim 11, wherein the mobile device to be charged or powered includes a charging circuit having a Zener diode and/or voltage regulator, wherein the Zener diode limits the voltage to the mobile device or battery to a predetermined maximum voltage, and a switch that includes a MOSFET and a capacitor, and wherein alternating switching in each of the one or more primary coils is automatically started by the MOSFET when the base unit detects a mobile device or battery placed close to or aligned with that primary coil.

17. The system of claim 11, further comprising a switch within the base unit for adjusting and/or controlling the power into the one or more primary coils under different load conditions, to maintain high efficiency during different load conditions or charging stages.

18. The system of claim 17, wherein the switch includes a zero voltage switching or zero current switching switch geometry, and wherein the controlling of output power is achieved by changing the frequency of the switching operation.

19. The system of claim 11, wherein the base unit includes a microcontroller for controlling one or more of the verifying a presence of a receiver unit placed close to the base unit, activating the appropriate number of primary coils to be used with the receiver unit and its mobile device, battery, skin, case, or battery door, and/or communicating information for use in managing power transfer to the mobile device or battery.

20. The system of claim 19, wherein the microcontroller includes a firmware which is used to configure the microcontroller.

21. The system of claim 19, wherein the microcontroller monitors current flow, and communicates information about current flow between the base unit and the receiver unit for use in controlling charging.

22. The system of claim 11, wherein the base unit includes one or more magnets that exert an attractive force to cause the primary coil in the base unit to become more aligned with the receiver unit.

23. The system of claim 22, wherein the one or more magnets are in the form a flat disk, a ring or arc magnet, and optionally include one or more cuts or breaks, and are placed at a center or at an outer edge of the primary coil.

24. The system of claim 11, wherein additional layers are included proximate to the primary coil, to provide one or more of electromagnetic shielding and/or heat dissipation.

25. The system of claim 11, wherein the base unit is powered by another electronic device, such as through a USB connector in the base unit.

26. The system of claim 11, wherein one or more of the primary coils are movable within the base unit, and wherein when a device having a receiver unit is placed on the base unit, the base unit senses the position of the receiver coil and moves the coil to the correct position to optimize power transfer.

27. The system of claim 11, wherein the base unit is incorporated into a compartment in a vehicle.

28. The system of claim 11, wherein the base unit is incorporated into a compartment in one of a briefcase, handbag, backpack, carrier, or clothing.

29. The system of claim 11, wherein the receiver unit is incorporated into one of a holster, case, pouch, bag, wallet, or an equivalent holding, carrying, or storage for the mobile device, which is then used with the base unit.

30. The system of claim 11, wherein upon the base unit being used to charge or power the mobile device or battery, the system further communicates data between the base unit and the mobile device or performs other functions.

31. The system of claim 11, further comprising a thin layer of a copper, aluminum, other metallic or other conductive material, or an organic, nanotech, or other material, deposited upon or covering all or part of the base unit and/or the primary coils, or its other components, to provide selective frequency attenuation and/or reduced undesirable electromagnetic emission during operation of the base unit.

32. The system of claim 31, wherein the thin layer of material is formed by one or more of sputtering, evaporation, electroplating, coating through dipping, Langmuir Blodgett, painting, Ecoplating, or other deposition method used to deposit or coat the appropriate material onto some or all or part of the base unit components, its interior and/or exterior or a combination thereof.

33. The system of claim 31, wherein the thin layer of material is adapted to allow desired low frequency components to pass with little or no attenuation, while greatly reducing undesired higher frequency electromagnetic emissions.

* * * * *